United States Patent [19]
Kondo et al.

[11] Patent Number: 5,586,254
[45] Date of Patent: Dec. 17, 1996

[54] SYSTEM FOR MANAGING AND OPERATING A NETWORK BY PHYSICALLY IMAGING THE NETWORK

[75] Inventors: Mariko Kondo; Teruo Nakamura; Yumiko Mori; Toshiyuki Tsutsumi, all of Yokohama, Japan

[73] Assignee: Hitachi Software Engineering Co., Ltd., Kanagawa-ken, Japan

[21] Appl. No.: 18,430

[22] Filed: Feb. 16, 1993

[30] Foreign Application Priority Data

Feb. 13, 1992 [JP] Japan .................................. 4-026405
Sep. 18, 1992 [JP] Japan .................................. 4-249890

[51] Int. Cl.$^6$ ........................ G06F 15/40; G06F 15/66; G06F 13/94
[52] U.S. Cl. ................ 395/200.1; 395/615; 340/825.03; 364/228; 364/229.4; 364/927.99
[58] Field of Search ............................ 395/51, 200, 600, 395/200.1; 340/825.03

[56] References Cited

U.S. PATENT DOCUMENTS

| | | | |
|---|---|---|---|
| 4,833,625 | 5/1989 | Fisher et al. | 364/518 |
| 4,964,088 | 11/1990 | McAuliffe et al. | 364/200 |
| 5,175,800 | 12/1992 | Galis et al. | 395/51 |
| 5,202,985 | 4/1993 | Goyal | 395/600 |
| 5,307,484 | 4/1994 | Baker et al. | 395/600 |

FOREIGN PATENT DOCUMENTS

| | | |
|---|---|---|
| 61-180340 | 8/1986 | Japan . |
| 63-117532 | 11/1986 | Japan . |
| 63-226772 | 9/1988 | Japan . |
| 63-279643 | 11/1988 | Japan . |
| 1-78053 | 3/1989 | Japan . |
| 1-218236 | 8/1989 | Japan . |
| 2-18651 | 1/1990 | Japan . |
| 2-305140 | 12/1990 | Japan . |
| 3-101539 | 4/1991 | Japan . |
| 3-973300 | 4/1991 | Japan . |
| 3-195230 | 8/1991 | Japan . |

*Primary Examiner*—Thomas C. Lee
*Assistant Examiner*—Rehana Perveen Krick
*Attorney, Agent, or Firm*—Fay, Sharpe, Beall, Fagan, Minnich & McKee

[57] ABSTRACT

A system for operating and managing the network equipment is so adapted as to operate and manage a network in which plural computers and network devices are connected to each other. The system is provided with database storing data corresponding to the computers and the network devices and with means for preparing a network specification drawing which satisfies conditions required by the user from the data, for checking the physical data as to whether the network specification satisfies the physical data, for checking the logical data as to whether the network specification satisfies the logical data, and for displaying the network specification drawing in a two-dimensional or three-dimensional manner on the basis of the data stored in the database. The system for operating and managing the network equipment can reduce and simplify management business for network managers as well as management business for managing materials and products by managers managing the materials and products. Further, the system can take necessary measures in case of a fault or a failure of the network and save a resource by sharing the computer resources and the data in an appropriate way.

17 Claims, 93 Drawing Sheets

FIG. 1g

DATA ON INFO OF
TRANSPORTATION MEANS                                306

BETWEEN BLDGS b & c

BETWEEN BLDGS a & c

BETWEEN BLDGS a & b

| | TRANSPORTATION MEANS | FARES |
|---|---|---|
| 1 | FROM STATION A OF TOKAIDO LINE THROUGH STATION B TO STATION C OF YOKOSUKA LINE (TIME : CA. 30 MINUTES) & WALKING FOR 2 MINUTES | YEN 210 |
| 2 | FROM STATION A OF SUBWAY TO STATION C (TIME : CA. 20 MINUTES) & WALKING FOR 3 MINUTES | YEN 260 |

FIG. 1h

DATA ON INFO OF PLACES
OF INSTALLATION OF DEVICES

DEVICE ID #0003                              304

DEVICE ID #0002

DEVICE ID #0001

INSTALLED BLDG : BLDG a

INSTALLED FLOOR : 1ST FLOOR

DATABASE OF FAULTS

DATA ON INFO OF FAULT CONTENTS

FIG. 2b

| PHYSICAL REQUIREMENTS FOR CHECKING BY IEEE 802.3 ||
|---|---|
| 10 BASE 5 MAXIMUM CABLE LENGTH | 500 m / SEGMENT |
| 10 BASE 2 MAXIMUM CABLE LENGTH | 200 m / SEGMENT |
| TOTAL EXTENSION OF DROP CABLE | UP TO 50 m |
| MAXIMUM NO. OF CASCADES | 2 STAGES |
| ⋮ | ⋮ |

FIG. 3c

| STANDARDS FOR CHECKING NETWORK TRAFFIC | | |
|---|---|---|
| ITEMS | PRECAUTION | CAUTION |

| STANDARDS FOR CHECKING CPU STATUS | | |
|---|---|---|
| ITEMS | PRECAUTION | CAUTION |

| STANDARDS FOR CHECKING DISK SIZE | | |
|---|---|---|
| ITEMS | PRECAUTION | CAUTION |
| USED DISK SIZE | >90% | >97% |
| USED SWAP SIZE | >80% | >90% |
| USED AMOUNT OF i-node | >95% | >98% |
| | | |
| | | |

FIG. 5a

| COMPUTERS & TERMINALS | DEVICES TO BE MANAGED NECESSARY FOR OPERATION |
|---|---|
| DEVICE A | POWER A, HOST MACHINE B, TRANSCEIVER C |
| ⋮ | ⋮ |

FIG. 5b

| NETWORK DEVICES | DEVICES TO BE MANAGED NECESSARY FOR OPERATION |
|---|---|
| ROUTER B | DEVICE A, POWER B |
| ⋮ | ⋮ |

FIG. 5c

| USER | DEVICES TO BE MANAGED USER EMPLOYS |
|---|---|
| USER 1 | DEVICE A, TERMINAL D, POWER D |
| ⋮ | ⋮ |

FIG. 5d

| COMPUTER | INHERENT SOFTWARE |
|---|---|
| DEVICE A | SOFTWARE 1, SOFTWARE 2 |
| ⋮ | ⋮ |

FIG. 5j

| SUSPENDED DEVICE | DEVICE A |
|---|---|
| USER AFFECTED | USER 1, USER 3 |
| UNUSABLE SOFTWARE | PASCAL COMPILER |

FIG. 5k(2)
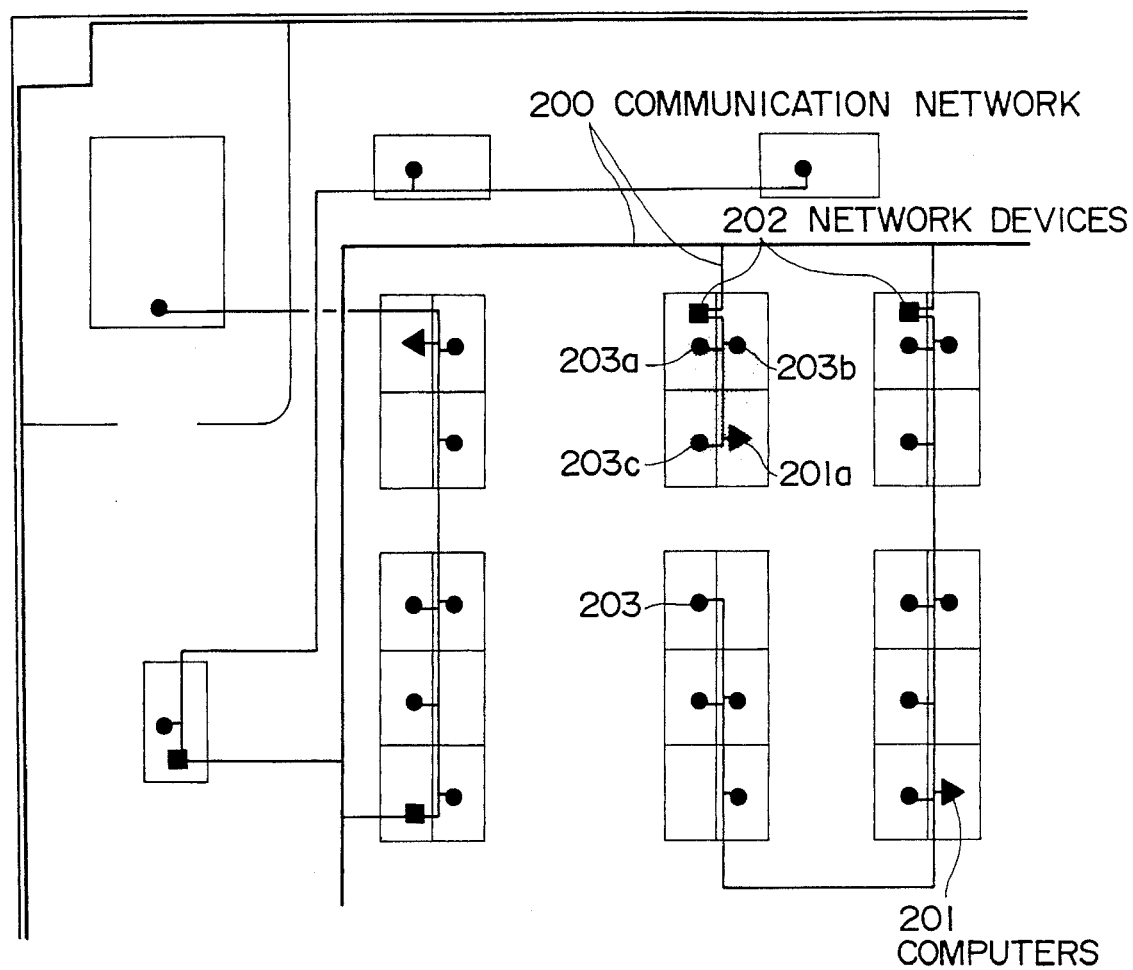

FIG. 5k(3)
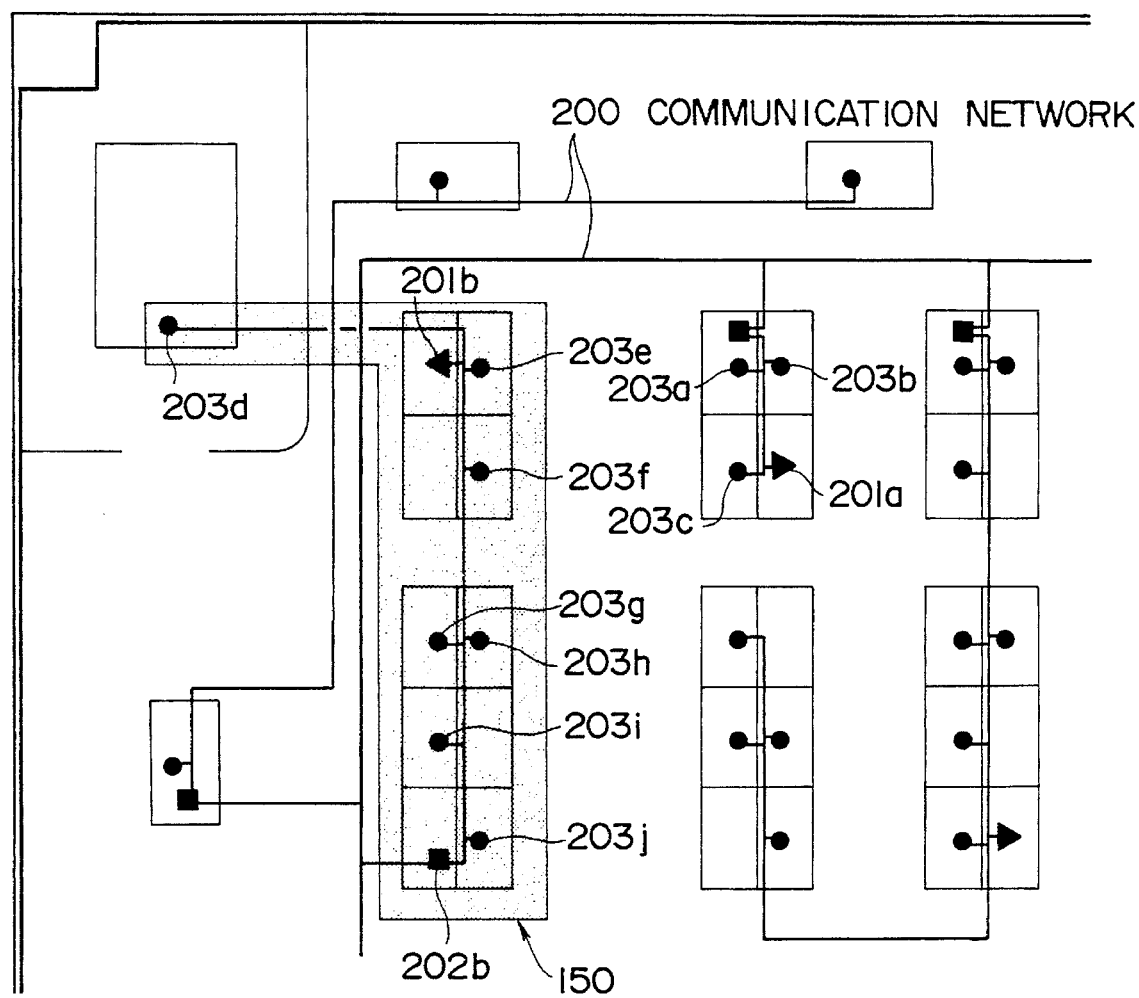

FIG. 5k(4)
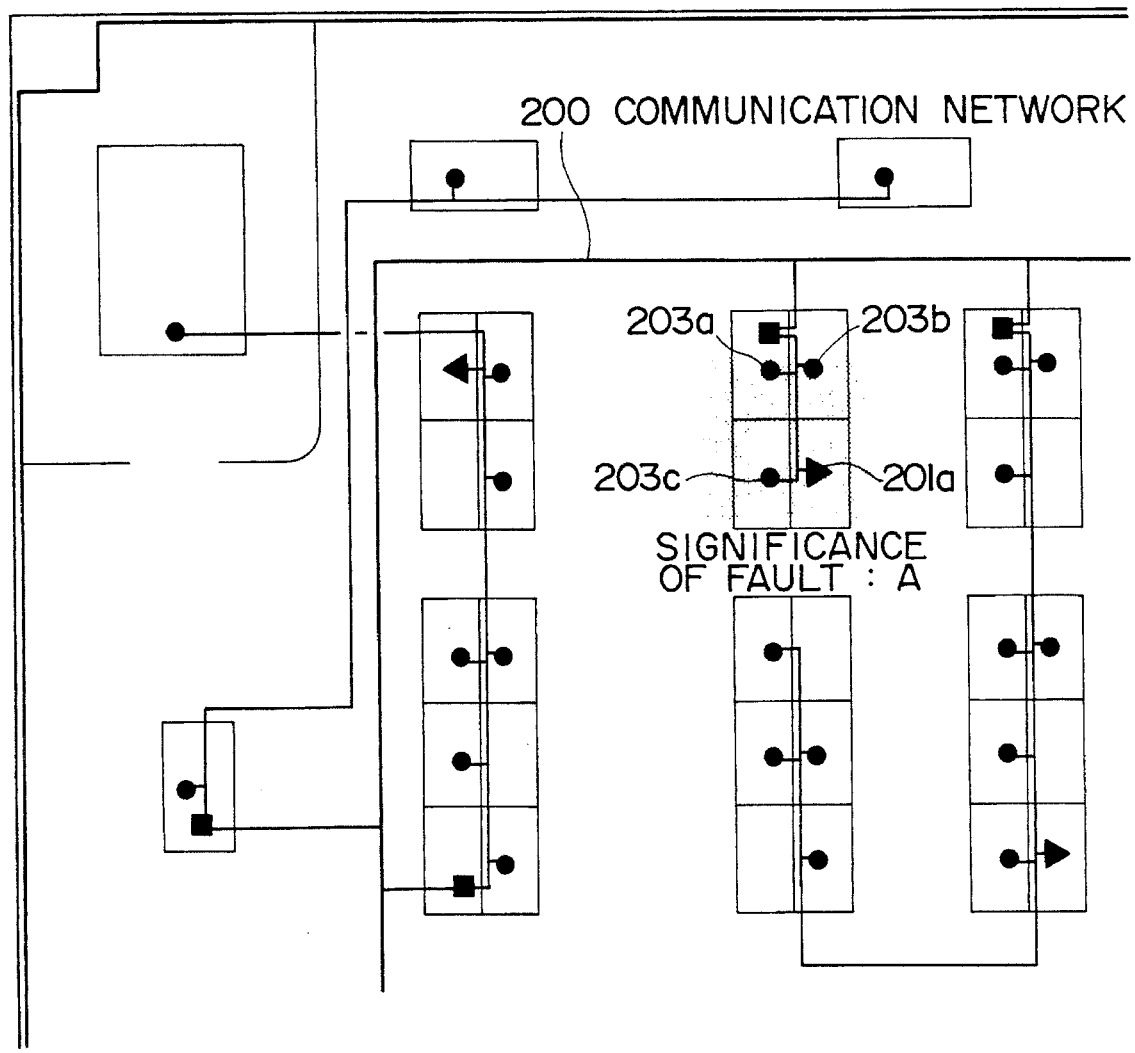

FIG. 5L(1)
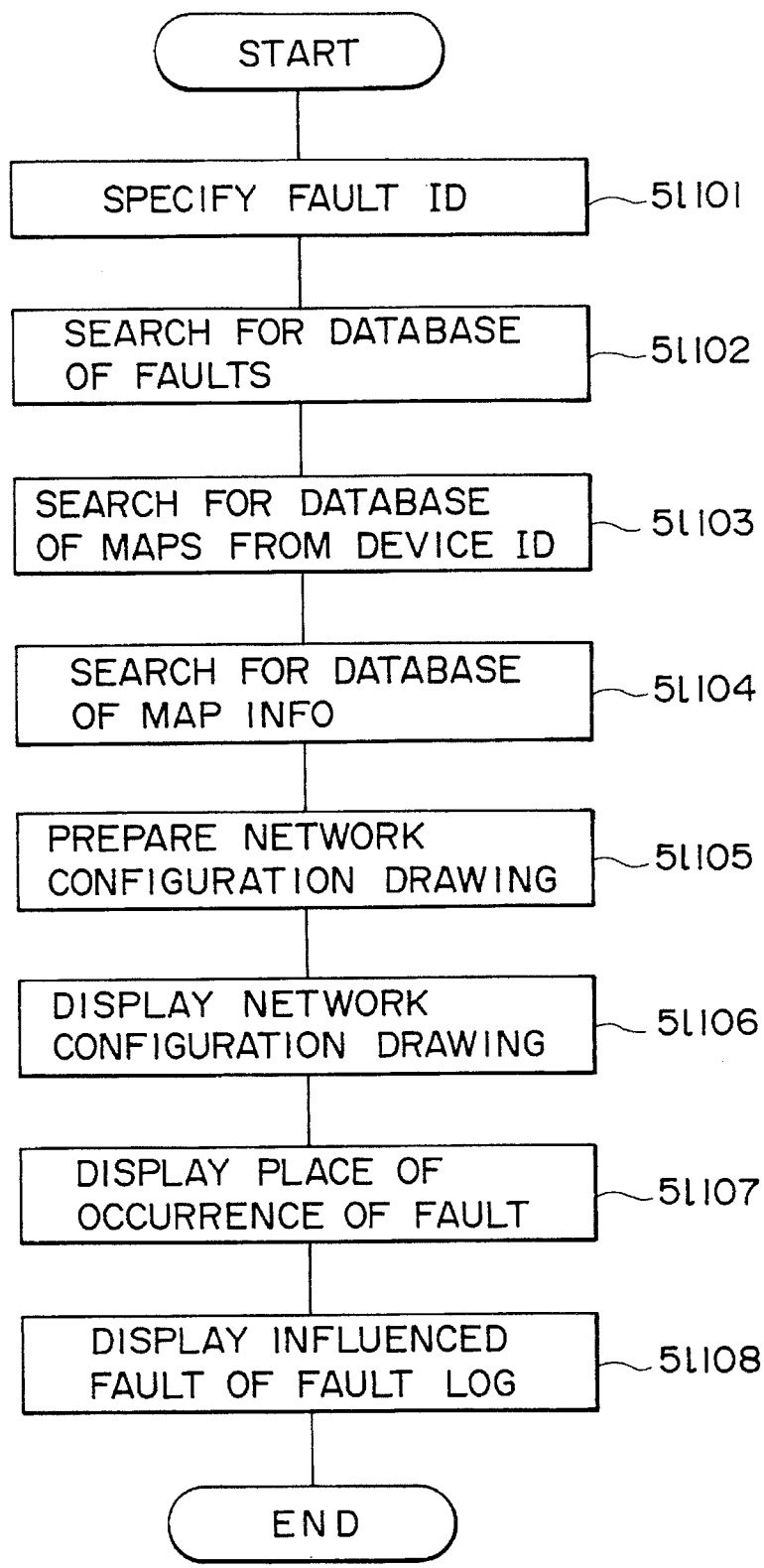

FIG. 5l(2)
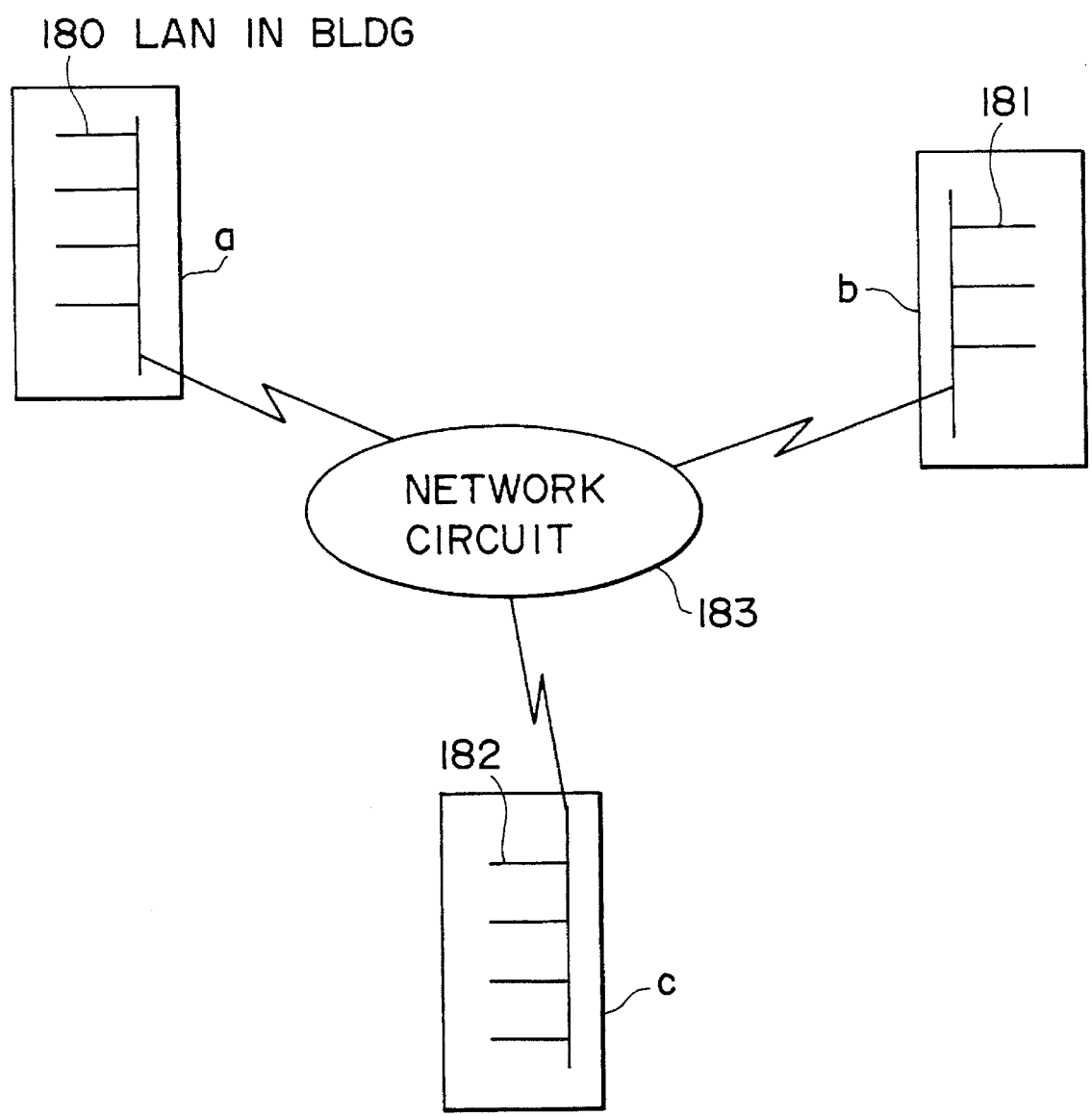

FIG. 5m(1)
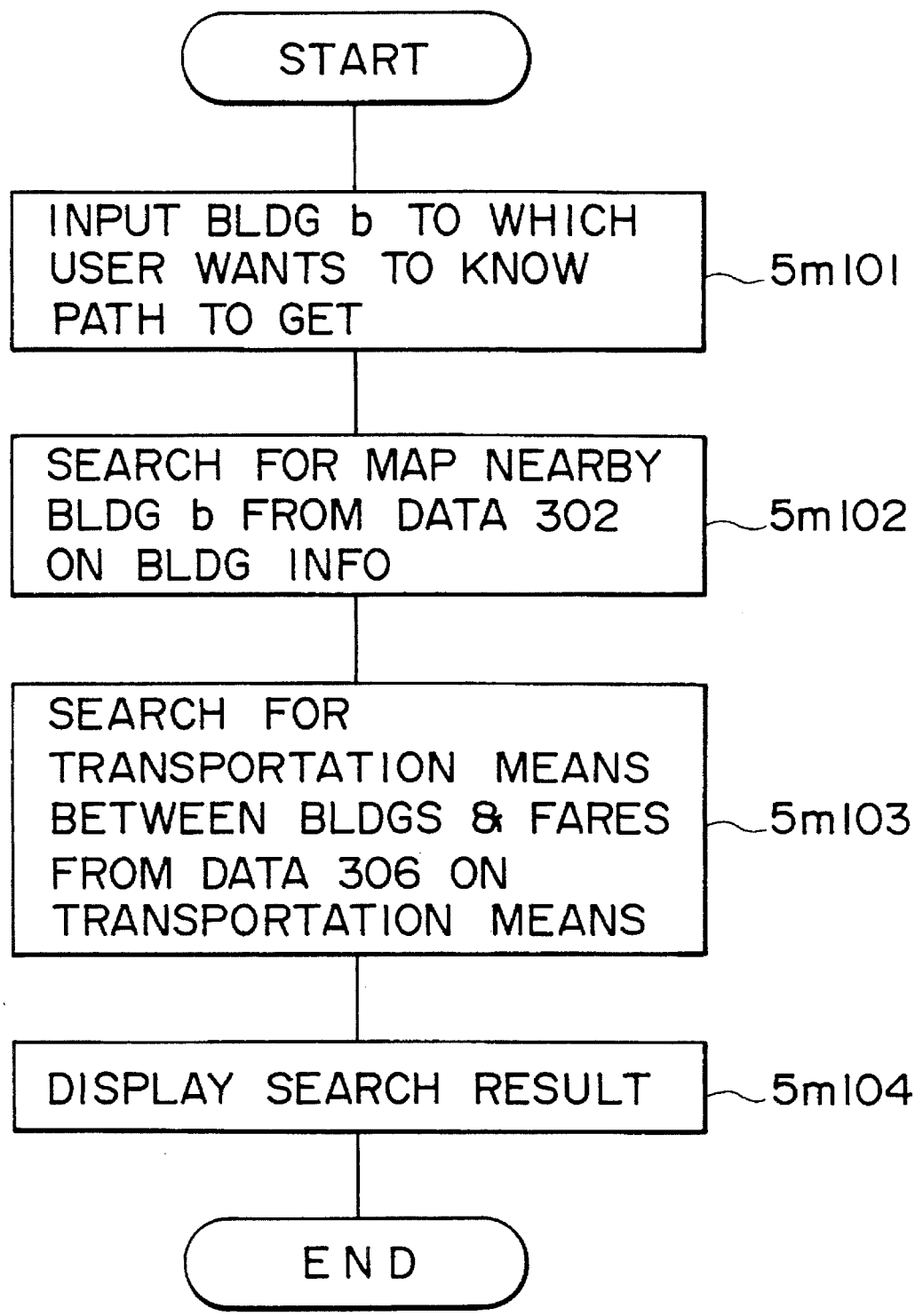

FIG. 5m(2)
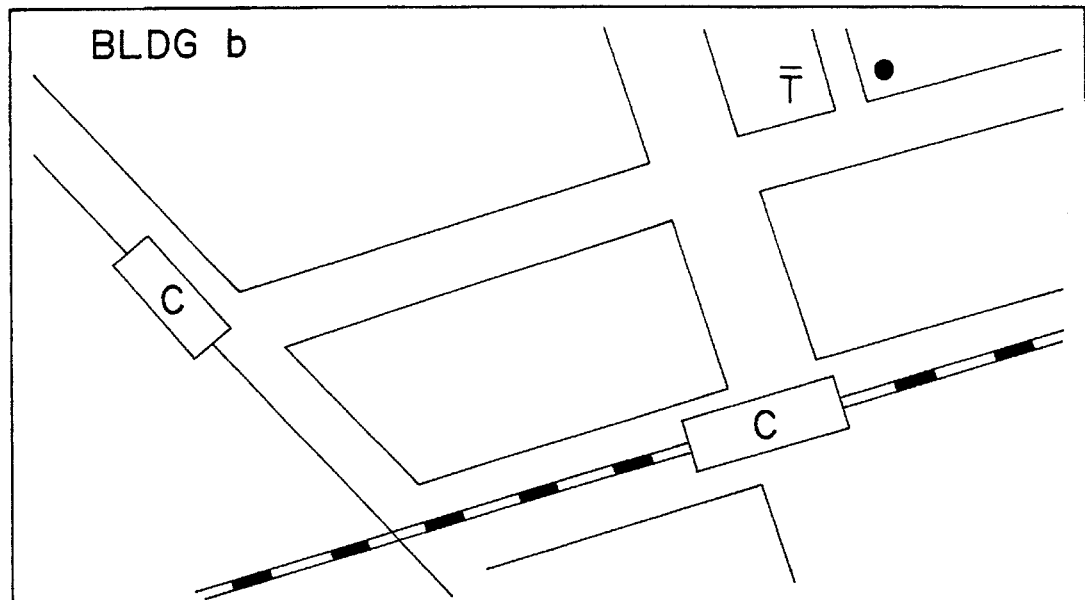
| | TRANSPORTATION MEANS | FARES |
|---|---|---|
| 1 | FROM STATION A OF TOKAIDO LINE THROUGH STATION B TO STATION C OF YOKOSUKA LINE (TIME: CA. 30 MINUTES) & WALKING FOR 2 MINUTES | YEN 210 |
| 2 | FROM STATION A OF SUBWAY TO STATION C (TIME: CA. 20 MINUTES) & WALKING FOR 3 MINUTES | YEN 260 |

F I G. 5m(3)
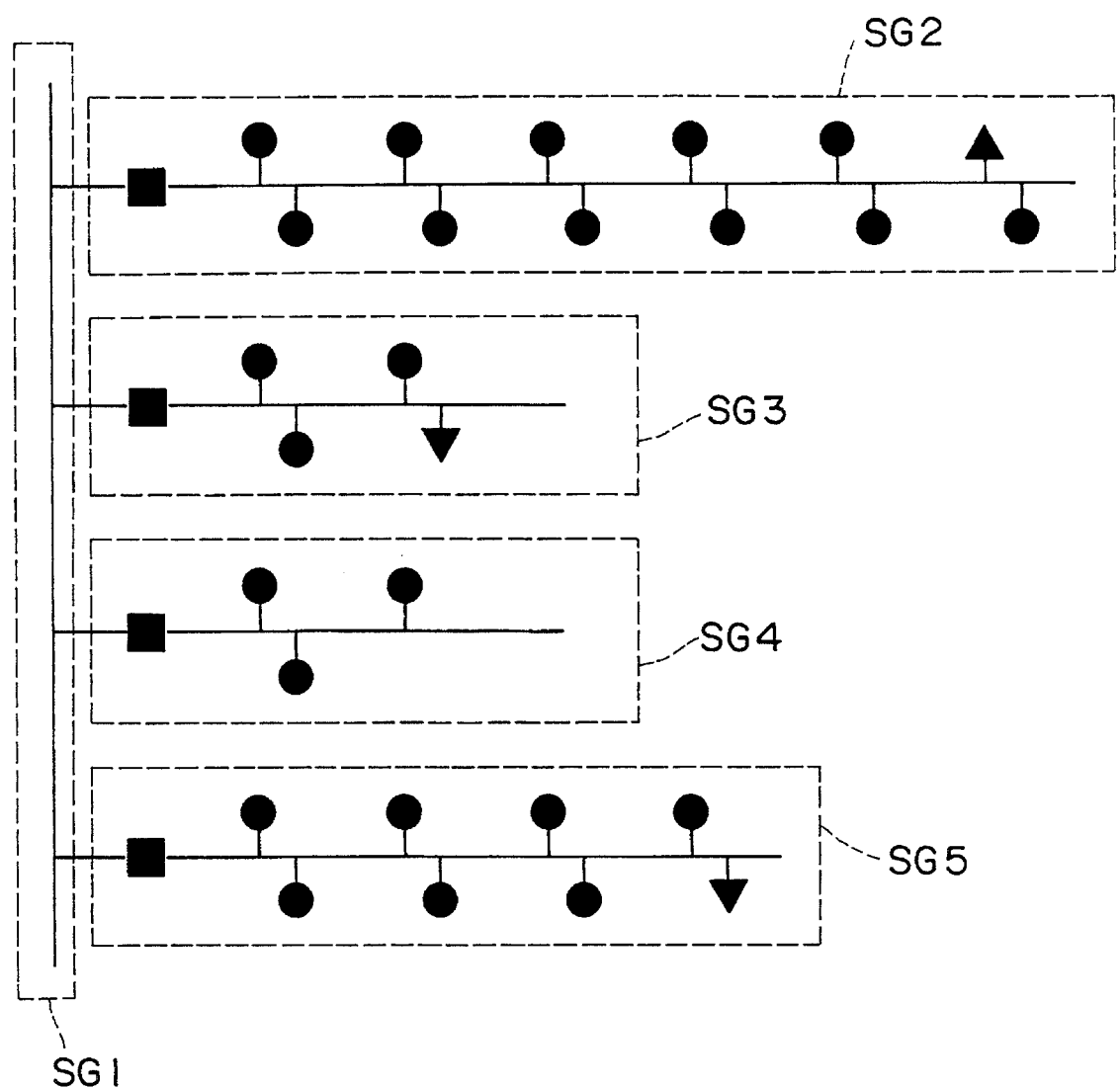

FIG. 5m(4)
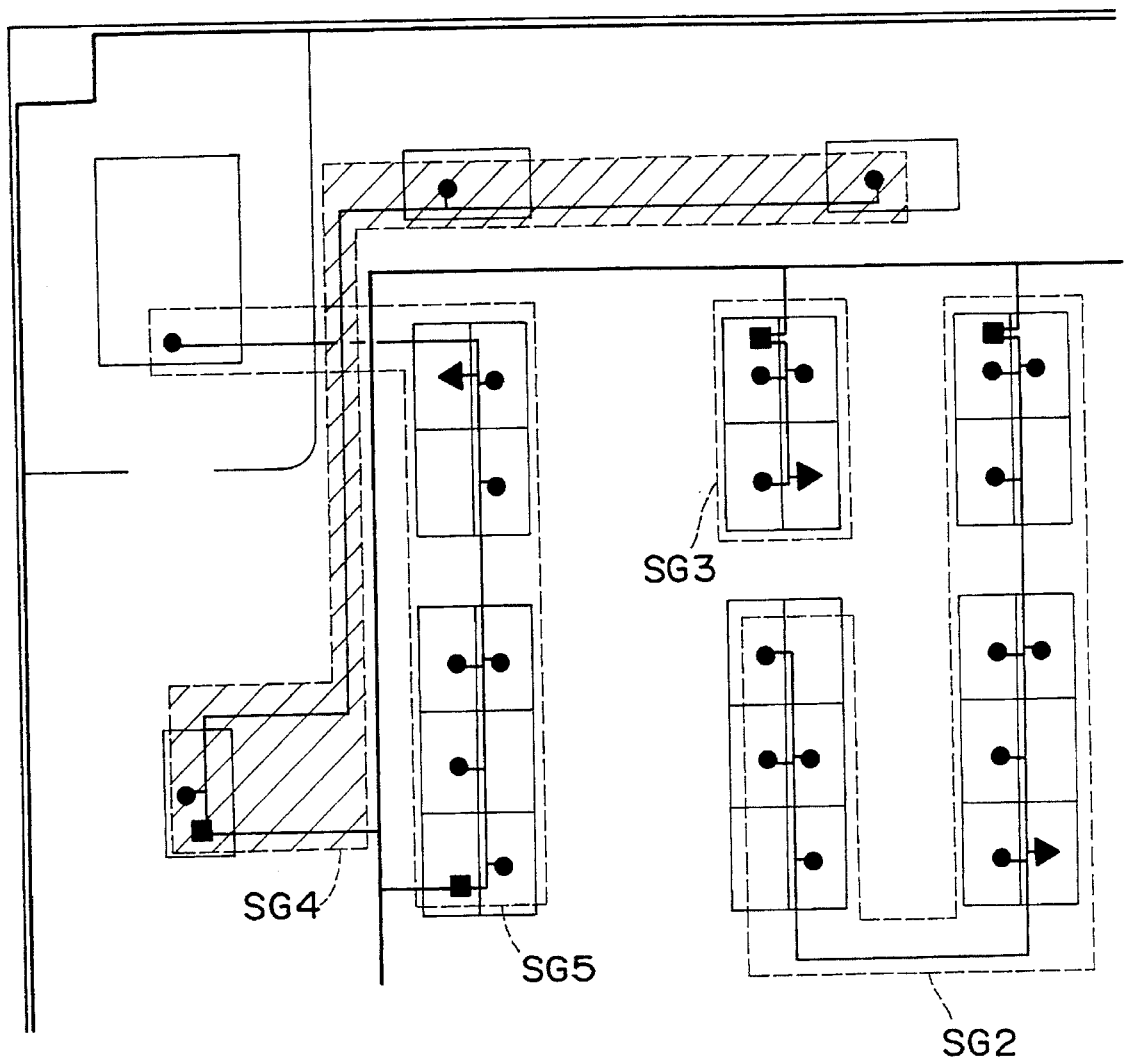

FIG. 5n(1)
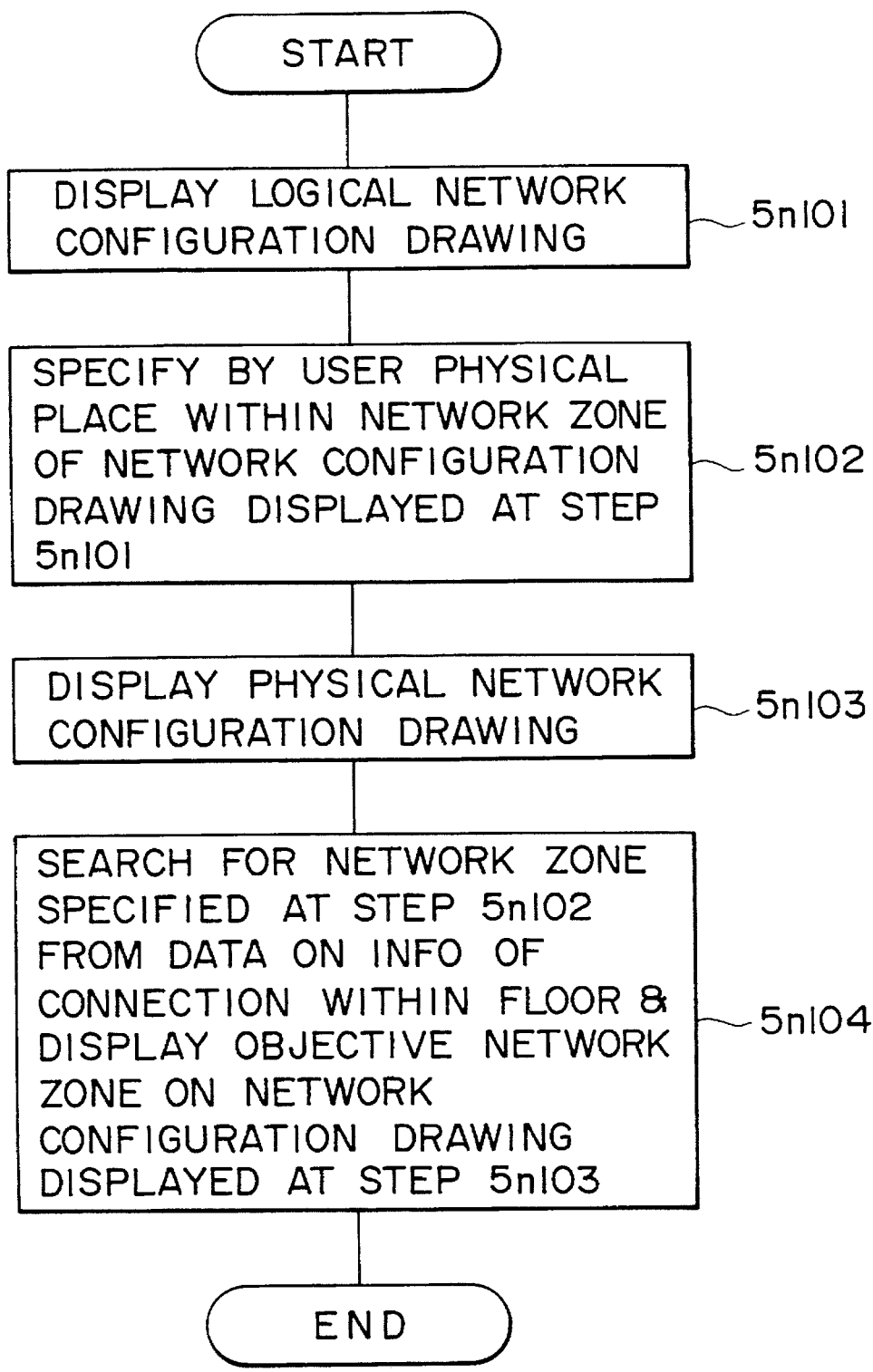

FIG. 5n(2)
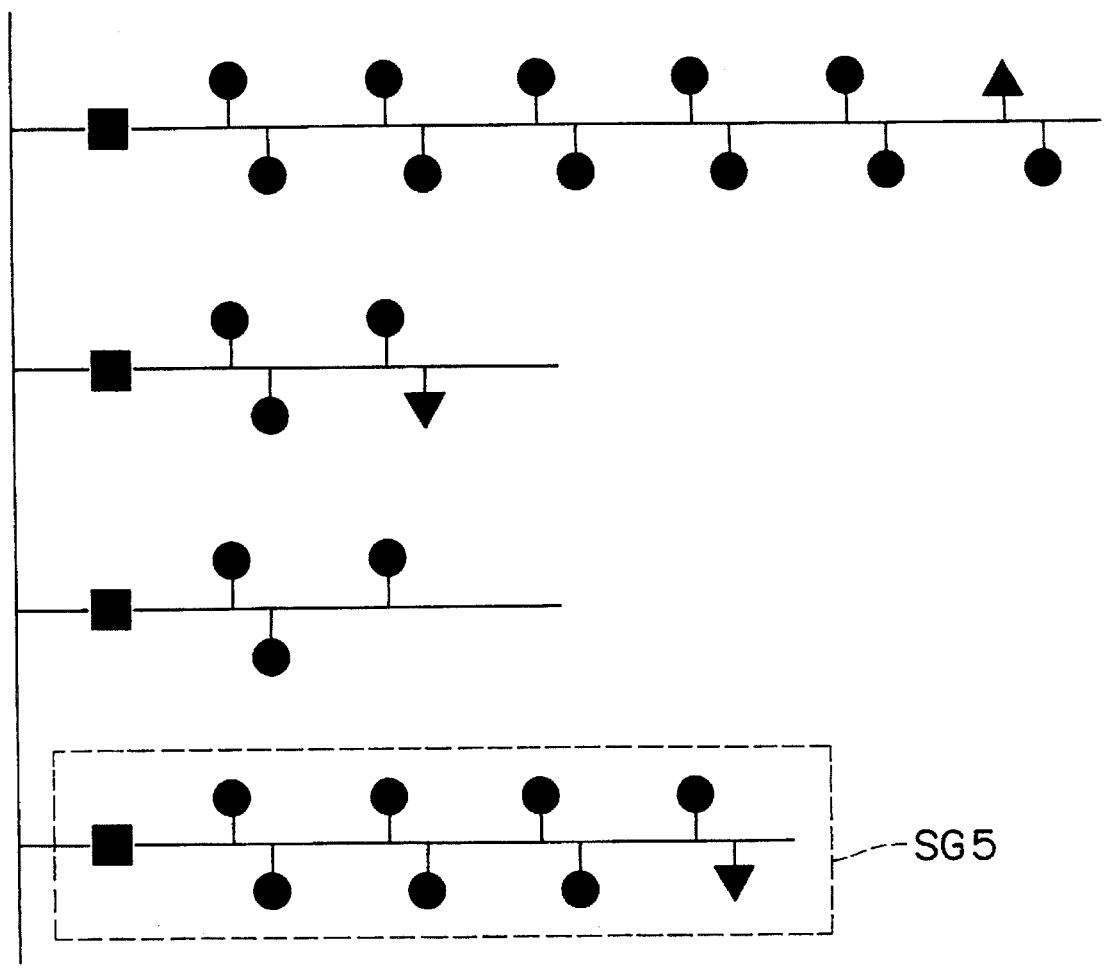

FIG. 5n(3)
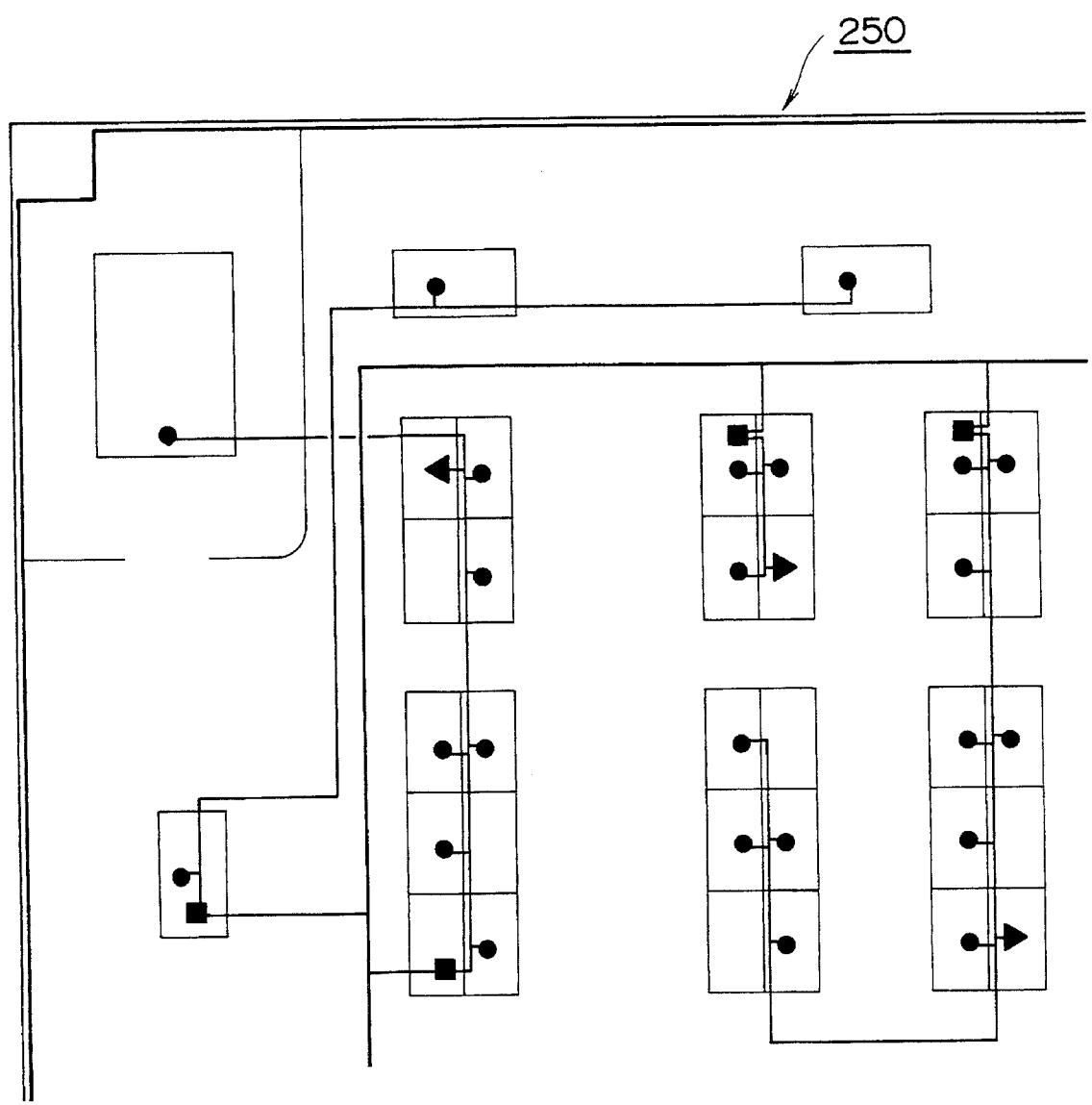

F I G. 5n(4)
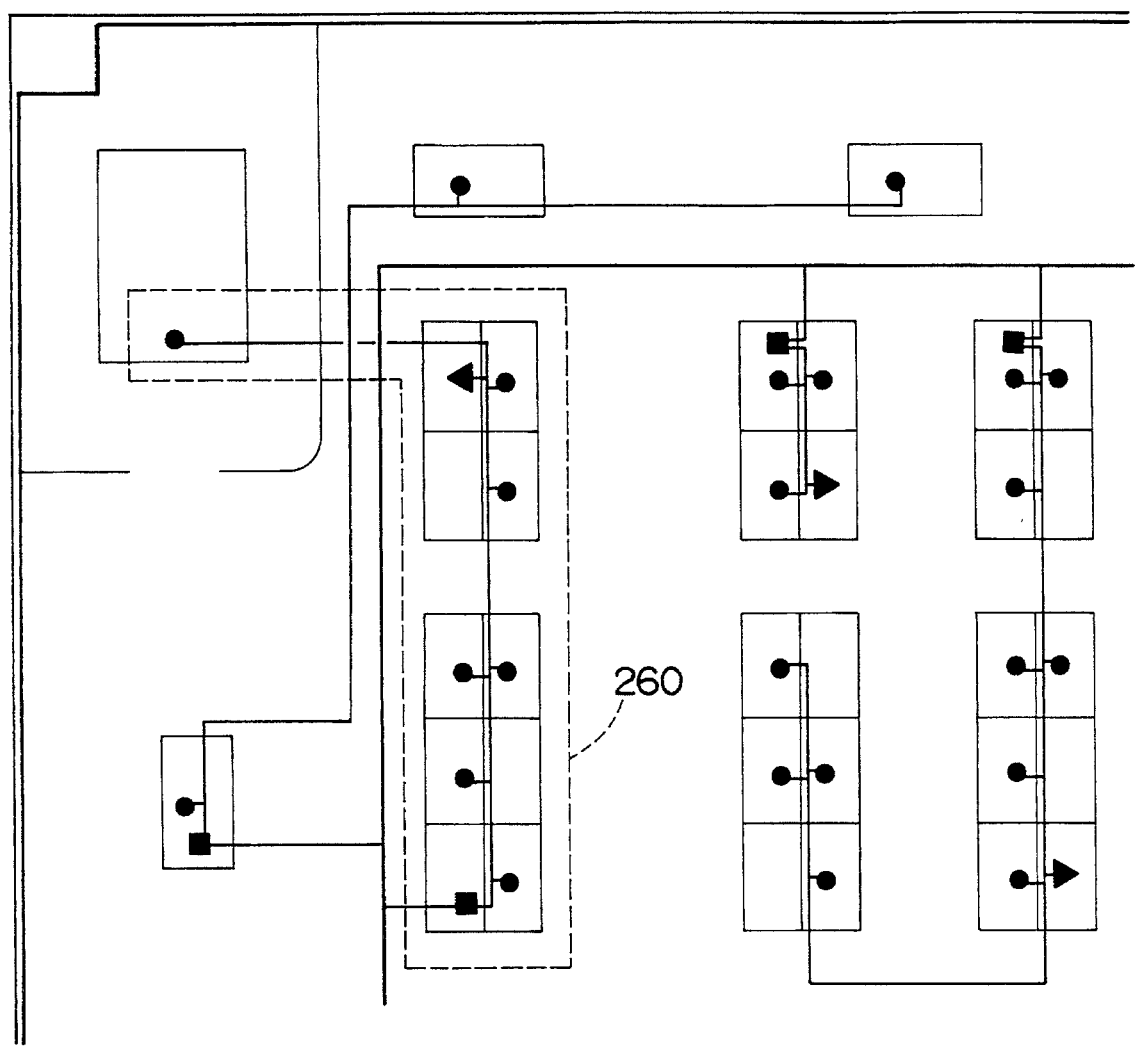

FIG. 5o(1)
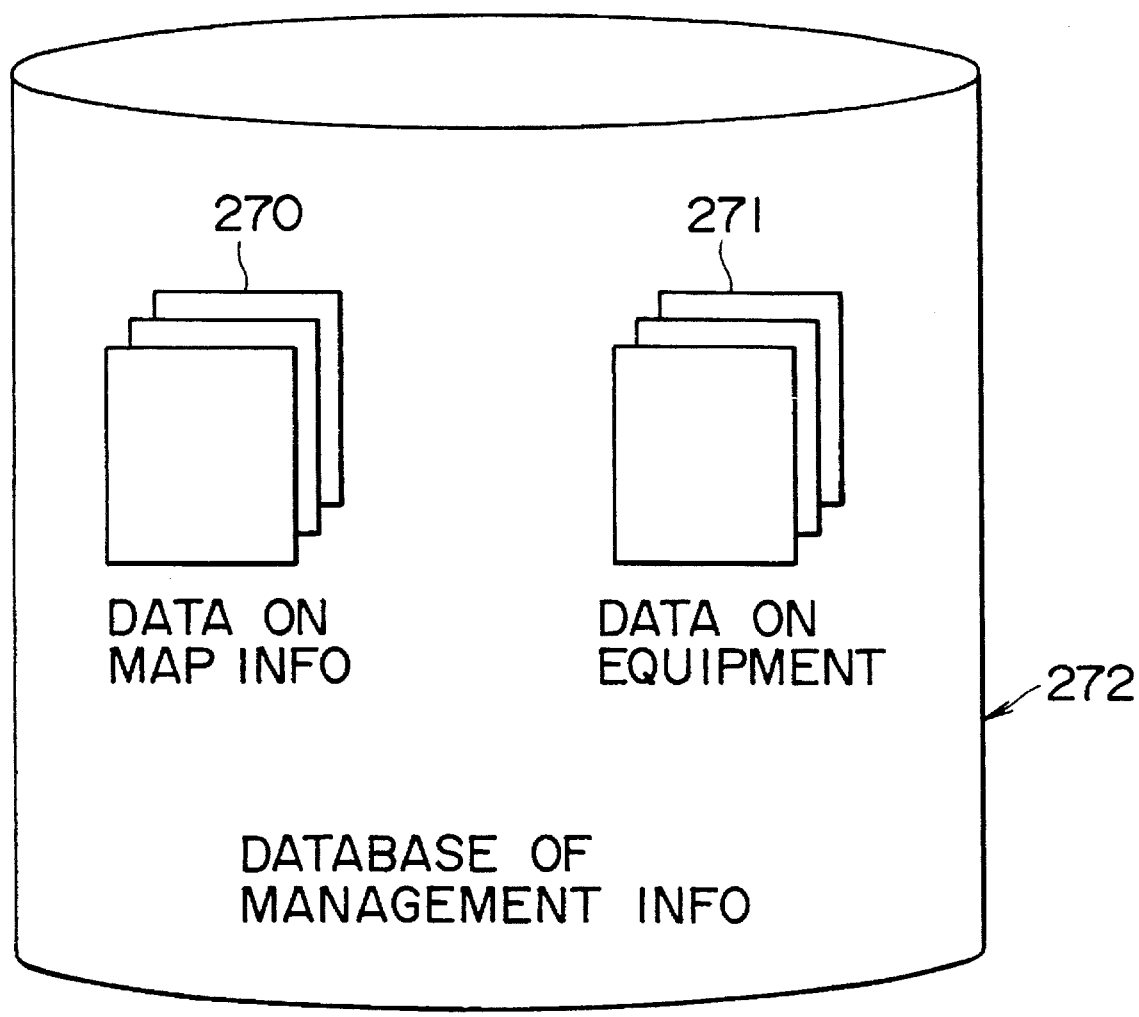

FIG. 5o(2)
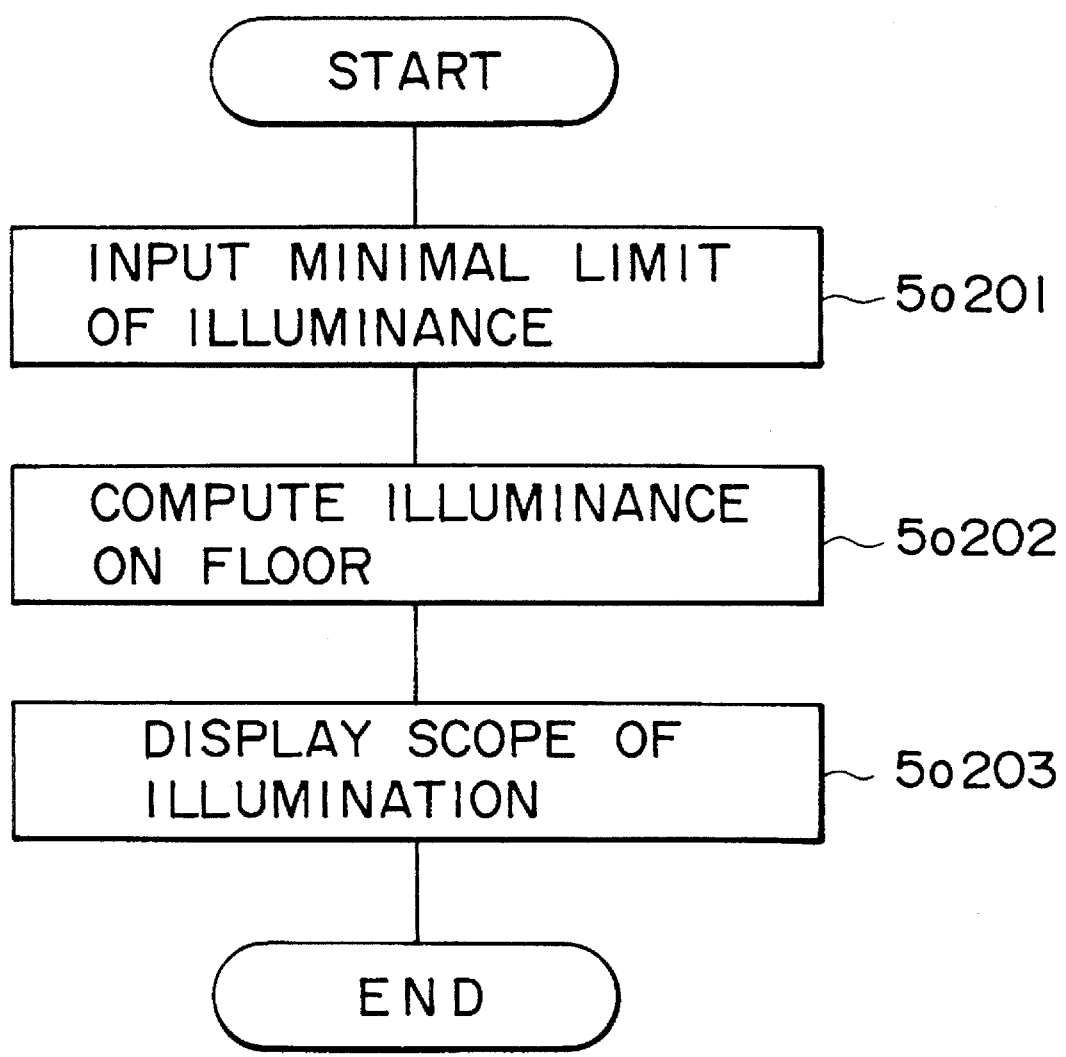

FIG. 5o(3)
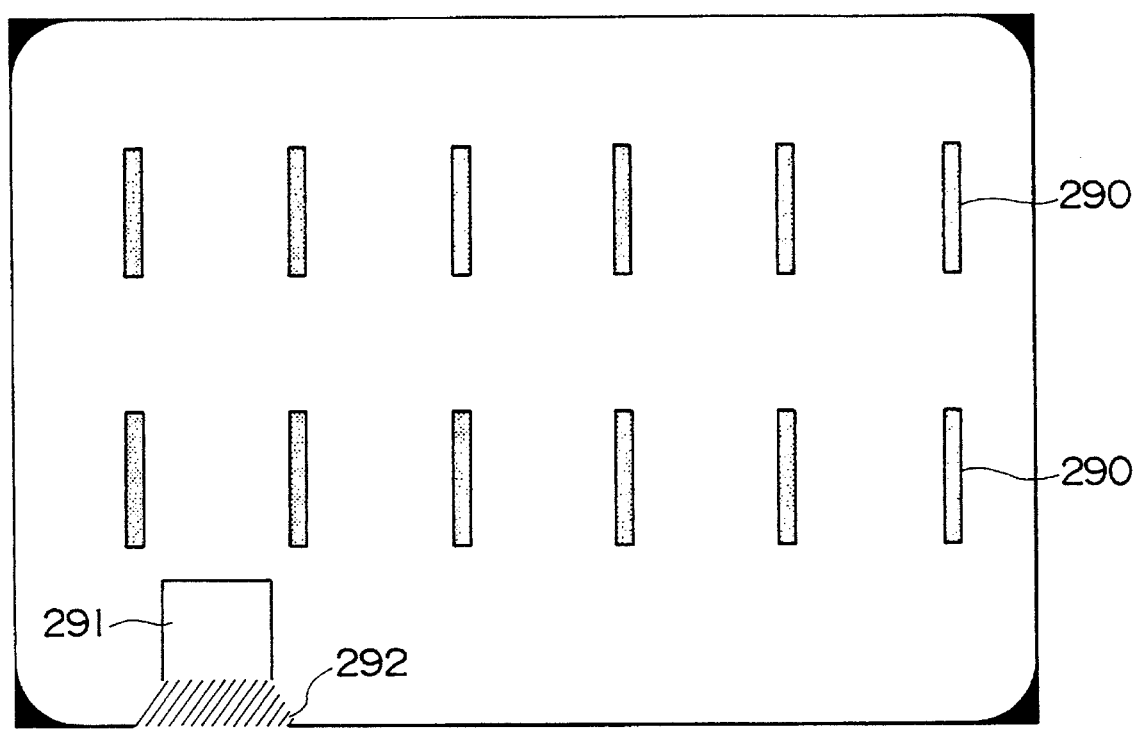
LEGEND : ▨ LESS ILLUMINATING PLACES 292

FIG. 5p(1)
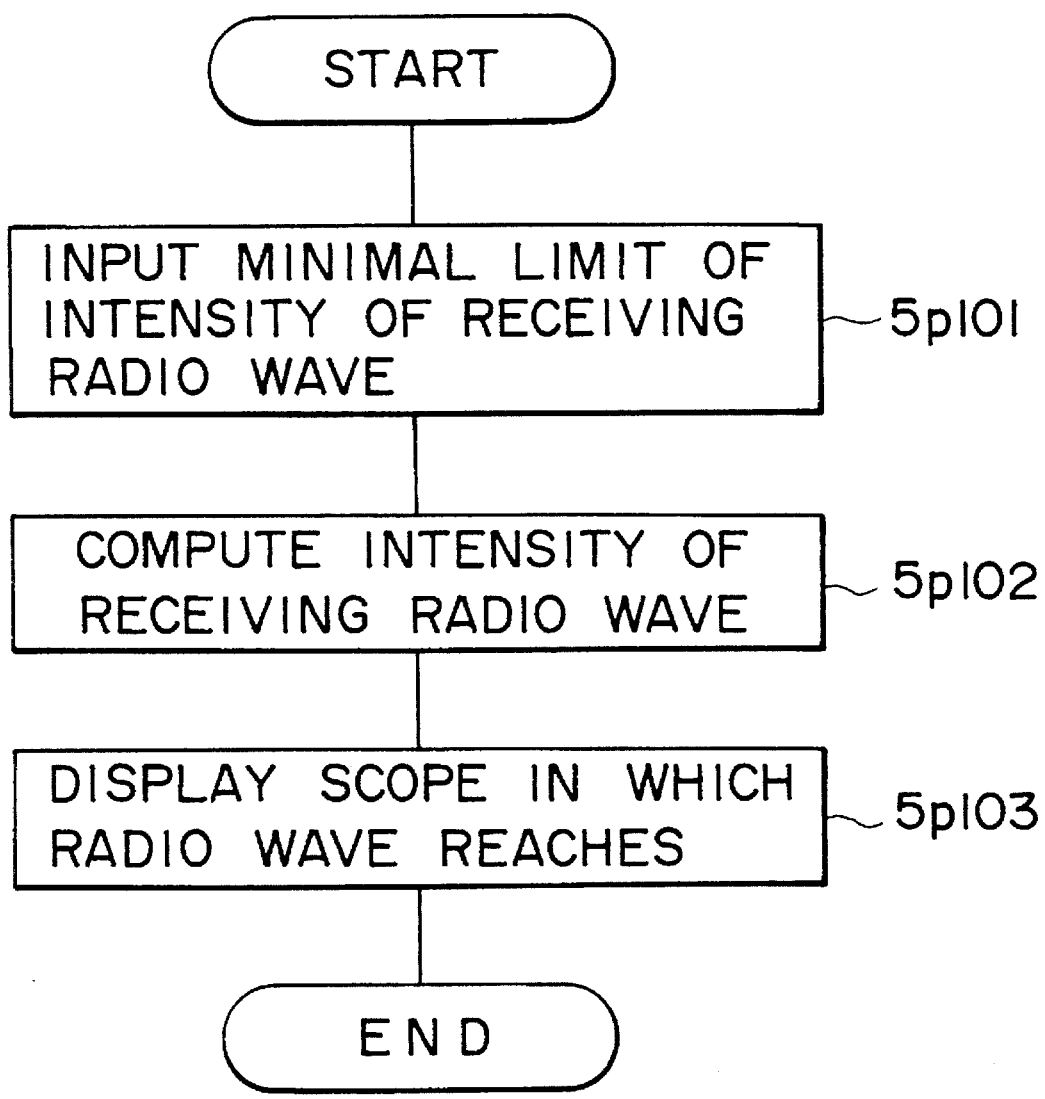

FIG. 5p(2)
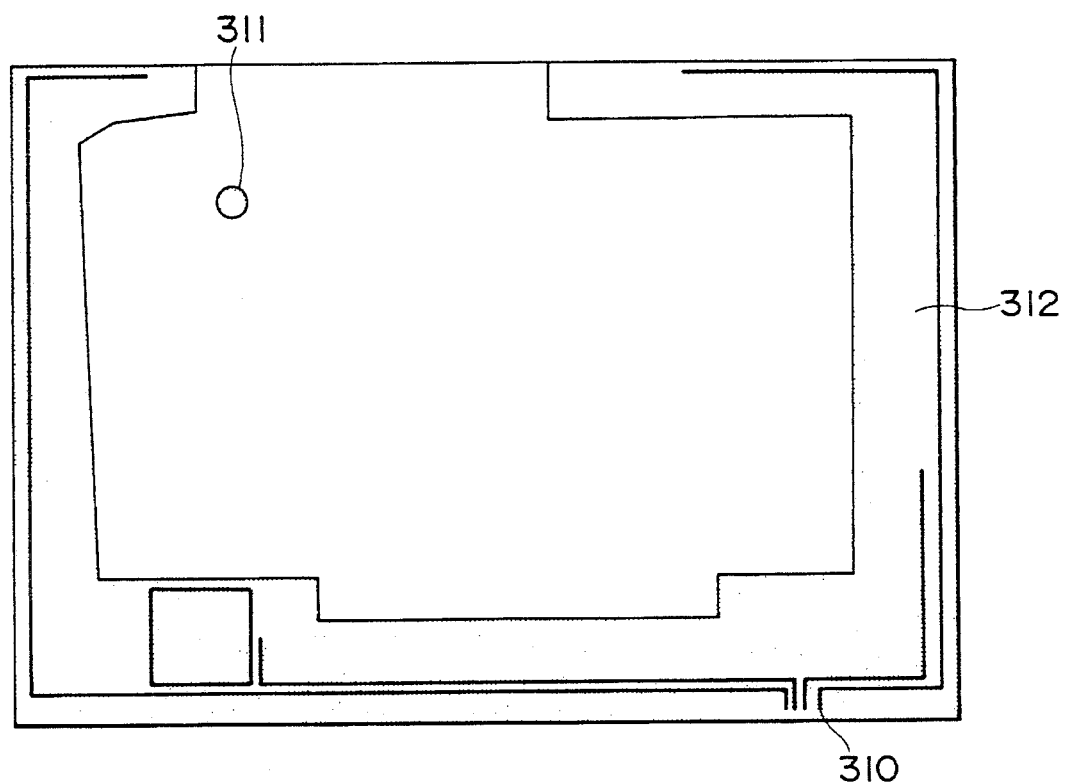
LEGEND  : SCOPE IN WHICH RADIO WAVE DOES NOT REACH FIG. 5q(1)
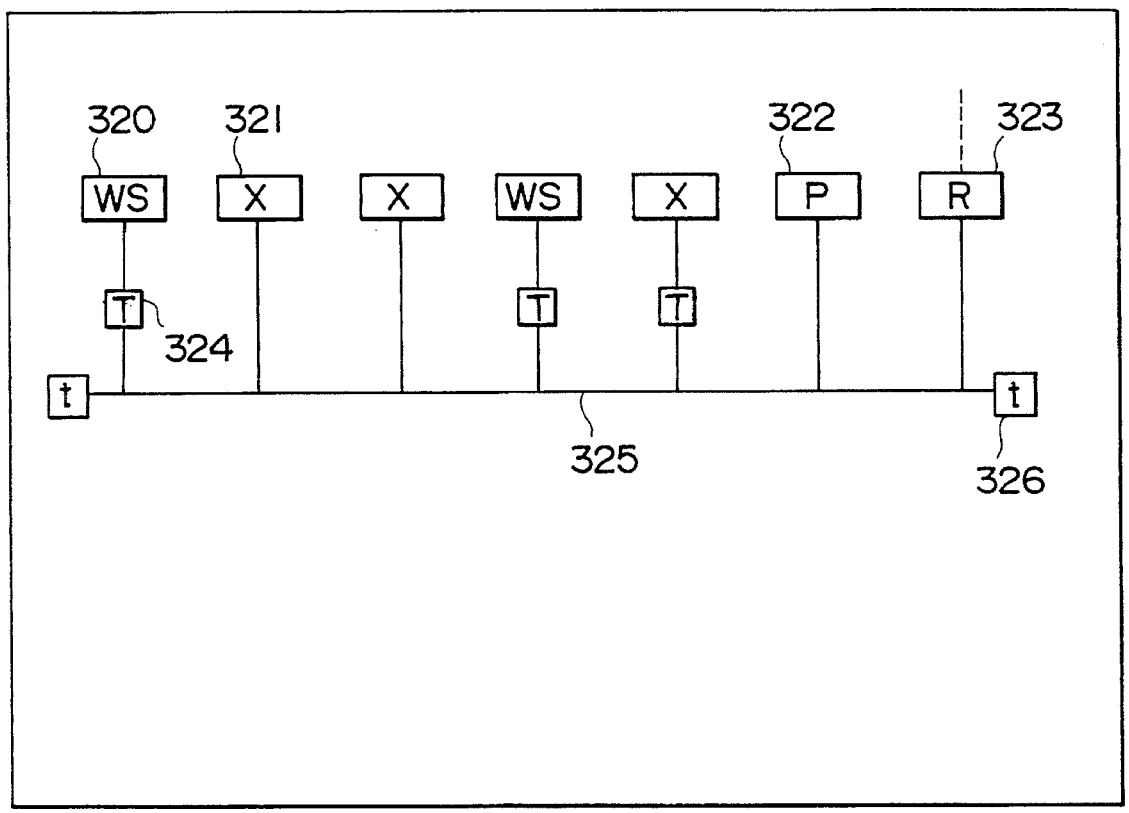

FIG. 5q(2)
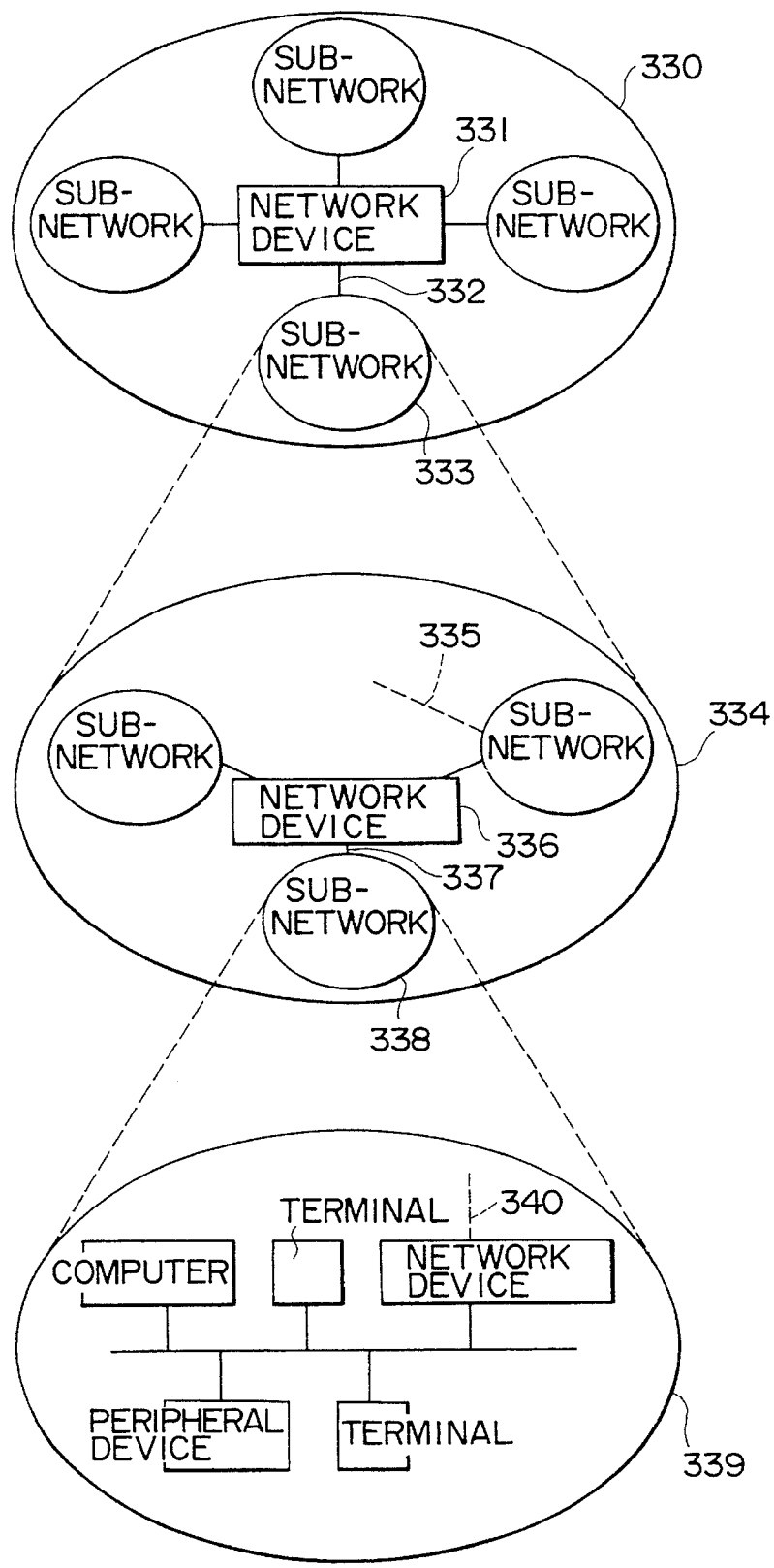

F I G. 5q(3)
NETWORK NO.
| NO. OF FIRST HIERARCHY | NO. OF SECOND HIERARCHY | NO. OF THIRD HIERARCHY |
|---|---|---|
342

FIG. 5q(4)
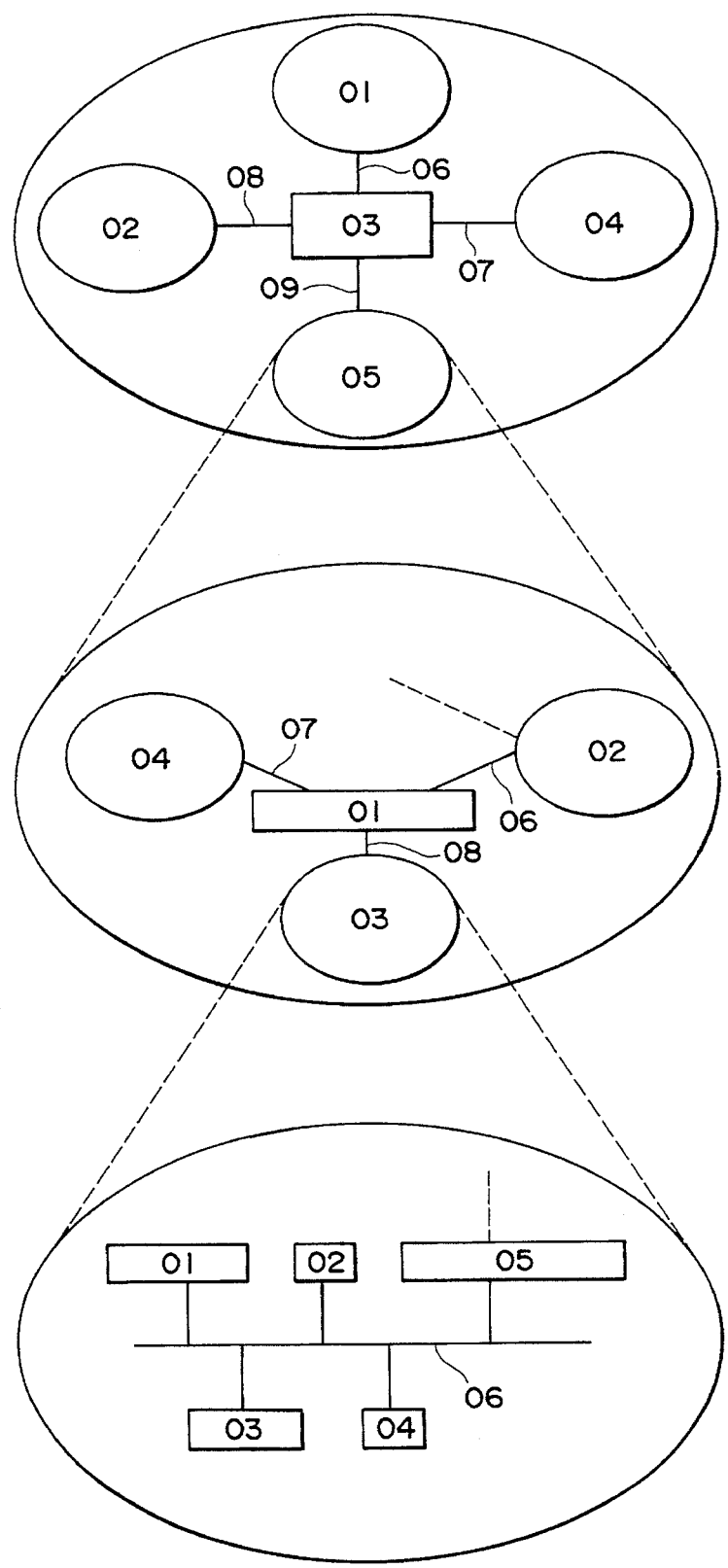

F I G. 5q(5)
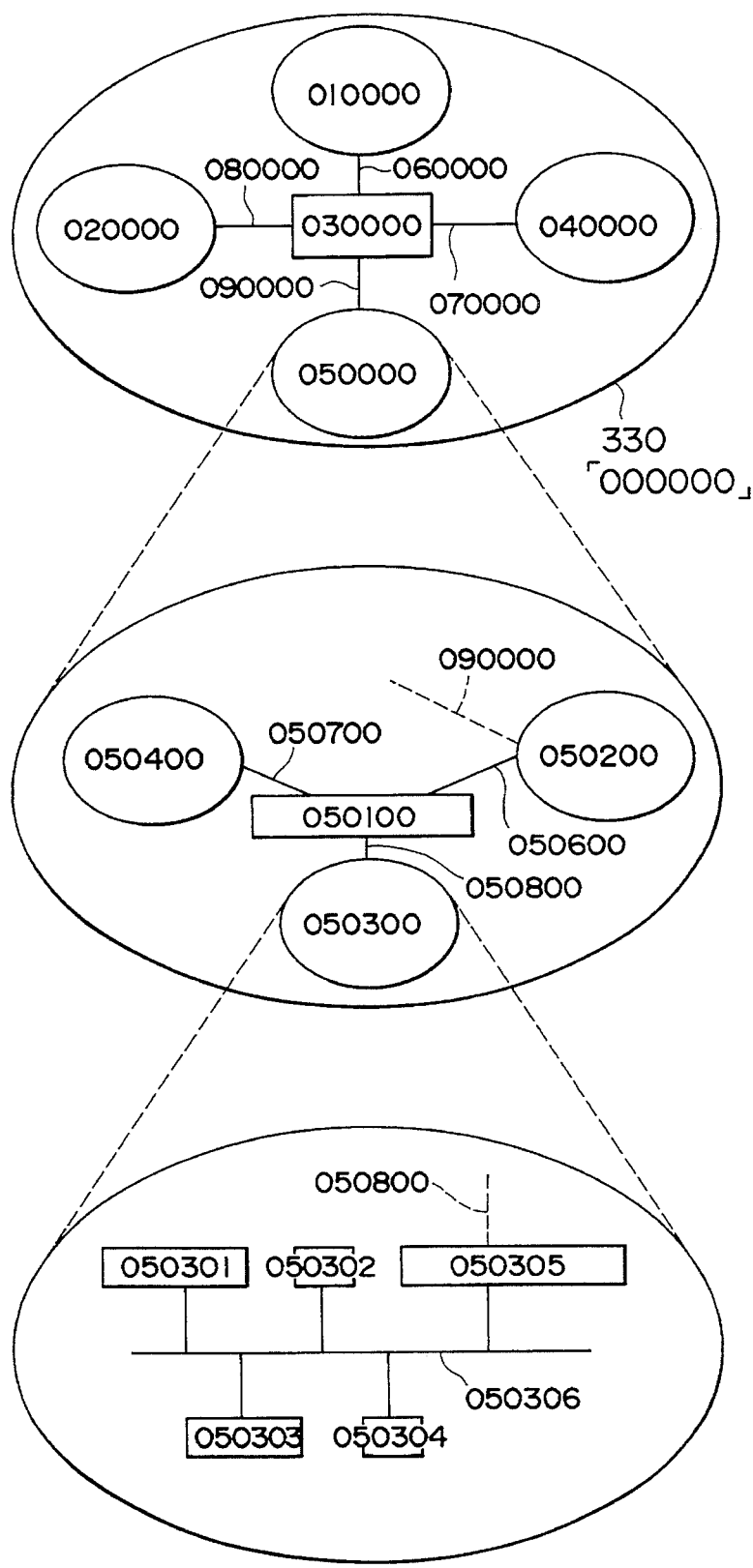

FIG. 5q(6)

DATABASE OF
RELATIONSHIPS OF NETWORKS

| DEVICES TO BE MANAGED & SUBNETWORKS | NETWORK NO. |
|---|---|
| COMPUTER A | 010101 |
| COMPUTER B | 010102 |
| ⋮ | ⋮ |
| TERMINAL C | 010103 |
| TERMINAL D | 010205 |
| ⋮ | ⋮ |
| NETWORK DEVICE E | 010104 |
| NETWORK DEVICE F | 010105 |
| ⋮ | ⋮ |
| PERIPHERAL DEVICE G | 010106 |
| PERIPHERAL DEVICE H | 010204 |
| ⋮ | ⋮ |
| CABLE NETWORK I | 010107 |
| CABLE NETWORK J | 010301 |
| ⋮ | ⋮ |
| SUBNETWORK K | 030000 |
| SUBNETWORK L | 020500 |
| ⋮ | ⋮ |

DATABASE OF
CONNECTION INFO

| NETWORK NO. | CONNECTION INFO |
|---|---|
| 050301 | 050306 |
| 050302 | 050306 |
| 050303 | 050306 |
| 050304 | 050306 |
| 050305 | 050306 |
| ⋮ | ⋮ |

380

F I G. 5q(8)

DATABASE OF DISPLAY INFO    /390

| NETWORK NO. | SHAPE | CHARAC-TER | COLOR | PATTERN | |
|---|---|---|---|---|---|
| 010101 | SQUARE | WS | WHITE | NONE | ... |
| 010102 | LINE |  | WHITE | NONE | ... |
| 010103 | SQUARE | X | WHITE | NONE | ... |
| 010104 | LINE |  | WHITE | NONE | ... |
| 010105 | CIRCLE | Net | WHITE | NONE | ... |
| ⋮ | ⋮ | ⋮ | ⋮ | ⋮ | ⋮ |

F I G. 5q(9)

DATABASE OF TRUNK TOPOLOGY    /400

| NETWORK NO. | TOPOLOGY | TRUNK DEVICE TO BE MANAGED |
|---|---|---|
| 010100 | BUS | 010105 |
| 010200 | RING | 010204 |
| 010300 | STAR | 010312 |
| ⋮ | ⋮ | |

F I G. 5r(1a)
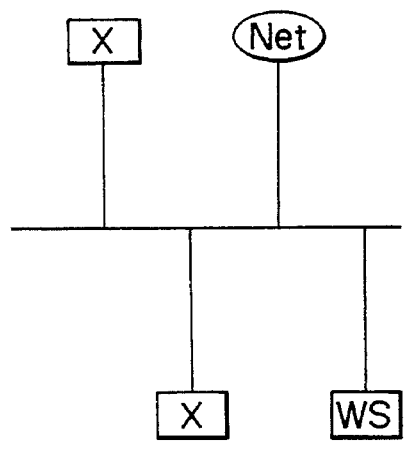
F I G. 5r(1b)
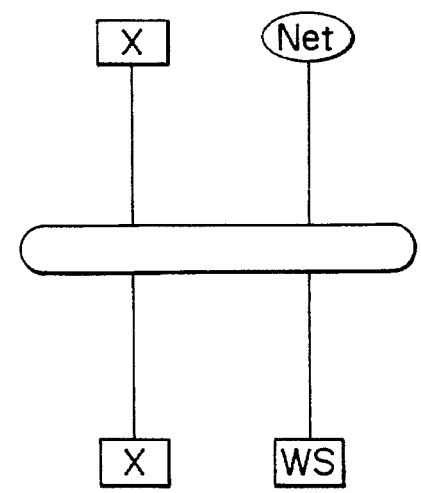
F I G. 5r(1c)
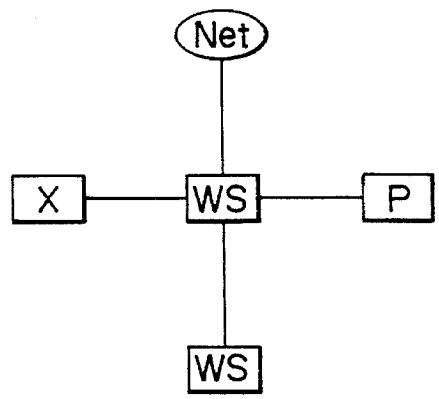
F I G. 5r(1d)
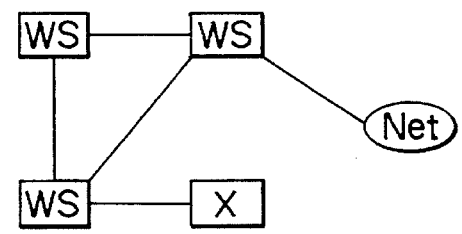

FIG. 5r(2)
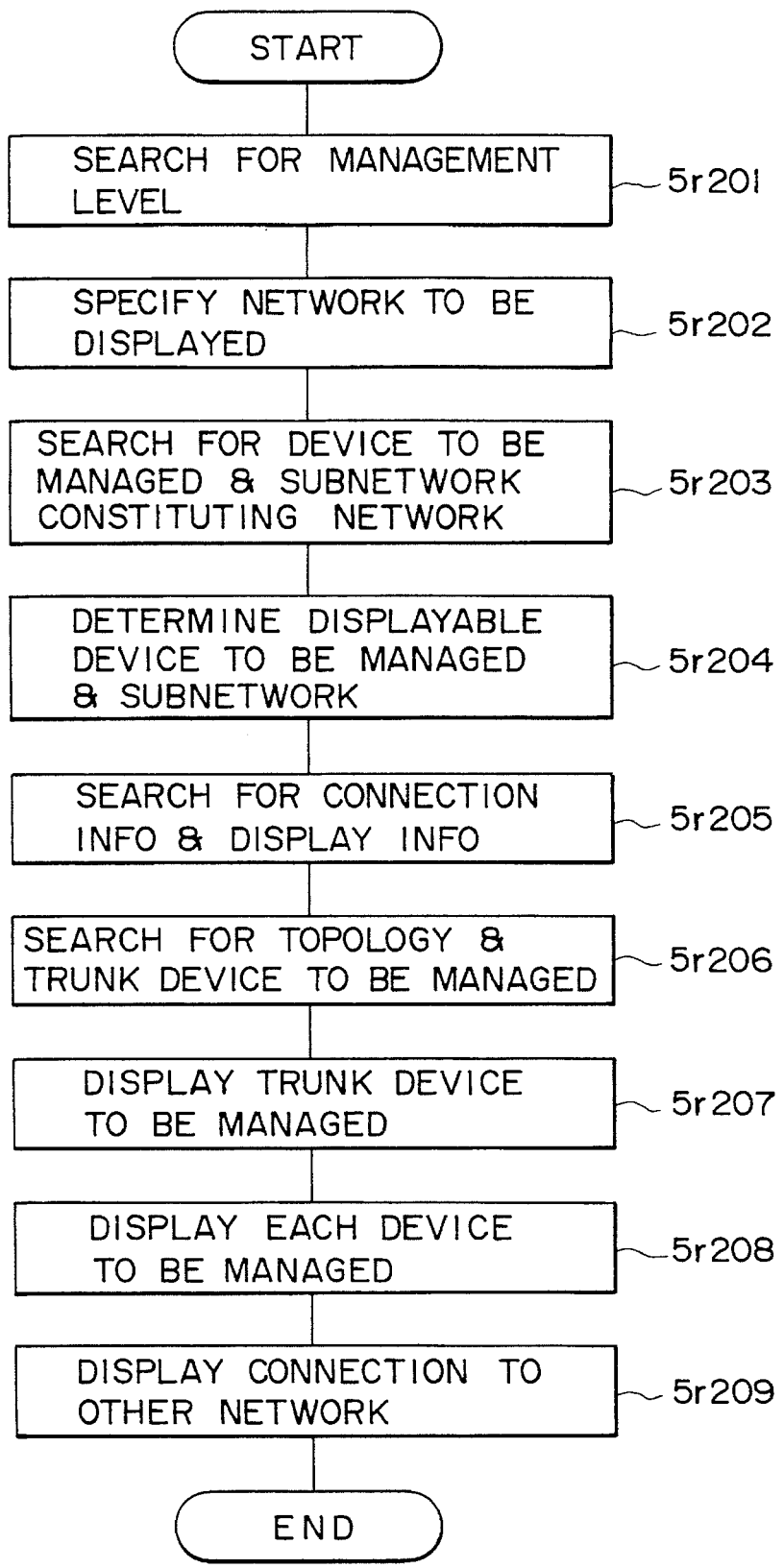

FIG. 5r(3)

DATABASE OF
MANAGEMENT LEVEL

| LOG-IN NAME | MANAGEMENT LEVEL |
|---|---|
| shigeru | 010101 |
| yoshiki | 010102 |
| takayuki | |
| ⋮ | ⋮ |

430

FIG. 5r(4a)     FIG. 5r(4b)
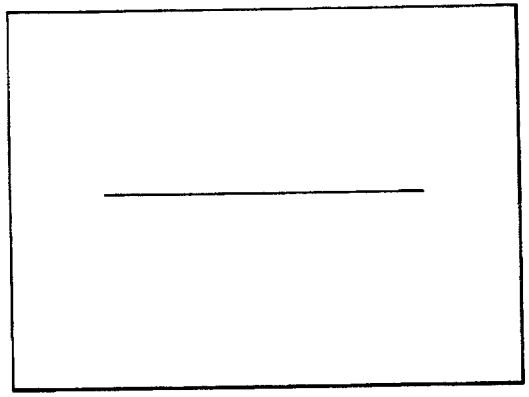
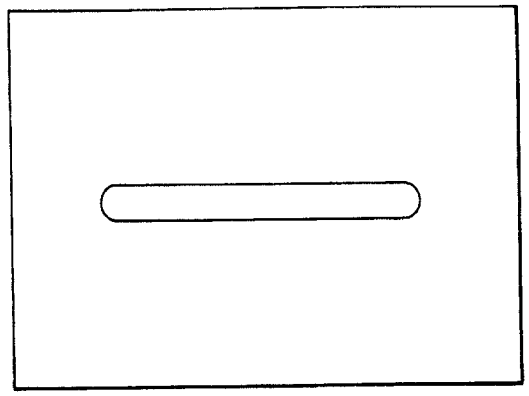
FIG. 5r(4c)
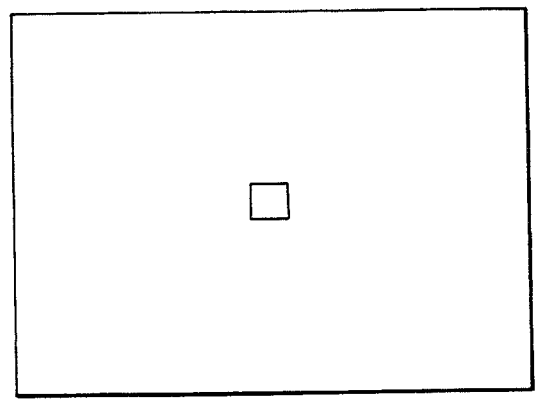

FIG. 5r(5)
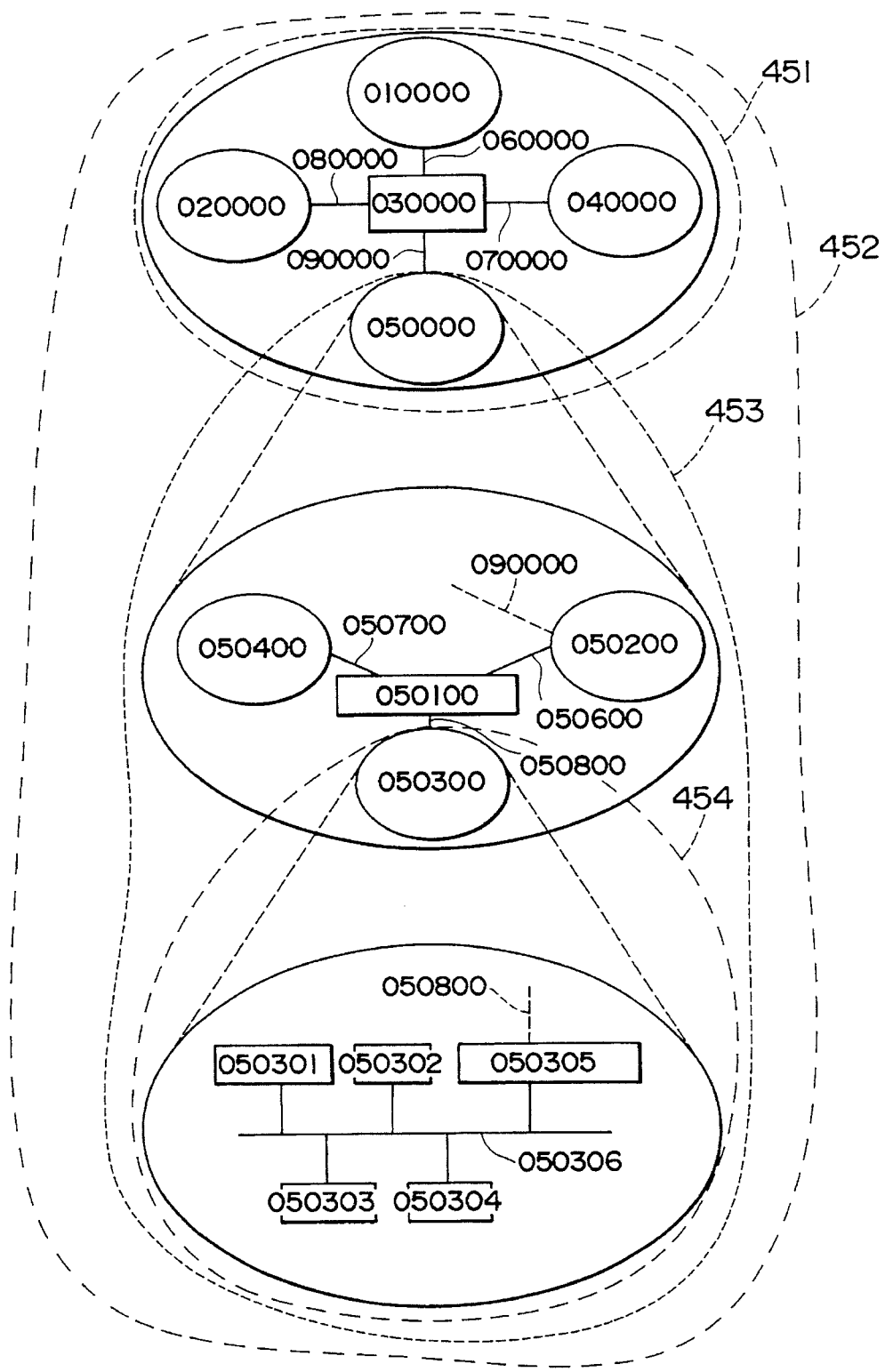

FIG. 5s(1)
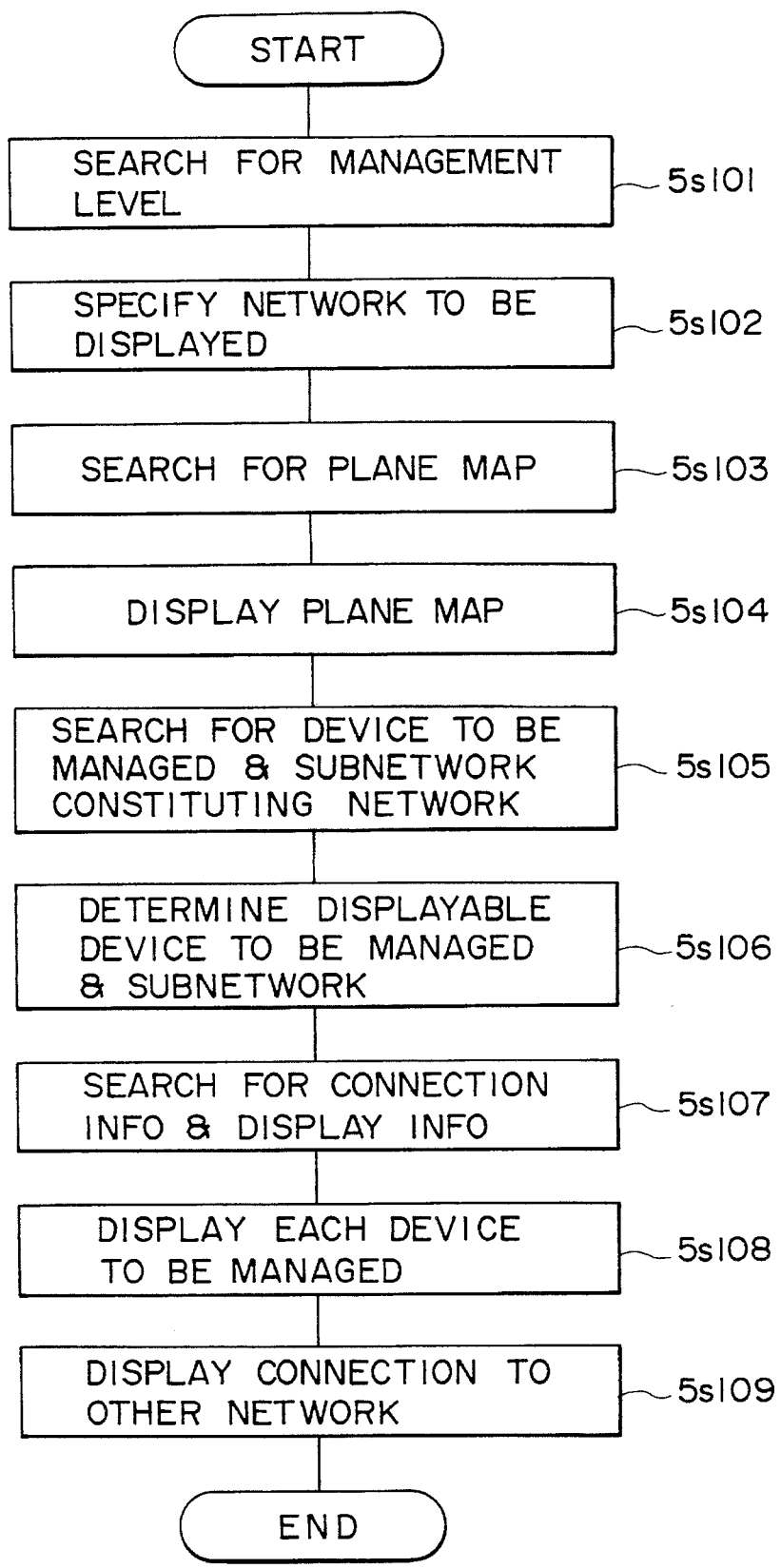

FIG. 5s(2)
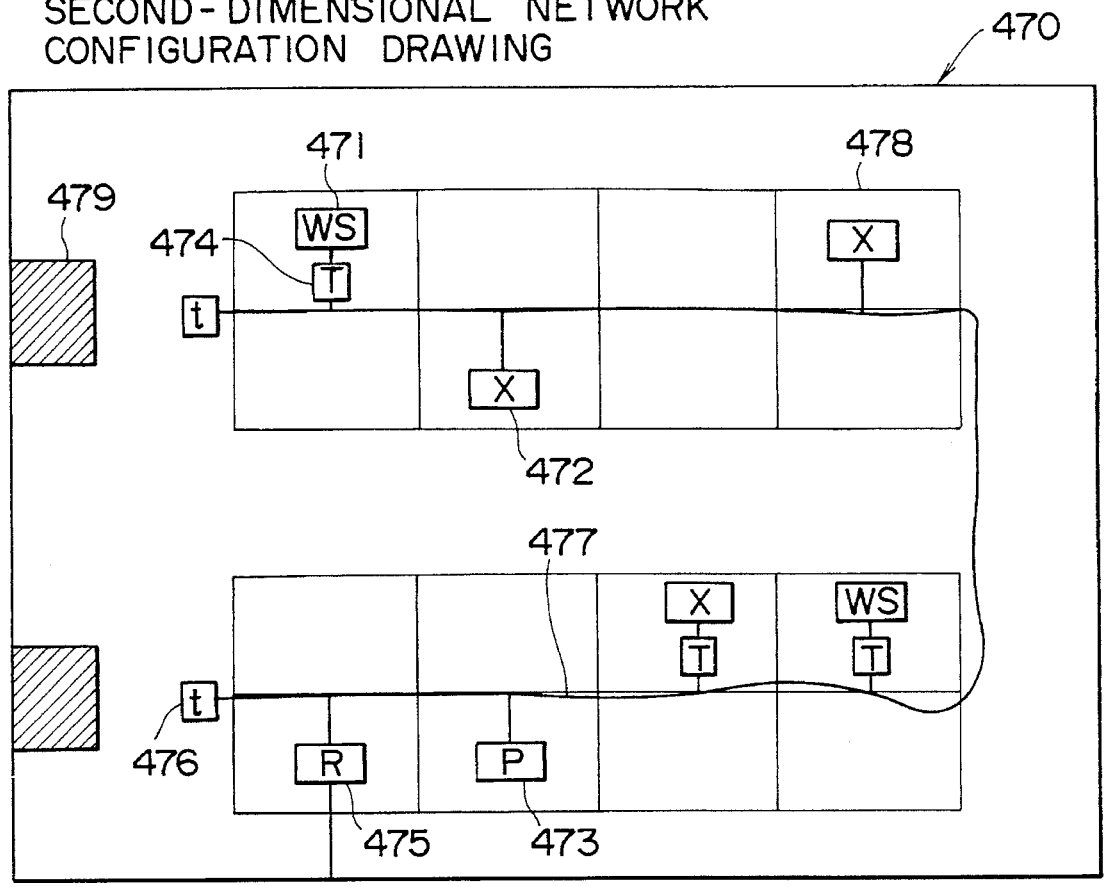
SECOND-DIMENSIONAL NETWORK CONFIGURATION DRAWING
FIG. 5s(3)
| NETWORK NO. | PLANE MAP |
|---|---|
| 010100 | map 1 |
| 010200 | map 2 |
| 010300 | map 3 |
| ⋮ | ⋮ |

FIG. 5s(4)
| NETWORK NO. | POSITION OF DISPLAY |
|---|---|
| 010101 | (10, 5) |
| 010102 | (25, 3) |
| 010103 | (125, 35) |
| ⋮ | ⋮ |
490
FIG. 5t(1)
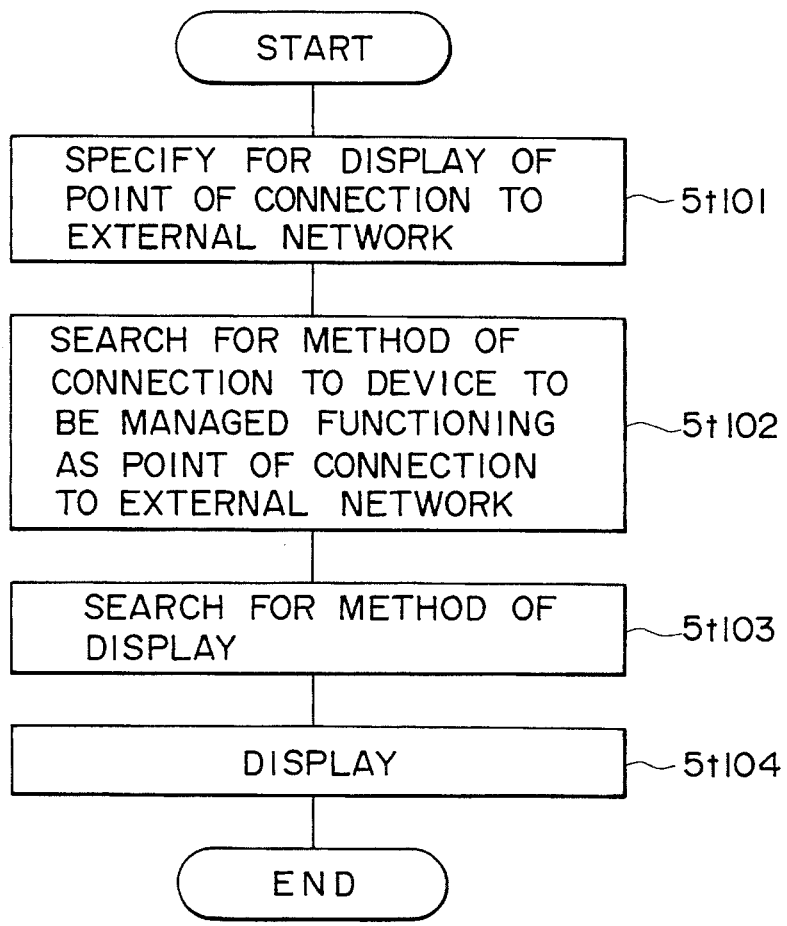

F I G. 5t(2)

DATABASE OF
METHOD OF CONNECTION  510

| NETWORK NO. OF DEVICE TO BE MANAGED | METHOD OF CONNECTION |
|---|---|
| 010543 | WIRELESS |
| 019845 | ETHER |
| 769343 | OUTER LINE |
|  |  |

F I G. 5t(3)

520

| METHOD OF CONNECTION | METHOD OF DISPLAY |
|---|---|
| WIRELESS | RED DOT LINE |
| ETHER | YELLOW SOLID LINE |
| OUTER LINE | ORANGE DOT LINE |
|  |  |

FIG. 5t(4)
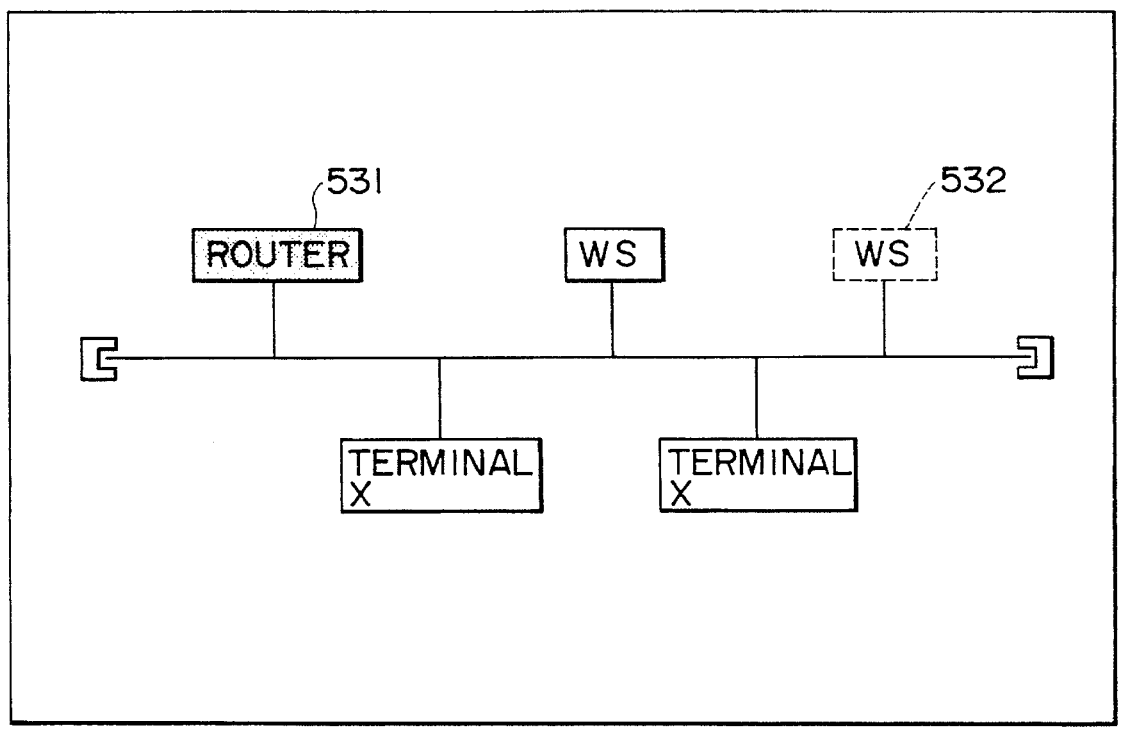

FIG. 5u(1)
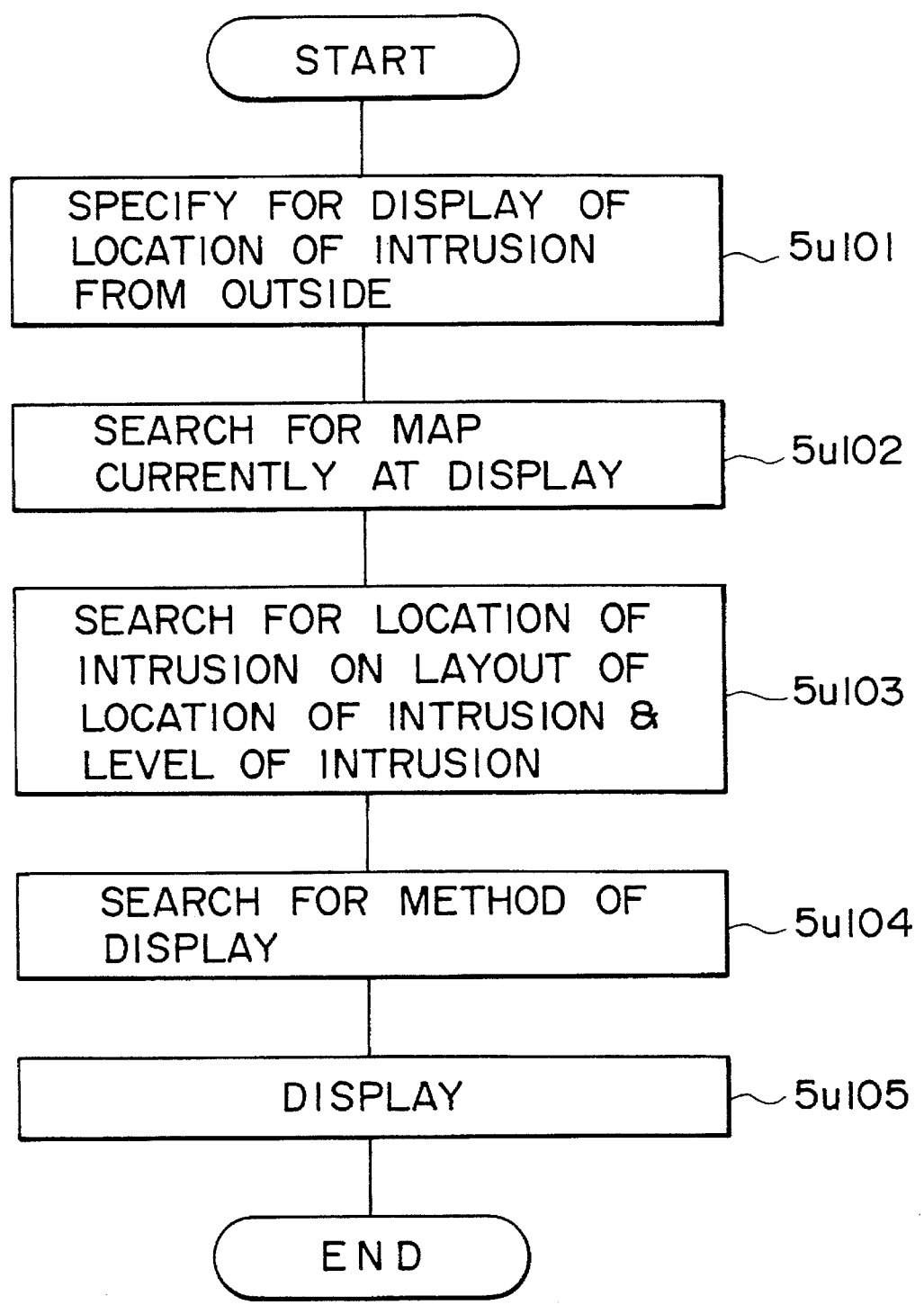

FIG. 5u(2)

| NO. OF PLANE MAP | POSITION ON PLANE MAP | LEVEL OF INTRUSION |
|---|---|---|
| 3 | (24, 58) | 2 |
| 3 | (876, 9) | 3 |
| 4 | (5, 246) | 5 |
|  |  |  |

| LEVEL OF INTRUSION | METHOD OF DISPLAY |
|---|---|
| 2 | RED CIRCLE |
| 3 | YELLOW SQUARE |
| 5 | ORANGE TRIANGLE |
|  |  |

560

F I G. 5u(4)
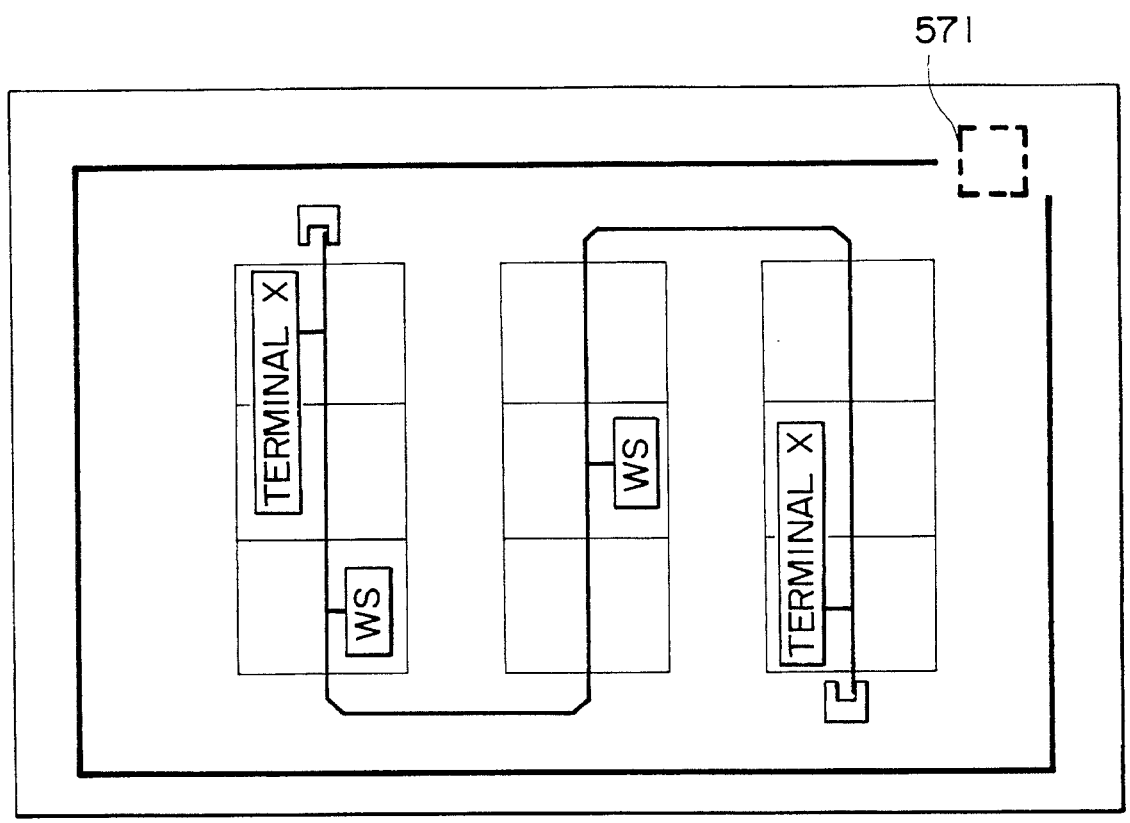

FIG. 5v(1)
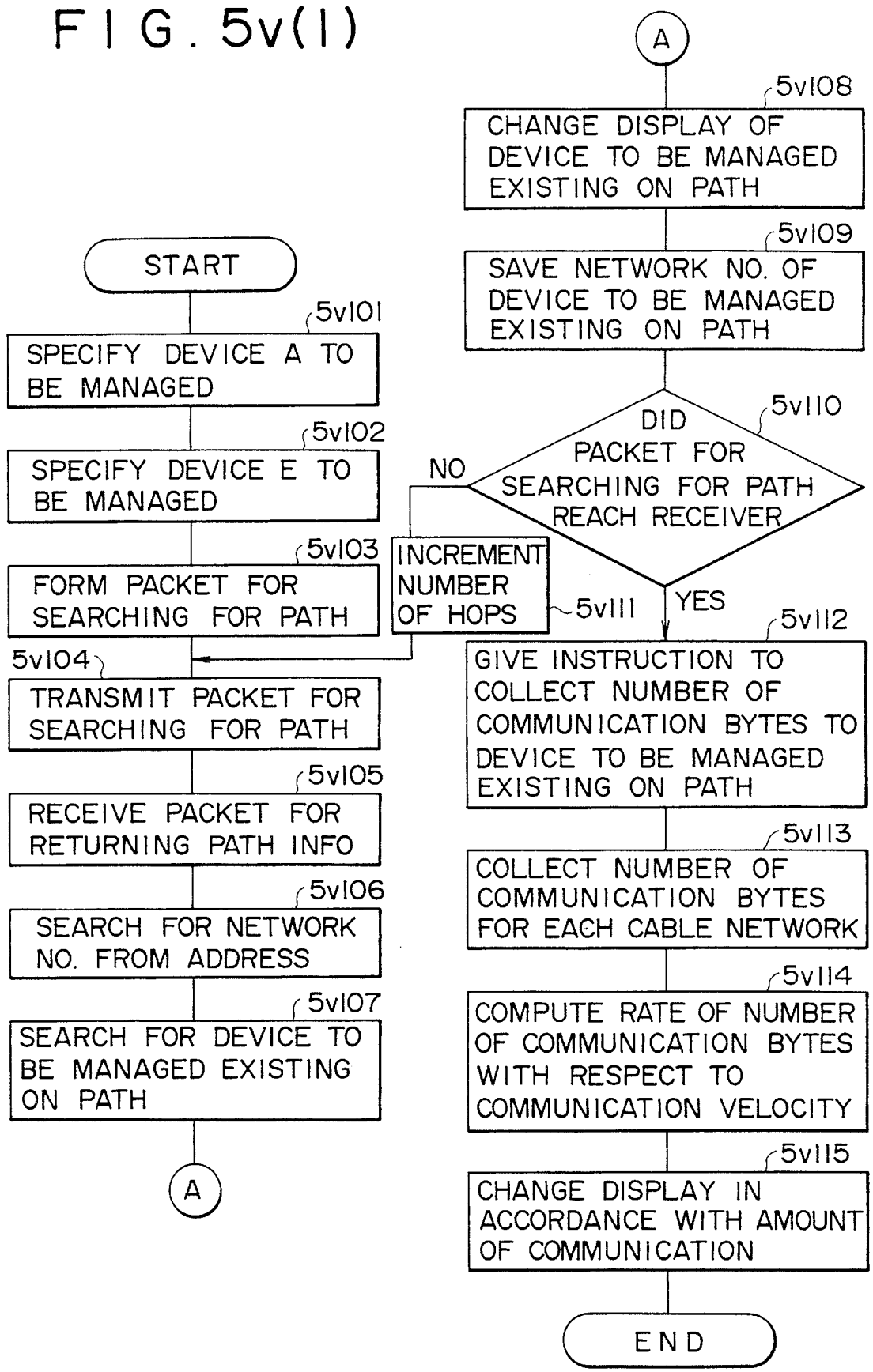

FIG. 5v(2)
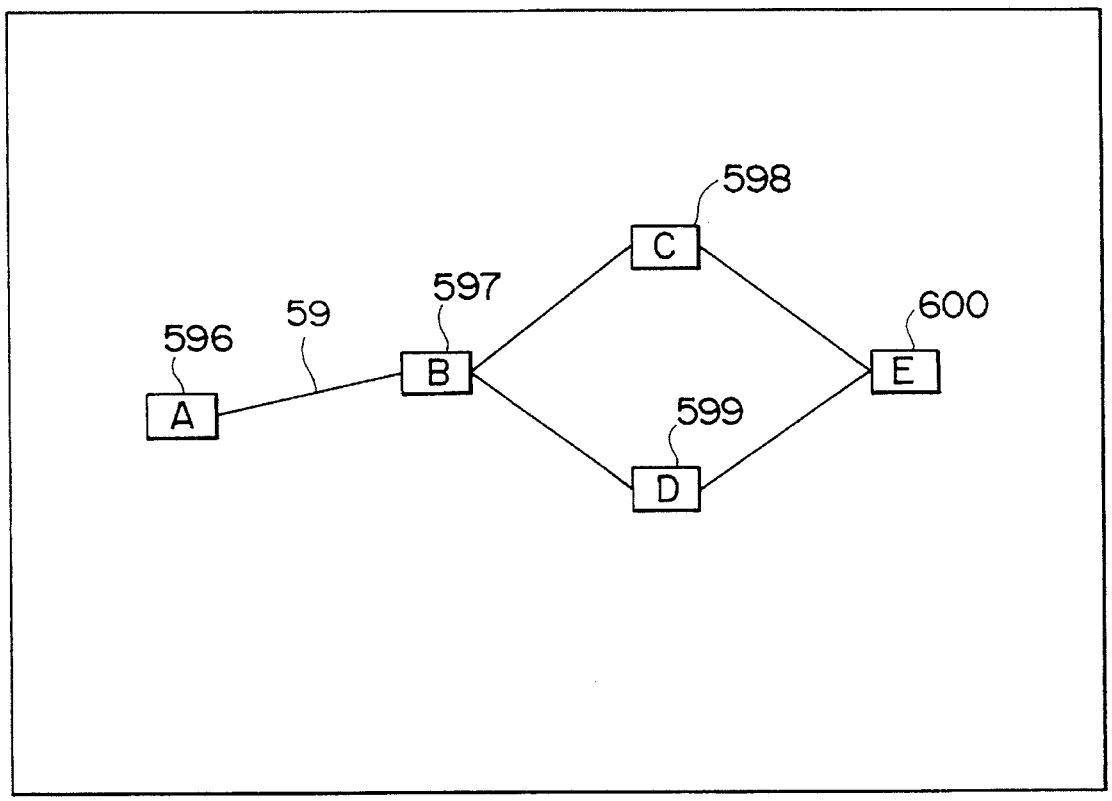
FIG. 5v(3)
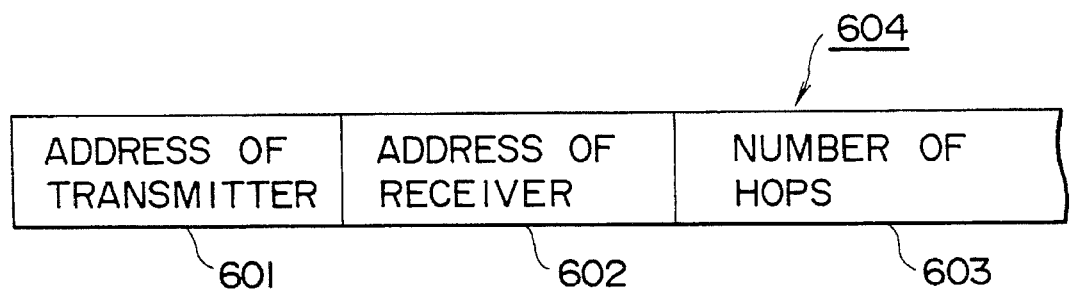

FIG. 5v(4)

| ADDRESS | NETWORK NO. |
|---|---|
| 1234567 | 010101 |
| 1234568 | 010102 |
| 1234569 | 010103 |
| ⋮ | ⋮ |

| NETWORK NO. | COMMUNICATION VELOCITY |
|---|---|
| 010101 | 64 Kbps |
| 010102 | 10 Mbps |
| 010103 | 100 Mbps |
| ⋮ | ⋮ |

| RATE OF AMOUNT OF COMMUNICATION (%) | TYPE OF DISPLAY |
|---|---|
| 100 | LINE WIDTH 10 |
| 90 | LINE WIDTH 9 |
| 80 | LINE WIDTH 8 |
| ⋮ | ⋮ |

630

FIG. 5v(7)
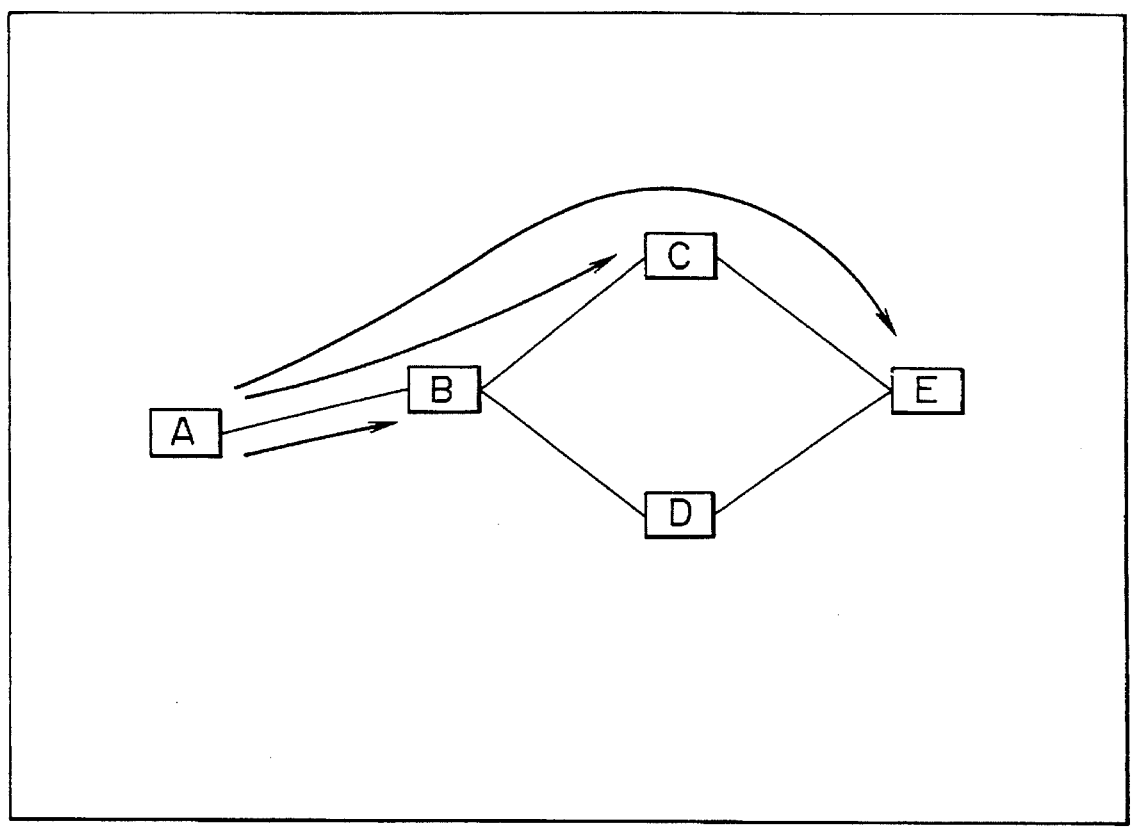

FIG. 5v(8)
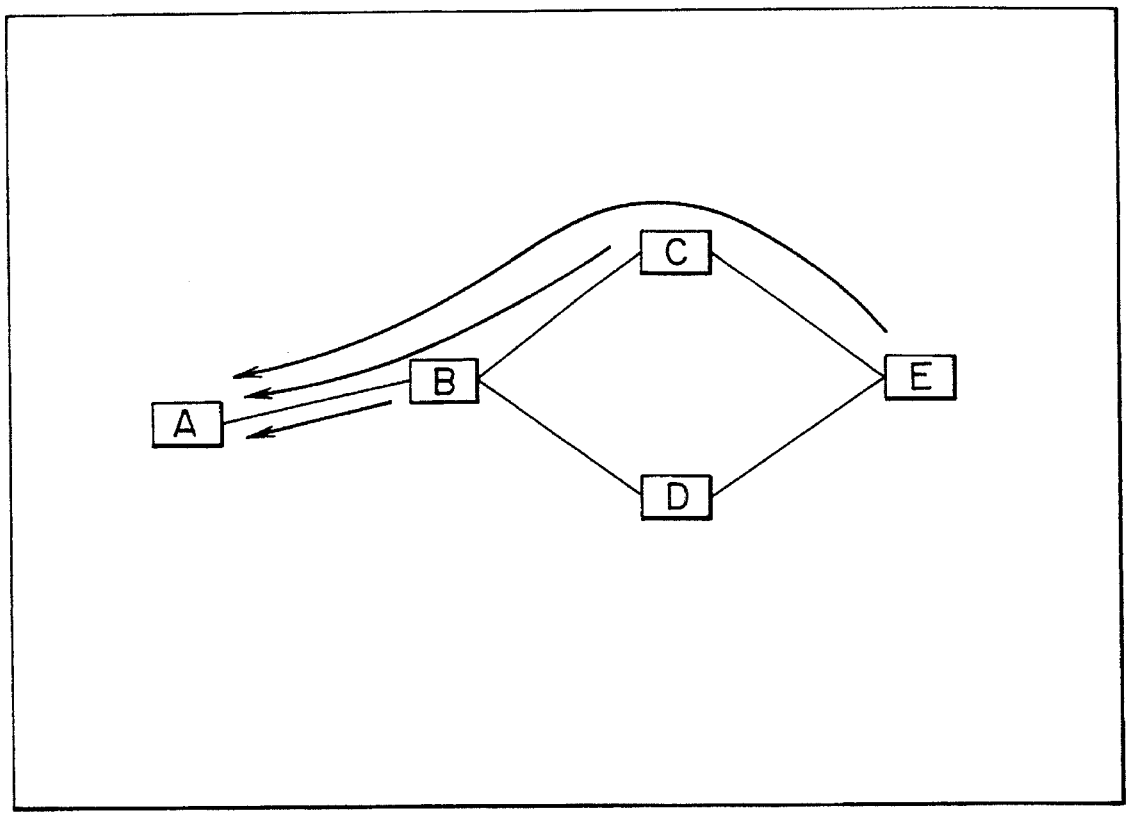

FIG. 5v(9)
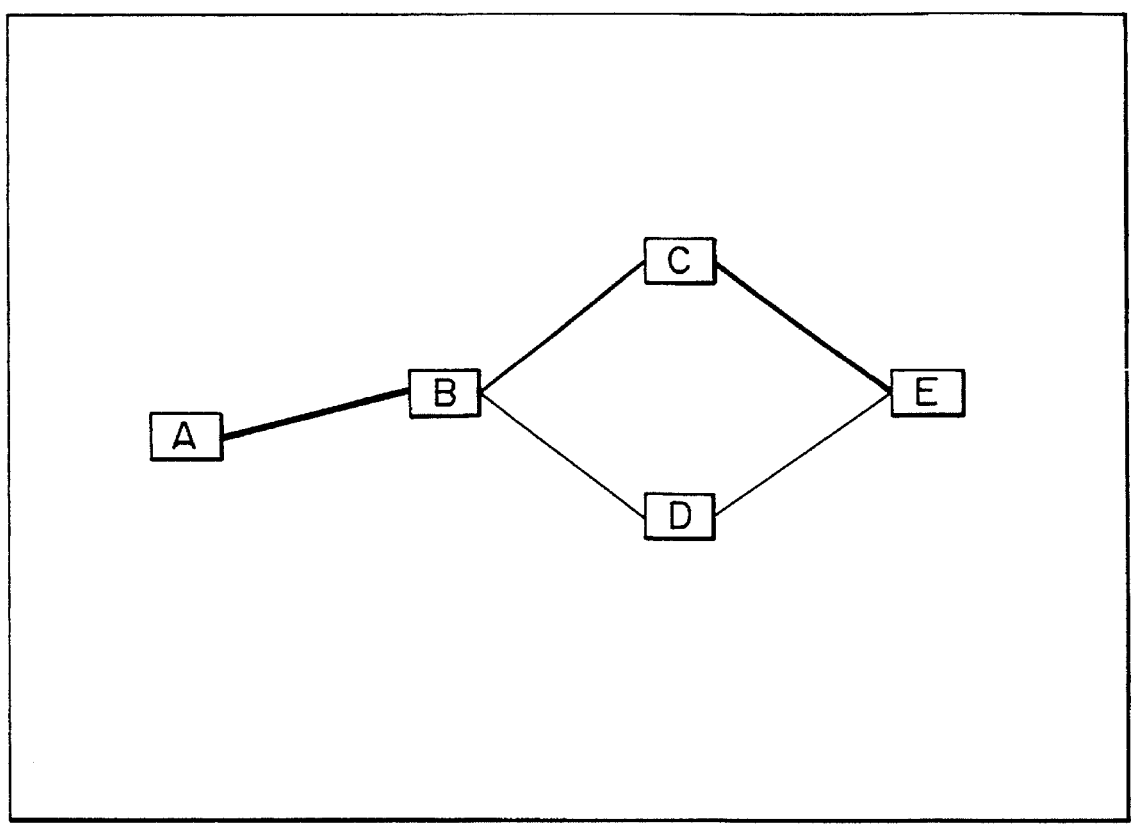

FIG. 6f(1)
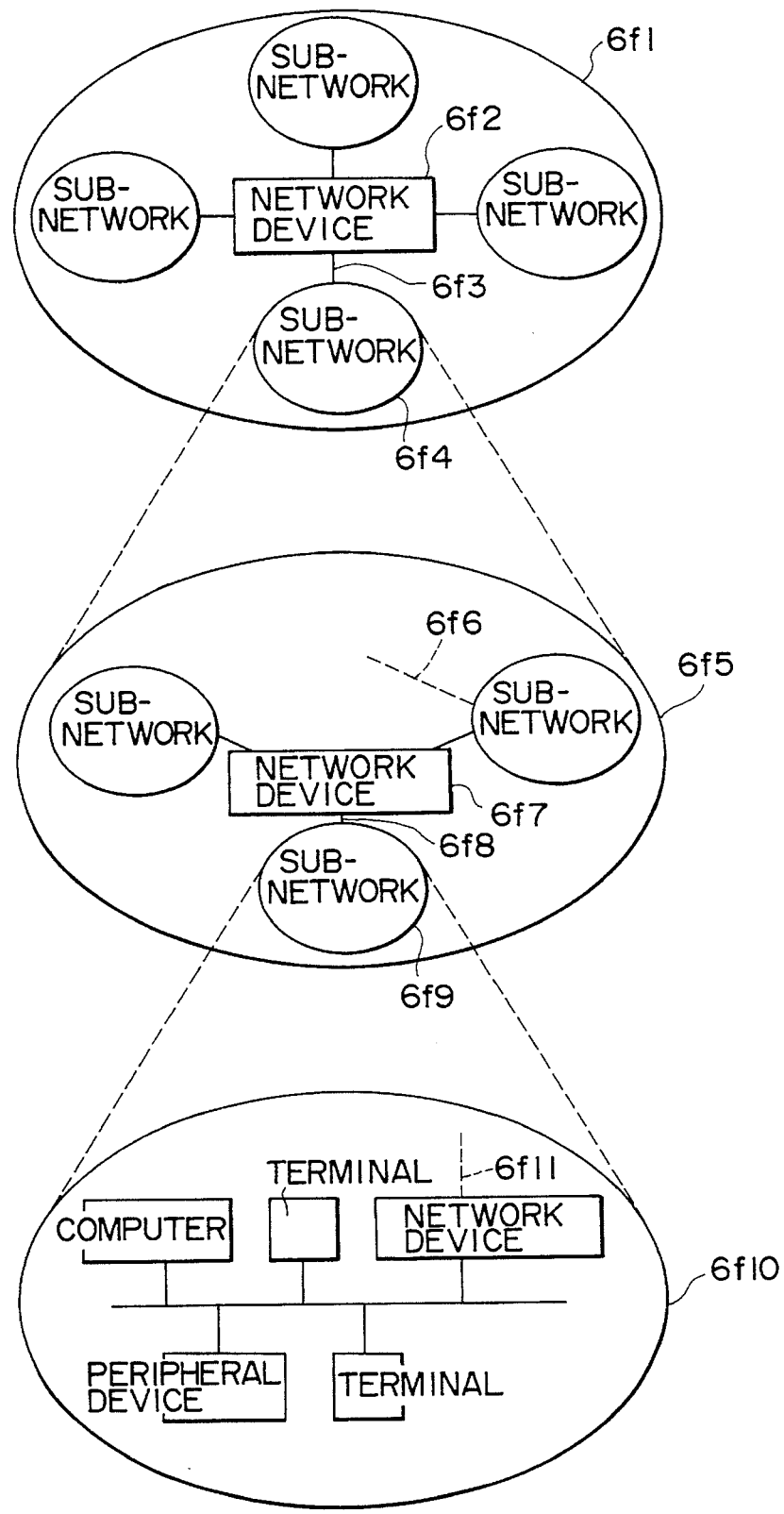

FIG. 6f(2)
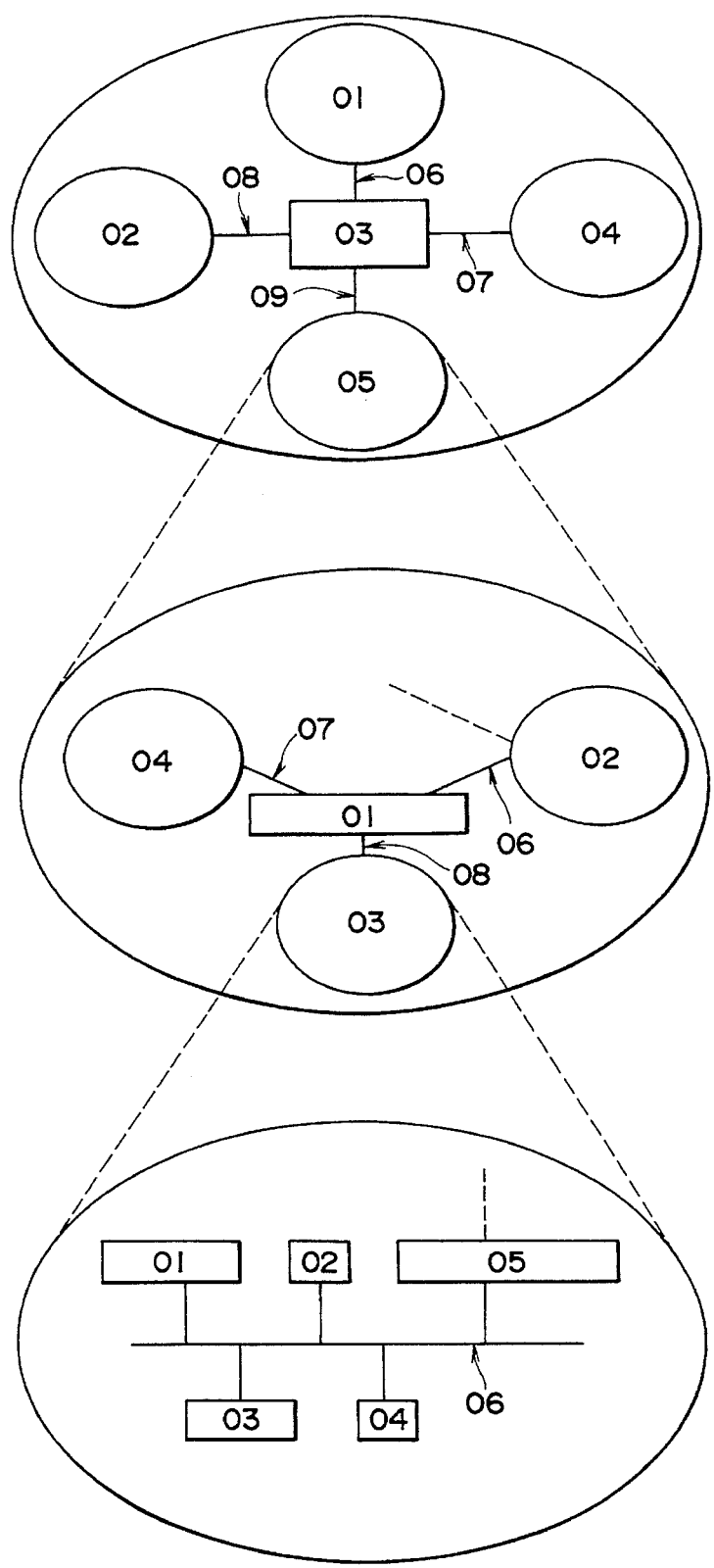

FIG. 6f(3)
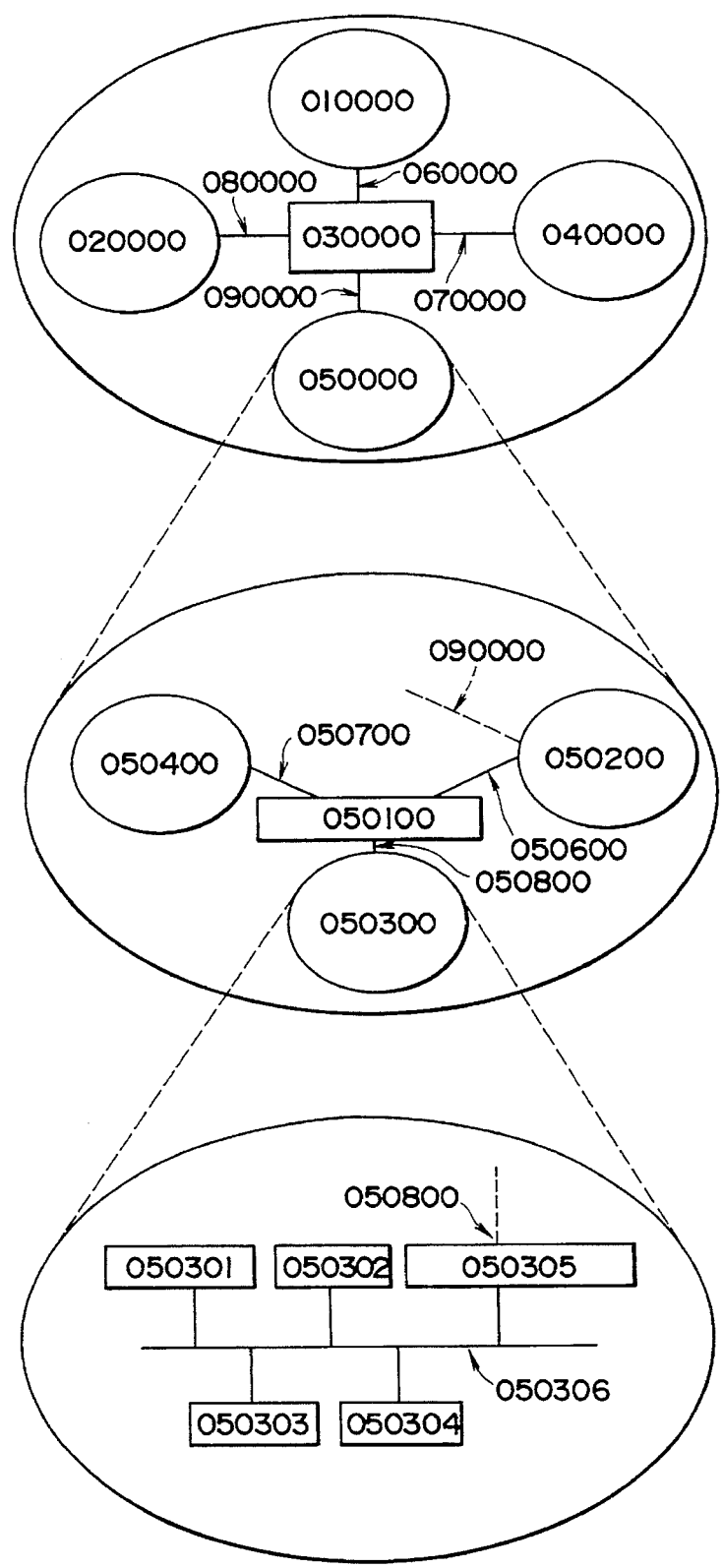

FIG. 6g

| NOS. OF FIRST HIERARCHY | NOS. OF SECOND HIERARCHY | NOS. OF THIRD HIERARCHY |
|---|---|---|

FIG. 6h

| DEVICES TO BE MANAGED & SUBNETWORKS | NETWORK NOS. |
|---|---|
| COMPUTER A | 010101 |
| COMPUTER B | 010102 |
| ⋮ | ⋮ |
| TERMINAL C | 010103 |
| TERMINAL D | 010205 |
| ⋮ | ⋮ |
| NETWORK DEVICE E | 010104 |
| NETWORK DEVICE F | 010105 |
| ⋮ | ⋮ |
| PERIPHERAL DEVICE G | 010106 |
| PERIPHERAL DEVICE H | 010204 |
| ⋮ | ⋮ |
| CABLE NETWORK I | 010107 |
| CABLE NETWORK J | 010301 |
| ⋮ | ⋮ |
| SUBNETWORK K | 030000 |
| SUBNETWORK L | 020500 |
| ⋮ | ⋮ |

FIG. 6i

| NETWORK NOS. | DATA ON CONNECTION |
|---|---|
| 050301 | 050306 |
| 050302 | 050306 |
| 050303 | 050306 |
| 050304 | 050306 |
| 050305 | 050306 |
| ⋮ | ⋮ |

FIG. 6j

| NETWORK NOS. | SHAPE | LETTERS | COLOR | PATTERN | ... |
|---|---|---|---|---|---|
| 010101 | SQUARE | WS | WHITE | NONE | ... |
| 010102 | LINE |  | WHITE | NONE | ... |
| 010103 | SQUARE | X | WHITE | NONE | ... |
| 010104 | LINE |  | WHITE | NONE | ... |
| 010105 | CIRCLE | Net | WHITE | NONE | ... |
| ⋮ | ⋮ | ⋮ | ⋮ | ⋮ | ⋮ |

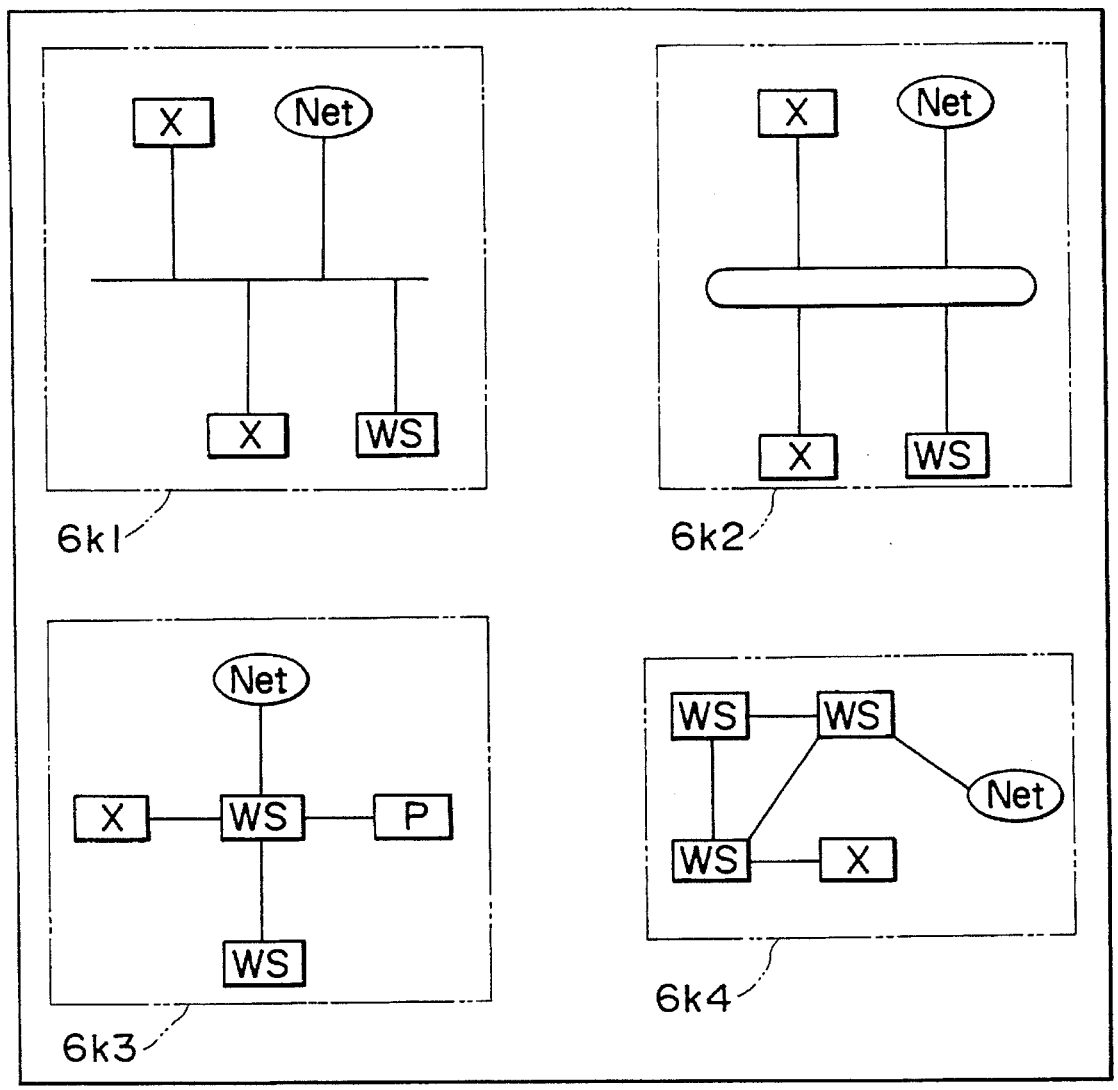
FIG. 6k(1)

FIG. 6k(2)

| NETWORK NOS. | TOPOLOGY | TRUNK DEVICE TO BE MANAGED |
|---|---|---|
| 010100 | BUS | 010105 |
| 010200 | RING | 010204 |
| 010300 | STAR | 010312 |
| ⋮ | ⋮ | |

FIG. 6m

| NETWORK NOS. | PLANE MAP |
|---|---|
| 010100 | map 1 |
| 010200 | map 2 |
| 010300 | map 3 |
| ⋮ | ⋮ |

FIG. 6n

| NETWORK NOS. | POSITION OF DISPLAY |
|---|---|
| 010101 | (10, 5) |
| 010102 | (25, 3) |
| 010103 | (125, 35) |
| ⋮ | ⋮ |

F I G. 6q
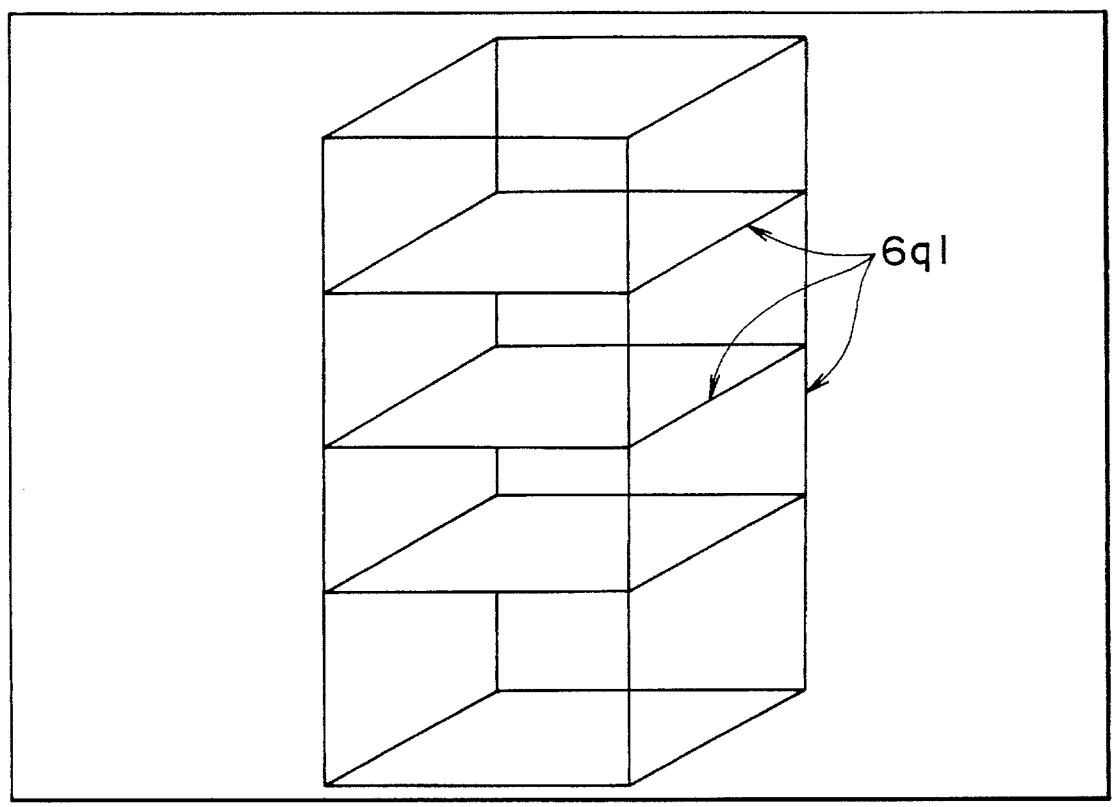

FIG. 6r

| NETWORK NOS. | SPACE MAP |
|---|---|
| 010100 | map 1 |
| 010200 | map 2 |
| 010300 | map 3 |
| ⋮ | ⋮ |

FIG. 6s

| NETWORK NOS. | POSITION OF DISPLAY |
|---|---|
| 010101 | (10, 5, 1) |
| 010102 | (25, 3, 439) |
| 010103 | (125, 35, 450) |
| ⋮ | ⋮ |

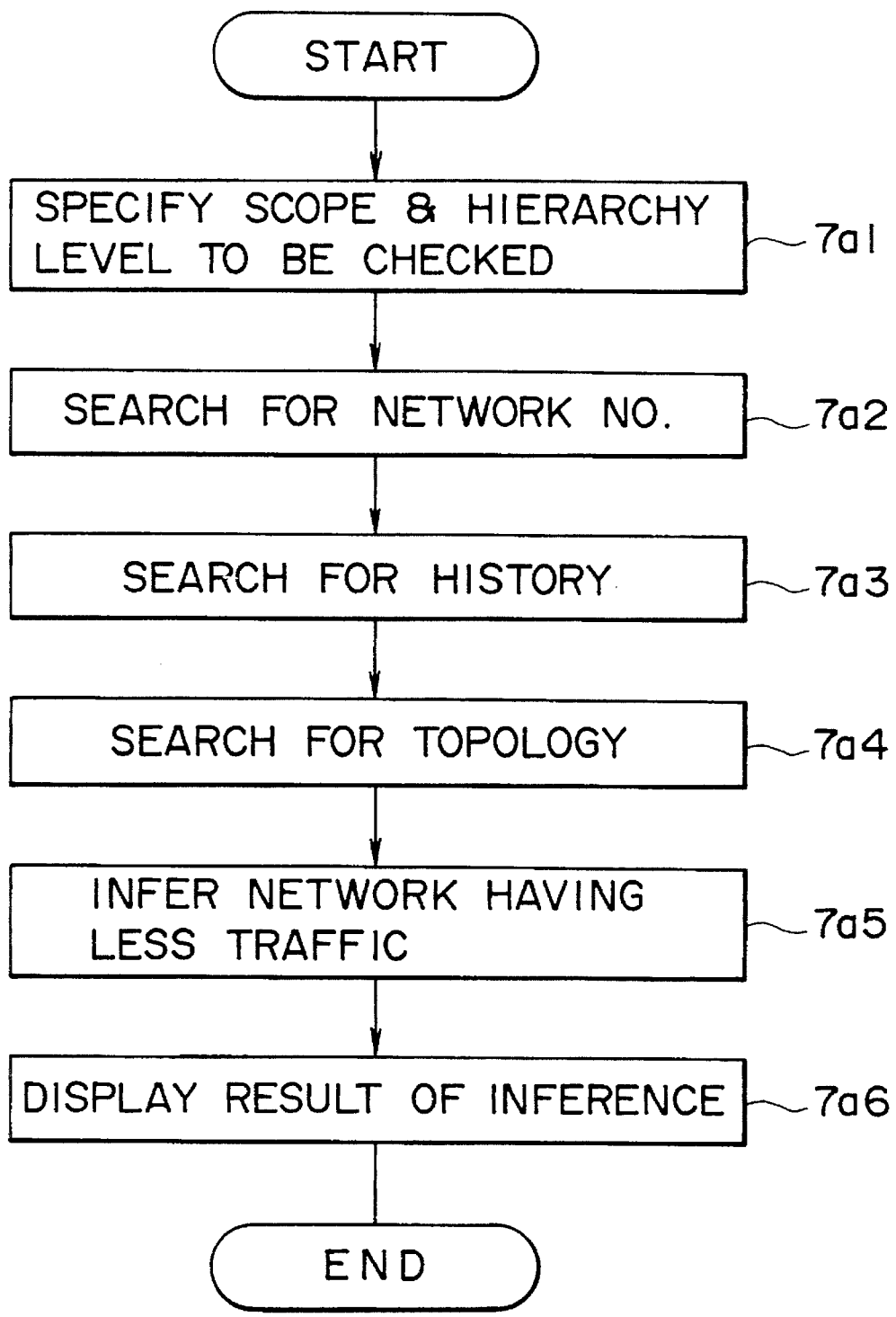

FIG. 7b

NETWORK NO. 010100

| NETWORK NO. | NOS. OF PACKETS FROM 1 WEEK AGO | NOS. OF PACKETS FROM 2 WEEKS AGO | ... |
|---|---|---|---|
| 010200 | 2580 | 5297 | ... |
| 010300 | 6949 | 12974 | ... |
| 010400 | 130 | 400 | ... |
| ⋮ | ⋮ | ⋮ | ⋮ |

NETWORK NO. 010200

| NETWORK NO. | NOS. OF PACKETS FROM 1 WEEK AGO | NOS. OF PACKETS FROM 2 WEEKS AGO | ... |
|---|---|---|---|
| 010100 | 2378 | 4708 | ... |
| 010300 | 204 | 356 | ... |
| 010400 | 587 | 757 | ... |
| ⋮ | ⋮ | ⋮ | ⋮ |

NETWORK NO. 010300

| NETWORK NO. | NOS. OF PACKETS FROM 1 WEEK AGO | NOS. OF PACKETS FROM 2 WEEKS AGO | ... |
|---|---|---|---|
| 010100 | 5390 | 11673 | ... |
| 010200 | 590 | 1395 | ... |
| 010400 | 13047 | 20584 | ... |
| ⋮ | ⋮ | ⋮ | ⋮ |

⋮

FIG. 7c(1)
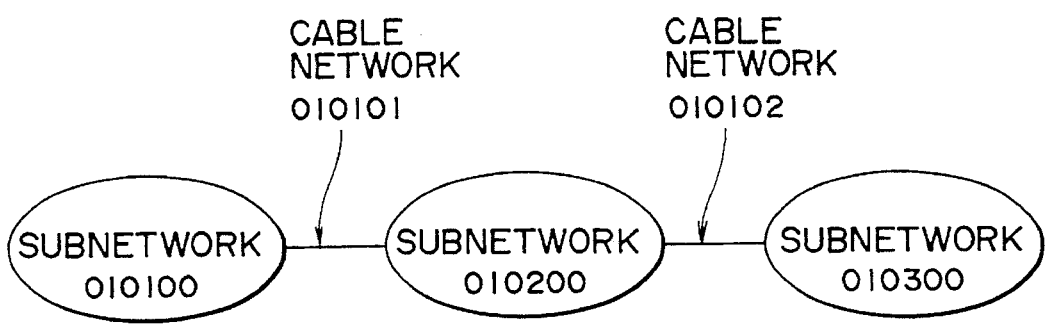
FIG. 7c(2)
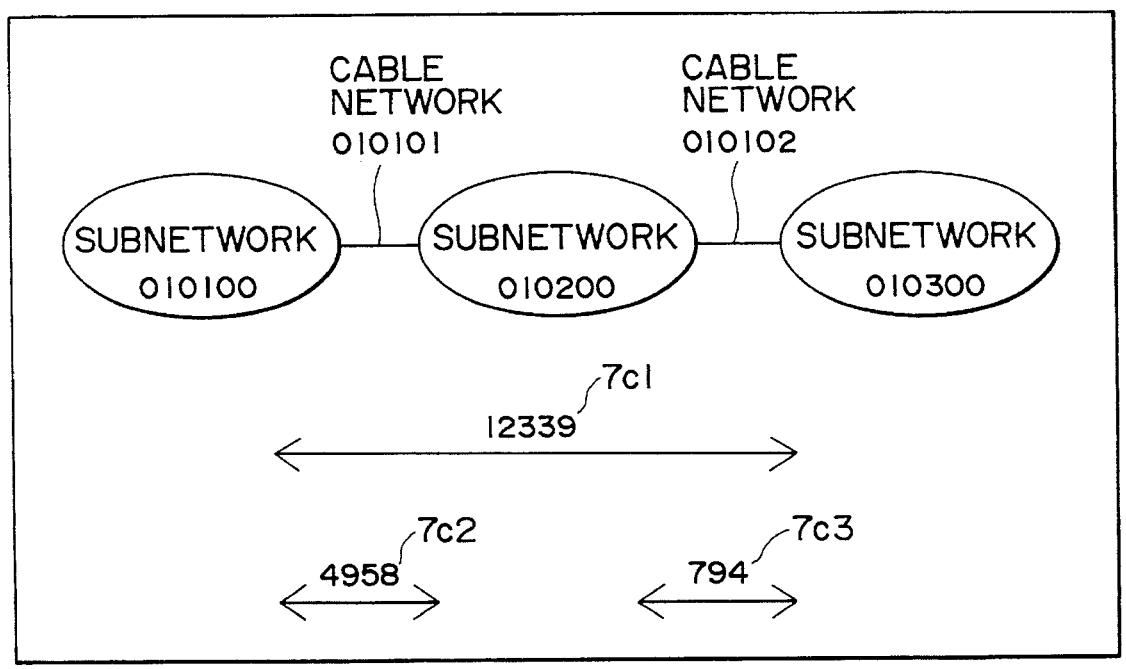

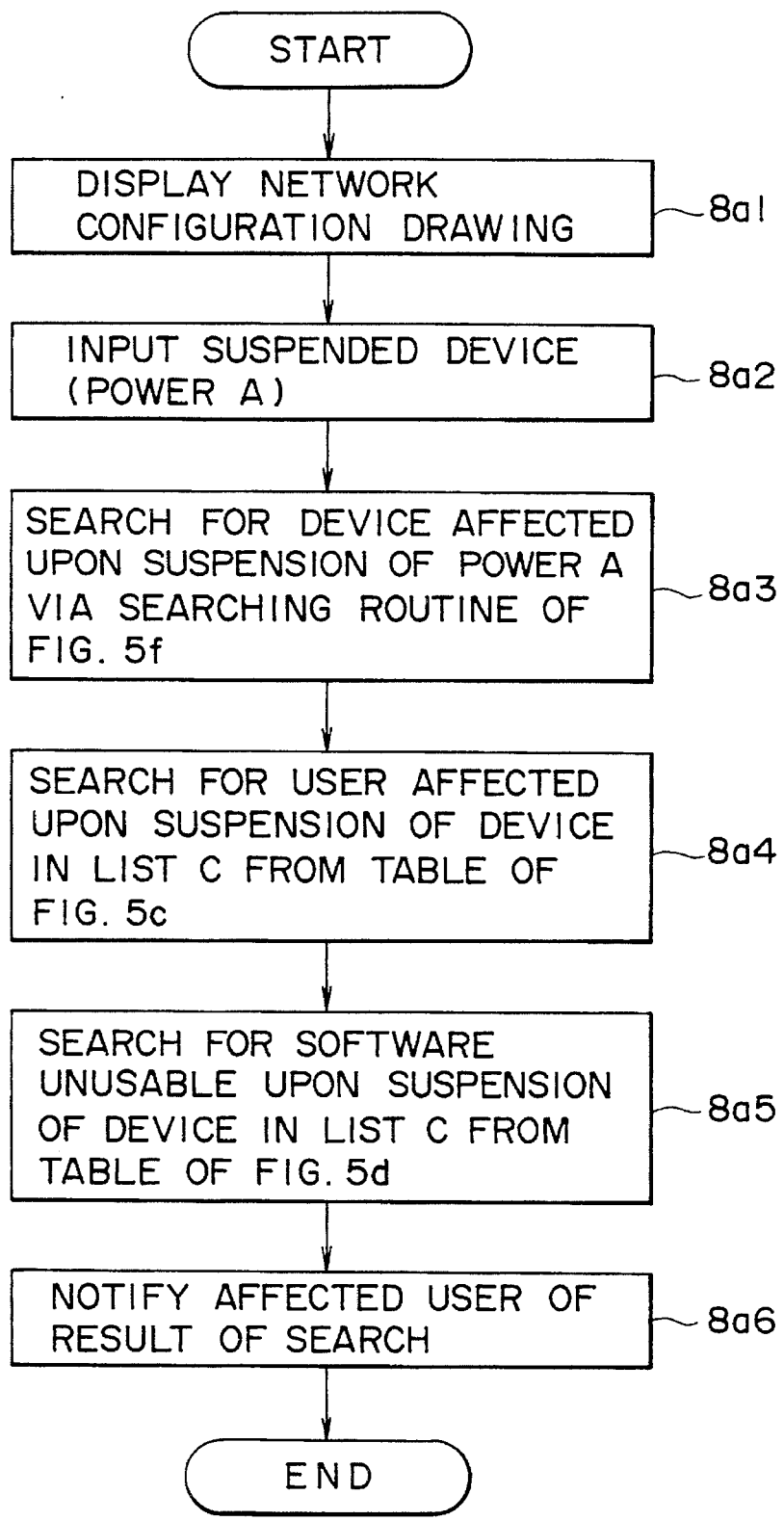

FIG. 8b

DEVICE A WILL BE SUSPENDED IN 24 HOURS.
DEVICE A, HOST MACHINE B, TERMINAL D & PASCAL COMPILER BECOMES UNUSABLE.

FIG. 9a

| 9a1 | 9a2 | 9a3 | 9a4 | 9a5 | 9a6 |
|---|---|---|---|---|---|
| TRANSMITTING MACHINE ADDRESS | RECEIVING MACHINE ADDRESS | TRANSMITTING RELAY MACHINE ADDRESS | RECEIVING RELAY MACHINE ADDRESS | SERVICE NO. | TRANSMISSION DATA |

FIG. 9b

| TRANSMITTING MACHINE ADDRESS (9b1) | RECEIVING MACHINE ADDRESS (9b2) | SERVICE NO. (9b3) |
|---|---|---|
| . . . | . . . | . . . |

FIG. 9c

| TRANSMITTING MACHINE ADDRESS (9c1) | RECEIVING MACHINE ADDRESS (9c2) |
|---|---|
| . . . | . . . | ized
SYSTEM FOR MANAGING AND OPERATING A NETWORK BY PHYSICALLY IMAGING THE NETWORK

BACKGROUND OF THE INVENTION

The present invention relates to a network management system in which a plurality of computers are connected with network devices and, more particularly, to a network management system so adapted as to perform operations and management of a network in a smooth way.

The recent development of communication technology serving as a basis for a network permits a highly reliable high-speed network configuration to be made over several years. The scale becomes larger and wider in areas year after year. As high-speed communication becomes possible and the network configuration advances on a worldwide scale, the requirement for the network management becomes of great account; however, even if the sharing of resources and efficiency of business could be realized, management operations may be rather increased before the network is structured.

Recently, there have been proposed systems that are referred to as network management tools intended to make the network management operations more efficient. What is common with these tools exists in the fact that the network management is performed at a communication protocol level.

The network management function at a communication protocol level contains a monitoring function for monitoring network traffic a statistics processing function for compiling monitored results, a function for generating an alarm at the time of an abnormality in the traffic, and the like.

For example, a network management system called "Dual Manager" commercially available from Nippon Kokan K.K. is a management system on a communication protocol base that is referred to as SNMP (Simple Network Management Protocol). Although this network management system uses such a communication protocol as a standard in the industry, all products do not always support the communication protocol so that there are occasions where the network cannot be managed with the system only.

Another network management system called "SunNet Manager" available from Sun Micro Systems is a network management system based on an original protocol. Thus, it is difficult to manage products other than those originated from Sun Micro Systems. The same thing can be said of a network management system called "NetView" available from IBM. Further, these systems cannot manage information on devices that are physically connected with these systems.

However, these systems for carrying out the logical network management by using the SNMP (Simple Network Management Protocol) and its own protocol do not management the status of physical locations. Further, these systems cannot display the scope of influence, change the machine environment, and perform the physical management of security on the layout of a floor, although they can give a notice of a fault on the basis of information on MIB of the SNMP, the rate of use of CPU by the computer, or the rate of use of a disk, if the condition for the management of the fault would go over the conditions defined by the user.

A variety of technologies relating to such network management systems are disclosed in Japanese patent publications as follows:

(i) A maintenance subsystem as disclosed in Japanese Patent Laid-Open Publication (kokai) No. 61-180,340;

(ii) A network monitoring device as disclosed in Japanese Patent Laid-Open Publication (kokai) No. 63-117,532;

(iii) A network diagnosing device as disclosed in Japanese Patent Laid-open Publication (kokai) No. 63-279,643;

(iv) A network address mapping system as disclosed in Japanese Patent Laid-open Publication (kokai) No. 2-18,651; and (v) ALAN control system as disclosed in Japanese Patent Laid-Open Publication (kokai) No. 2-305,140.

The maintenance subsystem as described in item (I) above is so adapted as to execute a diagnosis routine for a computer that has caused a fault, to transmit a cause and a site of the fault, and to allow the fault to be corrected from a terminal apart from the computer.

The network monitoring device as referred to in item (ii) above is arranged to store information on a component to be monitored in a definition data file and to allow a fault of the component to be investigated from a location apart from the component.

The network diagnosing device as referred to in item (iii) above is so arranged as to allow a diagnosing processor to receive a diagnosing command transmitted from a network component, to return a diagnosed result to the component, and to allow a component user to practice an investigation of the cause of a fault on site.

The network address mapping system as described in item (iv) above is so adapted as to permit a network system to be structured with high extendibility and ease in alteration by making a dispersed management of the mapping indicative of the names of nodes and the physical positions of the computer.

The LAN control system as referred to in item (v) above is so adapted as to improve operability by analyzing a packet on a network and simplifying a shared resource of a server.

As prior technology for the management for the faults of the network, there may be mentioned, for example:

(vi) A fault detecting system for detecting a fault of the network as disclosed in Japanese Patent Laid-Open Publication (kokai) No. 1-78,053;

(vii) A fault monitoring system for monitoring a fault for a data processing network system, as disclosed in Japanese Patent Laid-Open Publication (kokai) No. 1-218,236;

(viii) A network fault diagnosing system for diagnosing the fault of a network as disclosed in Japanese Patent Laid-Open Publication (kokai) No. 3-97,330;

(ix) A two-step fault determining system for determining a fault in two steps in a network monitoring system, as disclosed in Japanese Patent Laid-Open Publication (kokai) No. 3-101,539; and (x) A presumption processing system for implementing the presumption processing for a range of influence of a fault by a network monitoring system, as disclosed in Japanese Patent Laid-Open Publication (kokai) No. 3-195,230.

The fault detecting system of the network, as referred to in item (vi) above, is so arranged as to display a location of the fault determined by a fault monitoring means for monitoring faults and a location determining means for determining the location of the fault so as to be readable directly therefrom.

Further, the fault monitoring system of the data processing network system, as referred to in item (vii) above, is so arranged as to be capable of displaying a fault in accordance with a magnitude of importance by transmitting display information on faults of the network through an emergency circuit in case of occurrence of faults.

The network fault diagnosing system as referred to in item (viii) above is so adapted as to presume the location of occurrence of the fault of the network and diagnosing rules.

In addition, the two-step fault determining system in the network monitoring system, as referred to in item (ix) above, is so adapted as to improve accuracy in the determination of the fault by classifying information on faults into information on main causes of the faults and information on the faults that exert an adverse influence.

Furthermore, the presumption processing system for implementing the presumption processing for the scope of influence of the fault in the network monitoring system, as referred to in item (x) above, is so arranged as to be capable of presuming the scope of influence at the time of the occurrence of the fault by accumulating the scope of influence of the fault as information on a fault history, presuming the cause of the fault when the fault occurred, and displaying the corresponding information on the fault history, if any.

The technology as described hereinabove, however, cannot solve the matters as will be described hereinafter.

a. The occurrence of a loss to be caused by a fault of the network cannot be prevented.

In an environment where the network is in a fluctuating configuration, it is in an ordinary state that the network is running and that a cost calculation and a prediction of productivity are being performed. If the network is not running due to a certain kind of abnormality, however, productivity may be caused or a loss may occur. In order to prevent such an environment, it is necessary to comprehend the configuration of the connection of a machine with the network and allow the abnormality to be discovered in network traffic at once by designing a topology of the highly efficient network. The conventional technology, however, can allow the network to be monitored yet it cannot design the topology.

b. An instruction to take measures cannot be made at the time of causing a fault of the network.

Although the loss as described hereinabove may occur in instances where the network causes a fault, it is necessary for a network manager to recover the network rapidly, in order to minimize the loss that may be predicted to occur from such a fault. The measures that should be taken when greater importance is attached to a decrease in disappearance of data and in reliability due to the fault or the failure of the network should be different from the measures that should be taken when greater importance is attached to a decrease in response. In order to take the measures, however, a state of the fault should first be grasped accurately, the cause of the fault should then be analyzed, and it should further be judged as to how efficiently the fault can be recovered. Furthermore, it is required that a managing post be identified and the cause of the fault be excluded in order not to cause the fault or similar faults again. It can be noted, however, that the network management system based on the conventional technology cannot given any instruction of the measures to be taken against the faults.

c. The management of data is complex.

There is a great variety of elements structuring the network, including computers, and the kinds and nature are diversified. In order to manage the network well, any device connected to the network should be managed even if it is small in size and has only a sole function. Network-related devices have a very short product life cycle and new products having higher functions are being prepared one after another at cheaper prices. Further, the number of devices to be managed will be increasing.

In addition, a device to be connected to the network is provided with a variety of attributes and attribute values. Even one work station contains several tens of the attributes and the attribute values, including the name of the product, model number, serial number, price, memory size, disc size, working operating system (OS), and the like. It can further be noted that managing operations can be performed with high efficiency when necessary data is stored in a state capable of being fetched readily and rapidly. The managing data contains a wide variety of data, including graphics data such as the location of machines, the wiring of the network, etc., data of a spreadsheet type, such as the configuration of the devices, a list of working software, etc., data of a text type, such as a manual of procedures for handling the network, etc., and image data of products as indicated in catalogues of products, etc.

There are all kinds of graphics data and data of a spreadsheet type, and there is no compatibility between the graphics data or between the data of the spreadsheet type, even if the data is intended to be compatible, because tools through which the graphics data or the data of the spreadsheet type are prepared are different and types of the data are different. There has currently been no tool in conventional technology, which can handle data of a spreadsheet type or data of a text type together with graphics data or with the mapping of data to a floor map. Hence, currently, the tools are changed so as to comply with the kinds of data to be handled.

d. Distribution of data

Data may be dispersed when equipment, kinds of devices, and costs of devices are managed by different managing posts. Unlike the dispersion over the network, the dispersion of managing posts may make it difficult to collect data necessary for new installment and transferal of devices, and the like. For instance, a company may be organized in such a manner that different managing sections manage different data: for example, the accountants section of its finance department is managing assets; the equipment section of its computer center is managing power; the general affairs section of its general affairs department is managing telephones; and the like. If managing data is managed with a large-scale host computer, there may be occasions when word processors and personal computers are not connected to the host computer so that necessary data cannot be fetched readily and rapidly from those processors and computers equipped on the desks of the operators.

e. It is difficult to divide sections for supporting maintenance at the time of the occurrence of a fault.

The network is structured in almost all cases by multiple vendors so that a request for all operations cannot be given to a particular maintenance company. Even if a company has a managing section, it cannot perform maintenance operations for networks equipped separately. Further, it is extremely difficult to determine the site where an abnormality is caused to occur after the occurrence of a fault or a failure and where to recover.

f. No management can be made for the fault so as to contain all devices connected to the network.

The network is constituted by the computers and the network devices connected thereto through circuits and so on. In order to allow the network to run in an actual way, however, the power sources, plug receptacles, cables, telephone circuits, and so on are also essential elements. Hence, it is necessary to contain elements structuring the network, other than those computers and network devices, as the object of management for the fault of the network.

The conventional technology as described hereinabove, however, suffers from the disadvantages that it cannot manage the physical disposition of the devices, the state of the connection thereof, the electric power sources, the plug receptacles, the cables, the telephone circuits, and so on, because it is so adapted as to manage the computers and the network devices, connected to the network in a logical sense.

g. The management of the physical environment can e made in an insufficient manner.

The scope of temperature and humidity is usually determined as an environment for guaranteeing a normal operation of the computers and the network devices. Hence, the normal operation of the network can be implemented for the first time when the physical environment is assured as described hereinabove.

The computers and the network devices usually consume more electricity than general household electric appliances, and generate more heat. Knowing the amount of heat generated from each device and how much ambient temperature is caused to arise at the circumference of each device would be useful for locating the computers and the devices in an effective and efficient way. Further, illumination within an office and noise generated from the devices are elements of significance to be taken into account in order to provide the user with a good physical environment for operating the devices. In addition, understanding the range of wireless communication becomes very important for network management of a wireless network configuration, which has recently attracted increasing attention.

As the conventional technology, however, does not address the physical environment, such as the amount of the heat generated, the amount of noise, the scope of illumination, the scope of the range of the wireless, and so on, as the object of management, it presents the problem that it cannot grasp the impact of these factors upon the network environment.

h. The performance of the network cannot be grasped on a drawing of the configuration of the network.

In order to grasp the performance of the network, many network management systems at a communication protocol level are provided with the functions of gathering data flowing on the network and implementing the statistical processing for each of the contents and the kinds of the data.

These network management systems, however, are so arranged as not to display screens in accordance with the amount of data on the drawing of the network configuration, to display screens of the path for the transmission of the data, and to alter the method of display in accordance with the kinds of the data, in order to grasp the dynamic traffic situation, so that these conventional network management systems suffer from the disadvantages that the performance of the network cannot be grasped on the drawing of the network configuration.

i. Security in the network is insufficiently secure.

In the utilization of the computers and the network devices, there are many occasions in which improvements I the ease of use runs counter to the guarantee in security. In fact, the configuration of the network can be said to create a hole in security. Hence, the network management systems at the communication protocol level, as described with respect to the conventional technology, are provided with the function of detecting a connecting device having an abnormal address or detecting a person using an abnormal network from the contents of the data flowing on the network. These network management systems, however, cannot grasp which portion will become a hole in security before the occurrence of a phenomenon that is caused to occur for the first time after the occurrence of the abnormality. It is thus difficult to take measures in advance to ensure security.

SUMMARY OF THE INVENTION

The present invention has been achieved in order to solve the problems inherent in the conventional technology, and has the object to provide technology so adapted as to reduce the work of a network manager.

The present invention has another object to provide technology so adapted as to simplify the work of the network manager.

The present invention has a further object to provide technology so adapted as to reduce the work of a manager managing materials and products.

The present invention has a still further object to provide technology so adapted as to readily take measures at the time when an abnormality of the network is caused to occur.

The present invention has a still further object to provide technology so adapted as to save resources by sharing computer resources and data.

The present invention has a still further object to provide technology so adapted as to improve the reliability of the network.

The present invention has a further object to provide a network management system so adapted as to implement the management of faults for all devices connected to the network, including the physical locations of the devices, connections thereof, power sources, plug receptacles, cables, telephone circuits, and so on.

The present invention has another object to provide a network management system so adapted as to readily grasp conditions for the physical environment, such as an amount of heat generated, an amount of noise, a scope of illumination, and a scope of range of the wireless, and so on.

The present invention has yet another object to provide a network management system so adapted as to grasp the performance of the network on the drawing of the network configuration.

The present invention has another object to provide a network management system so adapted as to readily take measures to ensure security.

The foregoing objects, other objects, and the features of the present invention will become apparent in the course of the specification and the accompanying drawings of the present application.

In order to achieve the foregoing objects, the network management system according to the present invention is provided with a first means which is characterized by a system for managing and operating a network, to which a plurality of computers and network devices are connected, which is provided with a database for storing information corresponding to the plural computers and the network devices, and a means that forms a drawing for a network specification so as to satisfy conditions required by a user on the basis of the information.

The network management system according to the present invention is further provided with a second means in the system for operating and managing the network equipment as the first means, the second means being characterized by a means which is so adapted as to check whether the network specification satisfies the physical conditions on the basis of physical data required for the configuration of the network, stored in the database, such as the length of built cables, electrical capacitance, area of installation, position of a power source, shape of a network port, and the like.

The network management system according to the present invention is still further provided with a third means in the system for operating and managing the network equipment as the first means, the third means being characterized by a means which is so adapted as to check logical requirements for the network specification on the basis of logical data needed for the analysis of a network topology, stored in the database, such as the number of connectable machines, a maximal value of network traffic, a used amount of a disc, a used amount of a swap size, and the like.

Further, the network management system according to the present invention is provided with a fourth means in the system for operating and managing the network equipment as either one of the first, second and third means, the fourth means being characterized by a means which is so adapted as to be capable of making a search for data corresponding to the specified computer or the specified network device when a drawing of the network configuration is generated and the computer or the network device is specified from the computers and the network devices displayed on the drawing of the network configuration.

In addition, the network management system according to the present invention is provided with a fifth means in the system for operating and managing the network equipment as either one of the first, second, third, and fourth means, the fifth means being characterized by a means which is so adapted as to be capable of identifying the computer and the network device, which undergo influence of a fault, when it is supposed that a certain computer or a certain network device causes the fault.

Furthermore, the network management system according to the present invention is provided with a sixth means in the system for operating and managing the network equipment as the fifth means, the sixth means being characterized by a database storing information relating to the physical locations of the network devices and to connection relationships thereof, the display device for displaying the configuration of the network and so on, and a processing means so adapted as to display the drawing of the physical network configuration on the display device on the basis of the information stored in the database, and as to indicate the location of a fault at the time of the occurrence of the fault of the network.

In addition, the network management system according to the present invention is provided with a seventh means in the system for operating and managing the network equipment as the fifth means, the seventh means being characterized by a first database storing information relating to the physical locations of the network devices and the relationship of connection thereof, a second database storing information relating to a peripheral map indicating the location of the network device and to a traffic path to reach the location thereof, the display device for displaying the configuration of the network and so on, and a processing means so adapted as to display the drawing of the physical network configuration on the display device on the basis of the information stored in the first database, to indicate the location of a fault at the time of the occurrence of the fault of the network, and to display the traffic path and the peripheral map, the traffic path reaching the location of the disposition of the network device in which the fault occurred, on the basis of the information stored in the second database.

Furthermore, the network management system according to the present invention is provided with an eighth means in the system for operating and managing the network equipment as the fifth means, the eighth means being characterized by a first database storing information relating to the physical locations of the network devices and the relationship of connection thereof, a third database storing information relating to a physical condition of the environment, such as illumination at the locations of the network devices, a radio wave fault, and so on, the display device for displaying the configuration of the network and so on, and a processing means so adapted as to display the drawing of the physical network configuration on the display device on the basis of the information stored in the first database, to indicate the location of a fault at the time of the occurrence of the fault of the network, and to display the physical condition of the environment, such as the illumination on the location of the network device, the radio wave fault, and so on, on the basis of the information stored in the third database.

In addition, the network management system according to the present invention is provided with a ninth means in the system for operating and managing the network equipment as the fifth means, the ninth means being characterized by a first database storing information relating to the logical relationship of connection of the network devices, the display device for displaying the configuration of the network and so on, a fifth database storing information relating to a data rate of communication through a communication path connecting the network devices to each other, and a processing means so adapted as to display a drawing of the logical configuration of the network on the display device on the basis of the information stored in the first database, and the communication path on the drawing of the network configuration connecting a pair of arbitrary network devices in such a type as corresponding to a rate of network traffic with respect to the data rate of communication through the communication path by selecting the pair of the arbitrary network devices, measuring the network traffic by transmitting and receiving a packet for measuring the network traffic between the pair of the network devices, and determining the rate of the network traffic with respect to the data rate of communication through the communication path.

The network management system according to the present invention is further provided with a tenth means in the system for operating and managing the network equipment as the fifth means, the tenth means being characterized by a first database storing information on the physical locations of the network devices and the relationship of connection thereof, a fourth database storing information on an intrusion level relating to an entrance or an exit into which or through which an intruder enters or exits a room where the network devices are disposed, the display device for displaying the configuration of the network and so on, and a processing means so adapted as to display the drawing of the physical configuration of the network on the display device on the basis of the information stored in the first database, as well as the entrance and the exit capable of allowing the intruder to enter into or get out on the display device by making a search for the fourth database on the basis of an instruction.

Still further, the network management system according to the present invention is provided with an eleventh means in a system for operating and managing the network equipment as any one of the first means through the tenth means, the eleventh means being characterized by a means which is so adapted as to display the drawing of the network configuration in two or three dimensions by using the data stored in the database.

Furthermore, the network management system according to the present invention is provided with a twelfth means in the system for operating and managing the network equipment as any one of the first means through the eleventh means, the twelfth means being characterized by inferring and forming the configuration of a new network so as to make the network highly efficient on the basis of data of history of network traffic, a result of checking physical requirements for the network specification, and a result of checking logical requirements for the network specification.

The network management system according to the present invention is still further provided with a thirteenth means in the system for operating and managing the network equipment as either one of the first means through the twelfth means, the thirteenth means being characterized by a means that is so adapted as to give a report to a user of the computer under a scope of influence that may exert upon the user at the time when power for a version-up and a back-up of the computer is turned off or on.

The network management system according to the present invention is still further provided with a fourteenth means in the system for operating and managing the network equipment as any one of the first means through the thirteenth means, the fourteenth means being characterized by a means that is so adapted as to detect and identify the input and output positions of abnormal data on the basis of the drawing of the network configuration and the data stored in the database.

The means as described hereinabove is so adapted as to reduce operations by network managers managing the network and by managers managing equipment, assets, materials and products as well as to support the smooth operations of the network in the system for operating and managing the network equipment. For instance, for the system for operating and managing the network equipment according to the present invention, it is estimated that several ten thousands own and use one computer or terminal each, which is connected to the network. The network is configured in such a manner that a tree local area network is stretched in a vertical direction within a building and that branch local area networks are connected to the tree local area network extending in transverse directions in each floor of the building. Further, the branch local area network is divided into division local area networks which are each designed so as to be used by several tens of person. Such hierarchical local area networks are so configured on a countrywide scale or on a worldwide scale that the identical computing environment can be guaranteed everywhere in the country or in the world. To the tree local area network disposed in the building is connected a large-scale host computer for business use or a supercomputer, thereby allowing free access from a terminal disposed in a remote location. To the tree local area network is further connected a router that functions as a joint with an external network or with networks disposed among the buildings. In the future, high-speed communication at several hundred megabytes (MB) per second will be made feasible, thereby allowing a communication to be made in real time with a network at a remote location.

The system for operating and managing the network equipment according to the present invention is run on a server machine connected to the local area network, thereby exchanging data through the network with a host machine for business use in managing assets, connected in a local area network, a work station with database on map data built therein or a work station with database on product data built therein.

The system for operating and managing the network equipment according to the present invention is provided with a user interface that allows the user to make access to a variety of databases and that enables any data to be entered from any terminal or an interface similar thereto, or to be updated thereby.

The devices to be managed in the system for operating and managing the network equipment according to the present invention may include, for example, equipment devices, computer devices, network devices, and the like. As the equipment devices, there may be mentioned, for example, telephones, power, air conditioning units, floor maps, building maps, network wiring, and the like. The computer devices may include, for example, work stations, personal computers, printers, host computers, file servers, terminals, word processors, and the like. The network devices may include, for example, routers, bridges, repeaters, transceivers, terminal servers, protocol converters, modems, facsimile machines, and the like. In addition, the objects to be managed may include, for example, software, machine environments, system configurations, network traffics, and the like.

The attributes of the devices to be managed in the system for operating and managing the network equipment according to the present invention may include, for example, map data, data of computers and network devices, and the like. As the map data, there may be mentioned, for example, address numbers, names of the buildings, floors, areas, positions of tables, seats, positions of machines, and the like. As the data of the computers and the network devices, there may be mentioned, for example, the product name, model name, model number, price, purchaser, date of purchase, electric consumption, serial number, image of shape, dimension, weight, number of necessary plug receptacles, operating environment, history of repair, prices of maintenance, and the like. As the attributes of the products, the attributes inherent in the work station may include, for example, the name of the CPU, processing speed, clock number, running OS, external interface, MAC address, name of logical machine, IP address, memory size, capacity of hard disc, extendible board, and the like; the attributes inherent in the router may include, for example, the corresponding protocol, communication speed, number of ports, shape of ports, kinds of interfaces, number of extendible slots, and the like; and the attributes inherent in the software may include, for example, the name of the product, version, running OS, running environment, manual, installing machine, location of storage device, outline of functions, prices for version up, and the like. These data is registered in advance in database on the product and arranged so as to be fetched by specifying the name of the product or the name of the model.

Further, the system for operating and managing the network equipment according to the present invention has the following functions as will be described hereinafter:

1. Database on network equipment and interface

Data on the devices to be managed and on the attributes thereof is converted into a database, whereby the data can be registered and searched. The data inherent in each product, such as the serial number, the presence or absence of a maintenance contract, the purchaser, the maintenance contractor, and the like, is registered in the database upon purchase.

2. Database on maps

Data on maps ranging from a countrywide map to a drawing of a building in floor units is classified into hierarchies by means of graphic processing on a CAD base. The hierarchical data is stored and linked to the database on network equipment as described in item 1 above, thereby providing a user interface that allows the user to make access to data on devices on the basis of the map displayed on a display screen.

3. Management of the hardware disposition and network wiring

The wiring of the network for managing the location of hardware and the network wiring, the state of connection, the location of power, the machine layout, telephone wiring, and the like are prepared on the basis of a map stored in the database.

4. Management of system configuration

When a computer is purchased, a list of the necessary device configuration and the software is formed and it is then checked whether the list thereof is adapted to the system configuration that can comply with the objects of the user.

5. Management of machine environment

A search can be performed for data as to, for example, where a home directory is located, what is stored in which disk, what is a system configuration of the machine, who has an account, and the like.

6. Management of network environment

The network environment is managed in a physical sense. It is checked as to what machine or terminal is connected, where the machine or terminal involved is connected, and whether Ethernet satisfies the network standard.

7. Management of software

The attributes relating to software as has been described hereinafter are managed.

8. Management of inventory of materials and products

A management is made of the number of unused materials and products, such as cables, connectors, transceivers, terminators, etc. and a list of lent materials and products.

9. Monitoring function

The state of a stationary network is monitored in association with a network management tool on a communication protocol level, thereby compiling the statistics of network traffic, a load average of a machine, a running state of a printer, and the like. Further, it is always monitored to check whether data of dubious security flows through the network.

10. Support built in network

The appropriateness is diagnosed on a physical level upon extension of a network, addition of devices, and changes of position. It is checked whether, for example, a lack or an excess of an amount of electric supply, the number of plug receptacles, the limited length of a physical cable of the local area network, and the number of connectable terminals are appropriate.

11. Monitoring network

The site of the occurrence of a fault or a failure is identified in association with an expert diagnostic system, and an instruction is given for measures to be taken for recovery. Further, the machine or the terminal connected to the network is automatically monitored by making use of a managing protocol. Additionally, an abnormality is detected prior to the occurrence of a fault from a result of analysis obtained by the measurement of a load imposed upon the host machine or the network.

12. Integration of network

An overall decision is made of the data relating to the networks as described hereinabove, and advice is given as to what is lacking in the smooth operations for the network and how the network can be operated in an efficient way.

The aforesaid means disposed in the network management system according to the present invention can serve as reducing the managing business by the network manager and simplifying the managing business thereby. Further, they can serve as reducing the managing business by managers managing the materials and products and, at the same time, simplifying the managing business thereby. In addition, they permit the measures against abnormality of the network to be taken rapidly and readily. Moreover, the network management system with the aforesaid means can save the resources by sharing the computer resources and the data. Thus, the network management system according to the present invention can improve the reliability of the network.

It can further be noted that the means as described hereinabove can manage a fault for all the network devices because the state of the physical locations of the network devices can be displayed.

The location of the occurrence of the fault is displayed, together with the traffic means reaching the location thereof, when the fault has occurred, so that the fault can be recovered quickly.

Further, the management for the physical environment for configuring the network can be made to a sufficient extent because there can be displayed the position in which a radio wave fault may occur.

In addition, the performance of the network can be grasped easily because the amount of communication through the communication path is displayed by changing line widths on the display screen so as to correspond to the difference among amounts of the communication.

Furthermore, necessary security measures can be taken with ease because the entrance and the exit through which the intruder enters and exits can be displayed, so that security can be ensured.

Other objects, features and advantages of the present invention will become apparent in the course of the description of the specification with reference to the accompanying drawings.

BRIEF DESCRIPTION OF THE DRAWINGS

FIG. 1g is a diagram showing an example of the configuration of data relating to information of traffic means.

FIG. 1h is a diagram showing an example of the configuration of data relating to information of locations of installation of devices.

FIG. 2b is a schematic representation showing physically checking conditions according to an embodiment of the present invention.

FIG. 3c is a schematic representation showing logically checking conditions according to an embodiment of the present invention.

FIG. 5a is a schematic representation showing a table corresponding to the computers, terminals, and server devices according to an embodiment of the present invention.

FIG. 5b is a schematic representation showing a table corresponding to the network devices and the server devices according to an embodiment of the present invention.

FIG. 5c is a schematic representation showing a table corresponding to the users and the devices used by the users according to an embodiment of the present invention.

FIG. 5d is a schematic representation showing a table corresponding to the computers and the inherent software according to an embodiment of the present invention.

FIG. 5j is a schematic representation showing a display screen displaying an affected user and unavailable software according to an embodiment of the present invention.

FIG. 5k(2) is a diagram showing an example of a display of the location of the occurrence of the fault.

FIG. 5k(3) is a diagram showing an example of a display of the scope of influence of the fault upon other devices.

FIG. 5k(4) is a diagram showing an example of a display of the location of the occurrence of a fault having a higher magnitude of importance.

FIG. 5l(1) is a flowchart showing the processing procedures for re-displaying a course of the occurrence of a fault.

FIG. 5l(2) is a diagram showing an example of the configuration of a network as an object of management.

FIG. 5m(1) is a flowchart showing the processing procedures for displaying the traffic means to reach a building at a remote location.

FIG. 5m(2) is a diagram showing an example of a display of the traffic means at the remote location.

FIG. 5m(3) is a diagram showing an example of a logical connection of a network as an object of management.

FIG. 5m(4) is a diagram showing an example in which the segments in the physical connection of the network are represented in an intertwined manner.

FIG. 5n(1) is a flowchart showing the processing procedures for displaying a network zone.

FIG. 5n(2) is a diagram showing an example of a display of the drawing of the logical network configuration of the network zone.

FIG. 5n(3) is a diagram showing an example of a display of the drawing of the physical network configuration.

FIG. 5n(4) is a diagram showing an example of a display of the drawing of the physical network configuration of the network zone.

FIG. 5o(1) is a diagram showing an example of a display of the configuration of a database relating to management information.

FIG. 5o(2) is a flowchart showing the processing procedures for displaying on a floor map a scope of illumination having a magnitude equal to or lower than the minimum limit.

FIG. 5o(3) is a diagram showing an example of a display of the scope of illumination having the magnitude equal to or lower than the minimum limit on the floor map.

FIG. 5p(1) is a flowchart showing the processing procedures for displaying a scope of the range of radio waves having a magnitude of the minimum limit on a floor map.

FIG. 5p(2) is a diagram showing an example of a display of the scope of the range of radio waves having the magnitude of the minimum limit on the floor map.

FIG. 5q(1) is a diagram showing an example of a display of the drawing of the logical network configuration in accordance with a management level.

FIG. 5q(2) is a diagram showing an example of a display of a hierarchical structure of a network.

FIG. 5q(3) is a diagram showing an example of a display of the configuration of network numbers of the hierarchical network structure.

FIG. 5q(4) is a diagram showing an example of indicating the numbering of the network hierarchy.

FIG. 5q(5) is a diagram showing an example of a display of the network numbers of each network hierarchy.

FIG. 5q(6) is a diagram showing an example of the configuration of a database relating to the relationship of the networks.

FIG. 5q(7) is a diagram showing an example of the configuration of a database relating to connection information.

FIG. 5q(8) is a diagram showing an example of the configuration of a database relating to display information.

FIG. 5q(9) is a diagram showing an example of the configuration of a trunk topology.

FIGS. 5r(1a)–5r(1d) show examples of trunk topologies.

FIG. 5r(2) is a flowchart showing the processing procedures for displaying trunk devices to be managed, devices to be managed, and connection with another network in accordance with a management level.

FIG. 5r(3) is a diagram showing an example of the configuration of a database relating to information of management levels.

FIGS. 5r(4a)–5r(4c) show examples of a display of a trunk topology.

FIG. 5r(5) is a diagram showing an example of dividing the management levels.

FIG. 5s(1) is a flowchart showing the processing procedures for displaying a drawing of a two-dimensional network configuration in accordance with a management level.

FIG. 5s(2) is a diagram showing an example of a display of the drawing of the two-dimensional network configuration in accordance with a management level.

FIG. 5s(3) is a diagram showing an example of the configuration of a database storing the relationship of correspondence of network numbers to plane maps.

FIG. 5s(4) is a diagram showing an example of the configuration of a database storing the relationship of correspondence of network numbers to display positions thereof.

FIG. 5t(1) is a flowchart showing the processing procedures for displaying the relationship of connection with an external network.

FIG. 5t(2) is a diagram showing an example of the configuration of a database storing types of connection with the external network.

FIG. 5t(3) is a diagram showing an example of the configuration of a database storing the relationship of the types of connection to the external networks with the display methods.

FIG. 5t(4) is a diagram showing an example of a display of the relationship of connection to the external networks.

FIG. 5u(1) is a flowchart showing the processing procedures for displaying an entrance of an intruder or a careless person into a network from outside.

FIG. 5u(2) is a diagram showing an example of the configuration of a database relating to the relationship of plane maps with intrusion levels.

FIG. 5u(3) is a diagram showing an example of the configuration of a database relating to the relationship of intrusion levels with display methods.

FIG. 5u(4) is a diagram showing an example of a display of an entrance of an intruder or a careless person.

FIG. 5v(1) is a flowchart showing the processing procedures for displaying a traffic amount.

FIG. 5v(2) is a diagram showing an example of a display of a network for which the traffic amounts are to be measured.

FIG. 5v(3) is a diagram showing an example of the configuration of a packet for searching for a path to be used for measuring the traffic amount.

FIG. 5v(4) is a diagram showing an example of the configuration of a database storing the relationship of correspondence of the network numbers to be used for measuring the traffic amount to the addresses within the network.

FIG. 5v(5) is a diagram showing an example of the configuration of a database storing the relationship of correspondence of the network numbers to be used for measuring the traffic amount to a velocity of communication.

FIG. 5v(6) is a diagram showing an example of the configuration of a database storing the relationship of correspondence of the measured traffic amounts to the display methods.

FIG. 5v(7) is a diagram showing an example of a display of flows of an instruction to measure the traffic amount.

FIG. 5v(8) is a diagram showing an example of a display of flows of a packet to be returned from a device having received the instruction to measure the traffic amount.

FIG. 5v(9) is a diagram showing an example of a display of the measured traffic amounts.

FIG. 6f(1) is a block diagram for describing a concept of a hierarchical structure of the network according to an embodiment of the present invention.

FIG. 6f(2) is a block diagram indicating the numbering at each hierarchy in the network according to an embodiment of the present invention.

FIG. 6f(3) is a block diagram indicating the network number at each hierarchy in the network according to an embodiment of the present invention.

FIG. 6g is a schematic representation for describing the configuration of the network number according to an embodiment of the present invention.

FIG. 6h is a schematic representation showing a table corresponding to the devices to be managed, subnetworks and network number according to an embodiment of the present invention.

FIG. 6i is a schematic representation showing a table corresponding to the network number and connection data according to an embodiment of the present invention.

FIG. 6j is a schematic representation showing a table corresponding to the network number and display data according to an embodiment of the present invention.

FIG. 6k(1) is a block diagram for describing the concept of a topology according to an embodiment of the present invention.

FIG. 6k(2) is a schematic representation showing a table corresponding to the network number, the topology, and the devices to be managed, serving as a tree thereof, according to an embodiment of the present invention.

FIG. 6*l* is a block diagram showing another display screen displaying each topology according to an embodiment of the present invention.

FIG. 6*m* is a schematic representation showing a plane map table according to an embodiment of the present invention.

FIG. 6*n* is a schematic representation showing a table corresponding to the network number and the display position on the plane map according to an embodiment of the present invention.

FIG. 6*o* is a schematic representation showing a display screen displaying a plane map according to an embodiment of the present invention.

FIG. 6*q* is a schematic representation showing a display screen displaying a space map according to an embodiment of the present invention.

FIG. 6*r* is a schematic representation showing a table corresponding to the network number and the space map according to an embodiment of the present invention.

FIG. 6*s* is a schematic representation showing a table corresponding to the network number and the display position on the space map according to an embodiment of the present invention.

FIG. 7*a* is a flowchart showing processing procedures for preparing the configuration of a network having less traffic according to an embodiment of the present invention.

FIG. 7*b* is a schematic representation showing a table corresponding to the network number and the historical data of the traffic according to an embodiment of the present invention.

FIG. 7*c*(1) is a schematic representation showing the configuration of the network prior to inference, according to an embodiment of the present invention.

FIG. 7*c*(2) is a schematic representation showing an amount of communication of the network prior to inference, according to an embodiment of the present invention.

FIG. 8*a* is a flowchart showing processing procedures for drawing the attention of a user under a scope of influence, according to an embodiment of the present invention.

FIG. 8*b* is a schematic representation showing a mail message informing of an unavailable software item according to an embodiment of the present invention.

FIG. 9*a* is a schematic representation showing the structure of a packet according to an embodiment of the present invention.

FIG. 9*b* is a schematic representation showing a table authorizing communication according to an embodiment of the present invention.

FIG. 9*c* is a schematic representation showing a route table according to an embodiment of the present invention.

DESCRIPTION OF THE PREFERRED EMBODIMENTS

Figure 1A:
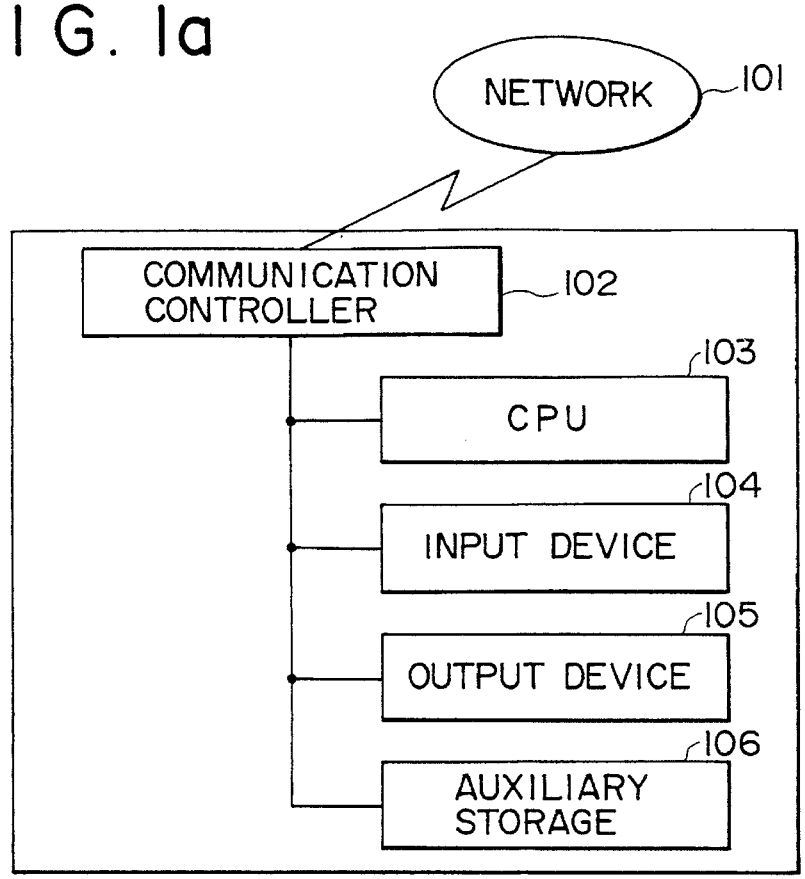
FIG. 1a is a block diagram showing the configuration of a system for operating and managing network equipment according to an embodiment of the present invention.

FIG. 1*a* is a block diagram showing the configuration of the system for operating and managing network equipment according to an embodiment of the present invention. The objective devices which the system for operating and managing the network manages are referred to as the devices to be managed in this specification. For brevity of description, the devices to be managed are classified into, for example, five categories: computers, terminals, network devices, peripheral devices, and cables. The computers may include, for example, work stations, personal computers, host machines, and the like. The terminals may include, for example, X-terminals, character terminals, graphics terminals, and the like. The network devices may include, for example, routers, repeaters, terminal servers, transceivers, and the like. The peripheral devices may include, for example, printers, facsimile machines, scanners, and the like. The cables may include, for example, Ethernet cables, telephone lines, power cables, and the like. The network is the one to which the devices to be managed are connected and in which communication is performed among the devices.

As shown in FIG. 1*a*, reference numeral 102 stands for a communication controller for controlling communication between the system for operating and managing the network equipment and a network 101 which in turn denotes a network to which a device to be managed by the system for operating and managing equipment of the network is connected through a cable; reference numeral 103 stands for a central processing unit (CPU) for performing data processing, system control, and other processing programmed in advance; reference numeral 104 stands for an input device such as a keyboard, a mouse, a touch screen, or the like; reference numeral 105 stands for an output device such as a display device, a printer, or the like; and reference numeral 106 stands for an auxiliary storage device such as magneto-optic disks, metallic tapes, hard disks, or the like.

A description is first made of the terms and the configuration of the network, referred to in the specification.

The configuration of the network means to indicate a configuration in which the computers, the terminals, the network devices, the peripheral devices and the cables are connected with each other. Further, it may include, for example, a physical configuration of the network, which indicates a state of connection, including the actual positions of connection, the distance of connection, and the like; and a logical configuration of the network, which indicates a state of connection in logical units, such as a subnet or a segment.

Figure 1B:
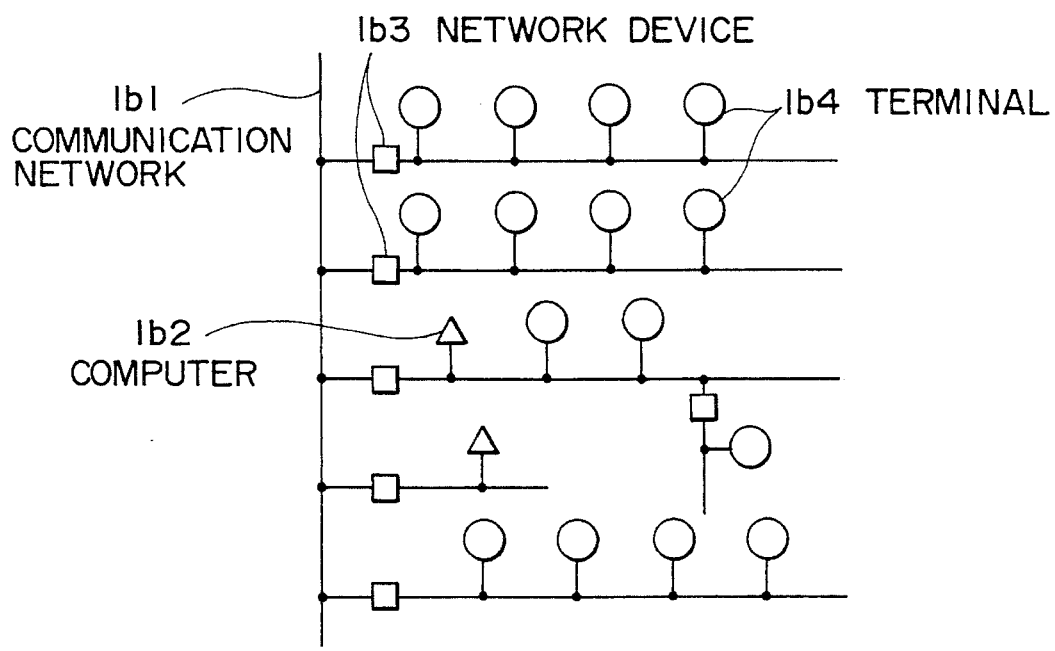
FIG. 1b is a schematic representation for describing the configuration of a logical network according to the embodiment of the present invention.

FIG. 1*b* is a schematic representation for describing the logical network configuration according to the present embodiment. As shown in FIG. 1*b*, reference numeral 1*b*1 stands for a communication network, reference numeral 1*b*2 stands for a computer, reference numeral 1*b*3 stands for a network device, and reference numeral 1*b*4 stands for a terminal.

Next, a description will be made of a database prepared in the auxiliary storage device 106.

Figure 1C:
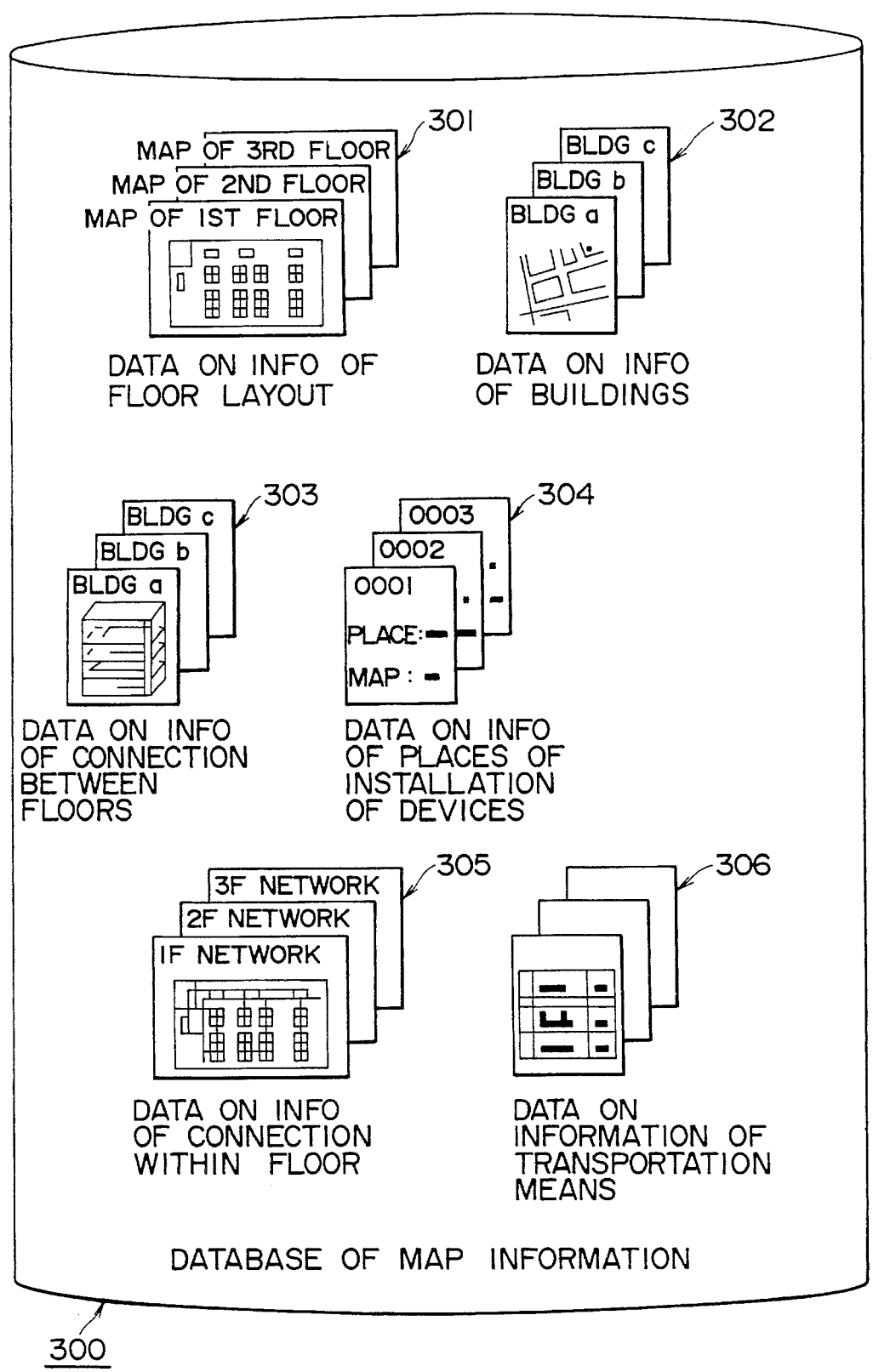
FIG. 1c is a diagram showing an example of the configuration of a database relating to information of maps.

FIG. 1*c* shows the configuration of a database 300 relating to information of maps, configured in the system. The database 300 relating to information of the map holds a variety of information for representing the physical configuration of the network and the logical configuration of the network, and comprises data 301 relating to information of a layout of floors, data 302 relating to information on buildings, data 303 relating to information on connection of the network among floors, data 304 relating to information of locations of the installation of devices, data 305 relating to connection of the network in a floor, and data 306 relating to information of traffic means.

The data 301 relating to the information on the floor layout is data indicative of information on the locations of columns, walls, booths, tables, and so on, on each floor of a building. The data 302 relating to the information of the buildings is data indicative of information on the locations of the buildings on the map. The data 303 relating to the information of the connection among the floors is data indicative of information on the state of the longitudinal and physical connection of the network and the connecting wiring among the floors.

The data 304 relating to the information of the locations of the installation of the devices is data indicative of information on the locations of the installation of the computers and the network devices, connected to the network, and on the corresponding map. The data 305 relating to the information on the connection in the floor is data indicative of the state of the physical connection of the network devices and the network wiring on each of the floors. The data 306 relating to the information on the traffic means is data indicative of information on the traffic means and connecting paths among the buildings.

Figure 1D:
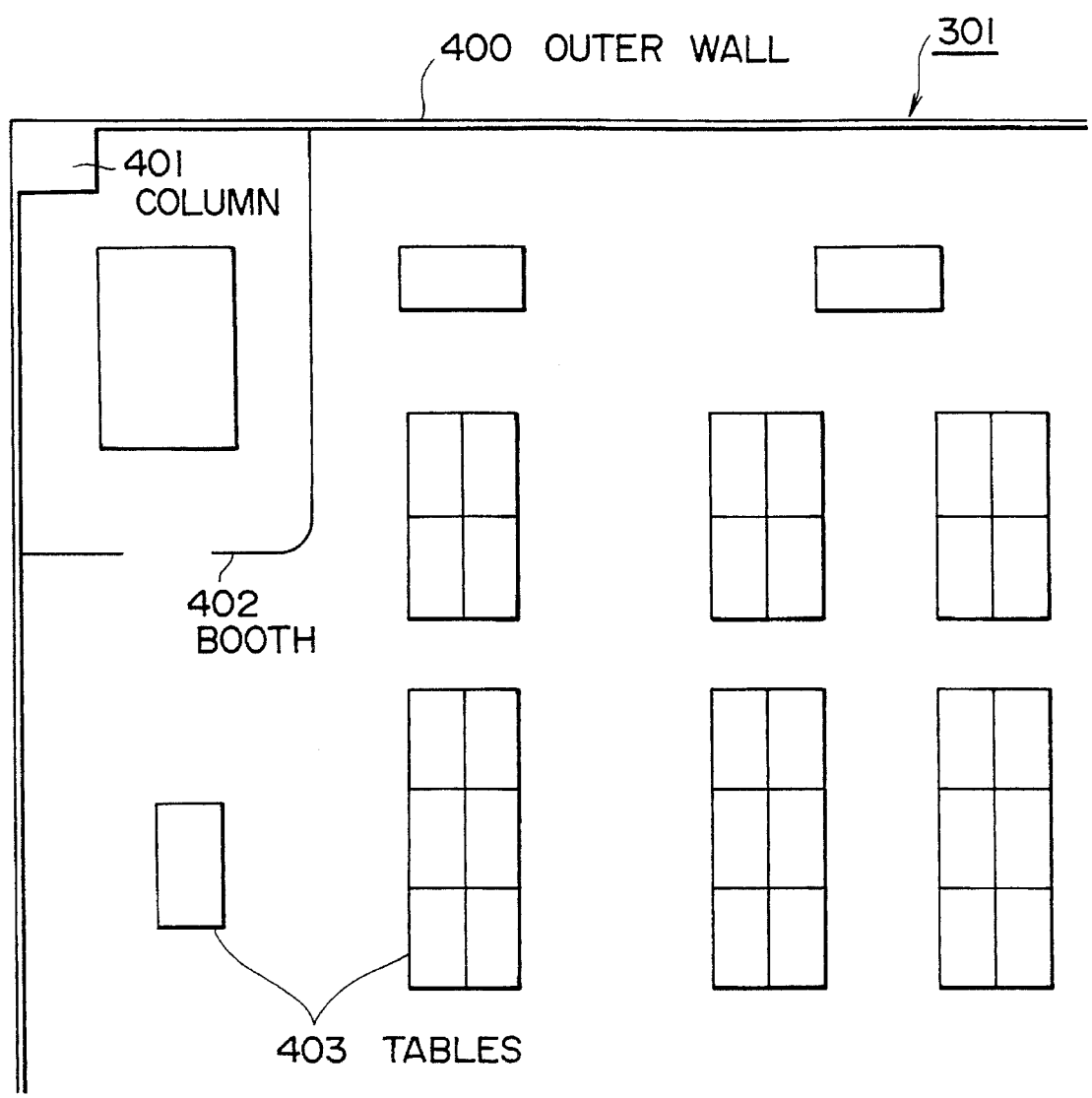
FIG. 1d is a diagram showing an example of the display of a layout of a floor.

FIG. 1*d* shows an example of the configuration of the data 301 relating to the information on the floor layout, which is indicative of the locations of the outer walls 400, the columns 401, etc., and the installation of the booths 402, the tables 403, etc., and on a predetermined scale of a drawing indicating the actual configuration of the floor.

Figure 1E:
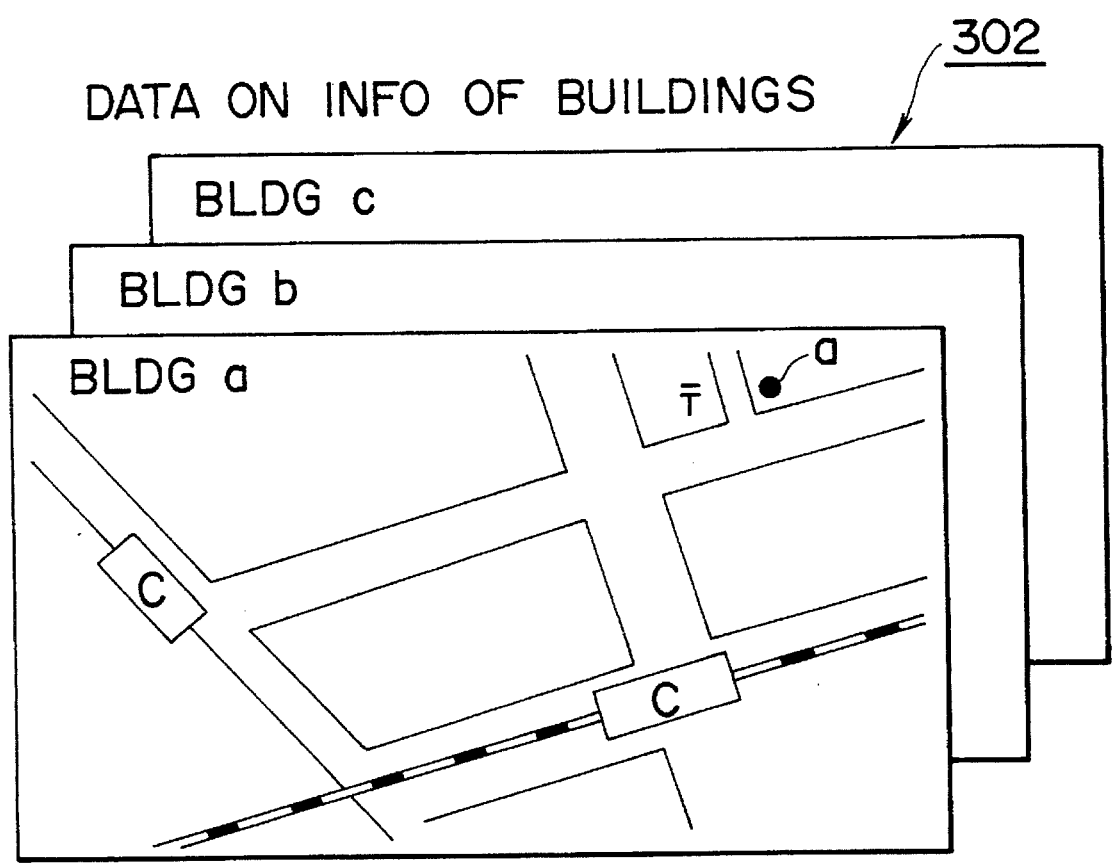
FIG. 1e is a diagram showing an example of the configuration of data relating to information of buildings.

FIG. 1*e* shows an example of the configuration of the data 302 relating to the information on the buildings, and represents a map indicative of an area in the vicinity of each of the buildings a to c, in which the network devices to be managed by the system according to the present invention are installed.

The data 303 relating to the information of the connection of the network among the floors is so arranged as to indicate the data on the relationship of the connection among the floors, although not shown in the drawing. As shown in FIG. 1*h*, the data 304 relating to the information on the locations of the installation of the devices is so arranged as to indicate the buildings and the floors, in which and on which the various network devices are installed, respectively, which are to be identified by identification numbers of the network devices.

Figure 1F:
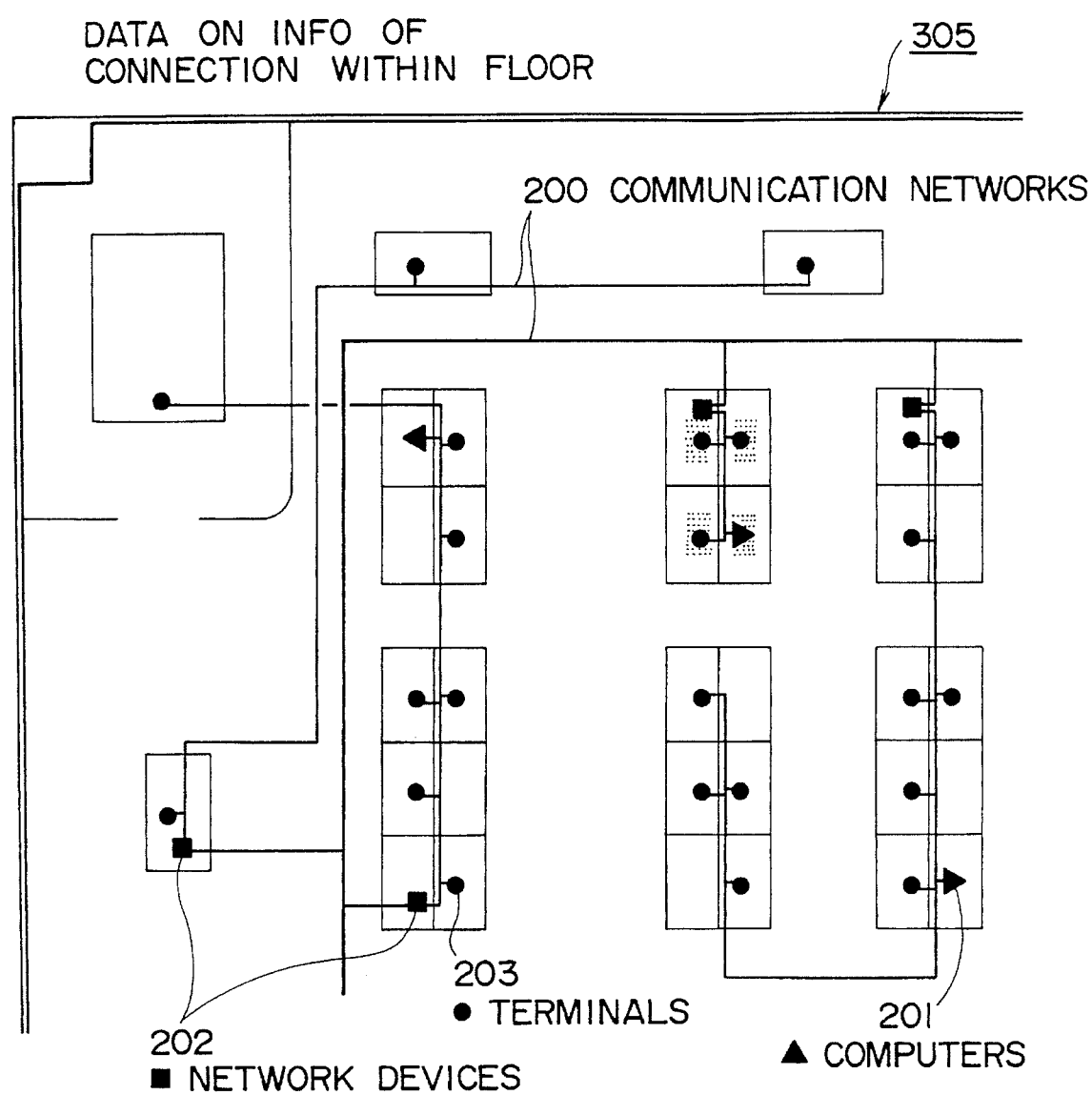
FIG. 1f is a diagram showing an example of the configuration of data relating to information of connection at a floor for describing the configuration of the physical network.

FIG. 1*f* shows an example of the configuration of the data 305 relating to the information of the connection of the network in the floor, which indicates the actual state of the connection of communication network 200, the computers 201, the network devices 202, and the terminals 203 on the map of each of the floors as shown in FIG. 1*d*.

FIG. 1*g* shows an example of the configuration of the data 306 relating to the information on the traffic means, which is indicative of the traffic means between the buildings a to c, in which the network devices are installed, and transportation fares and traffic expenses between the buildings.

On the other hand, the auxiliary storage device 106 of FIG. 1*a* contains a database of faults, storing a variety of information on the faults, in order to display the number of occurrences of faults at the time of occurrence of the faults, the scope of influence of the faults, and the locations of the faults in accordance with the degree or magnitude of significance of the faults.

Figure 1I:
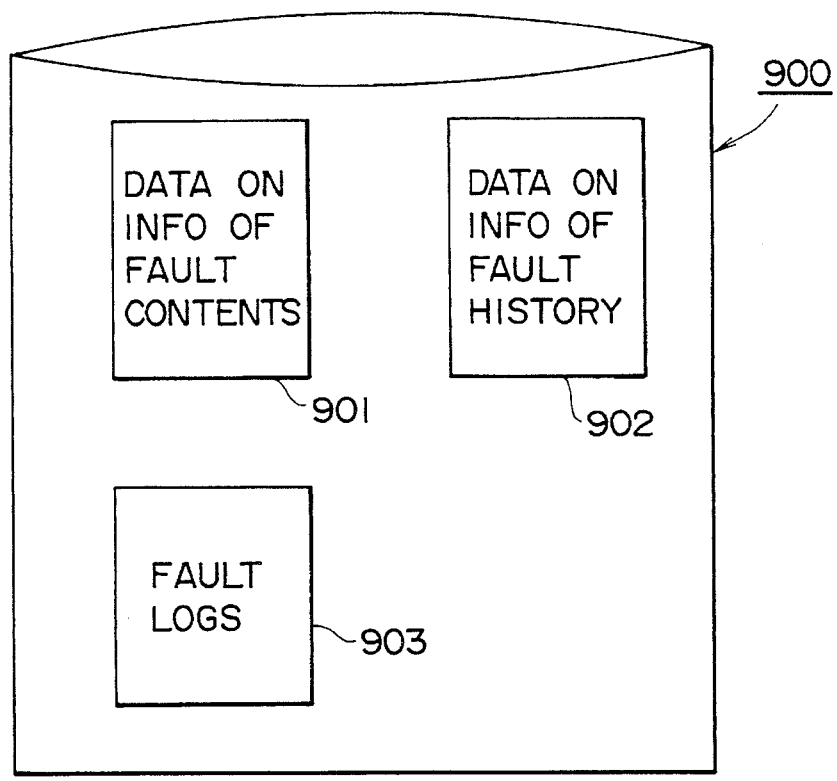
FIG. 1i is a diagram showing an example of the configuration of faults.

FIG. 1*i* shows an example of the configuration of the database 900 of faults, which comprises data 901 on information of the contents of faults, data 902 on information of the history of each of the faults, and the fault logs 903.

Figure 1J:
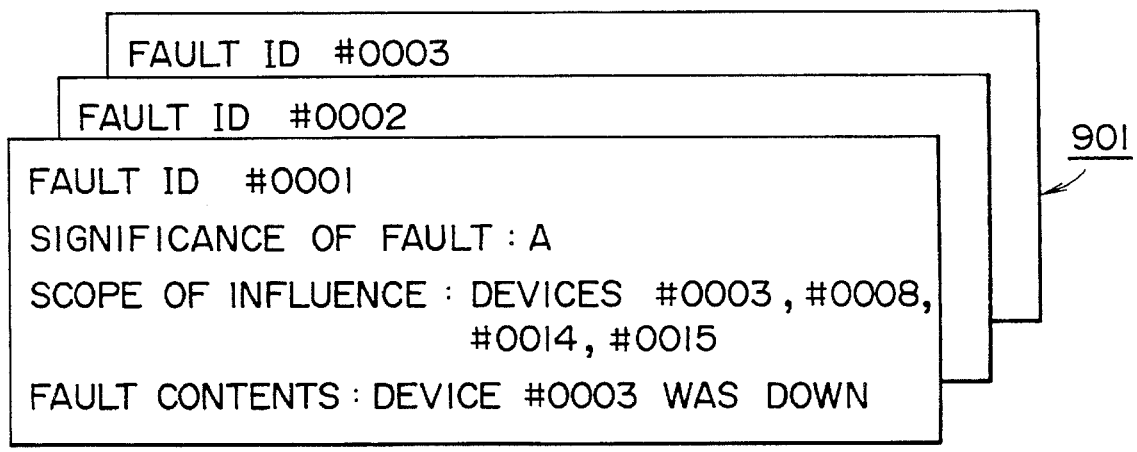
FIG. 1j is a diagram showing an example of the configuration of the contents of the faults.

FIG. 1*j* shows an example of the configuration of the data 901 of the faults, which is indicative of the fault contents, the fault corresponding to the fault contents, the degree or magnitude of significance of the fault, and the scope of influence in case of the occurrence of the fault.

Figure 1K:
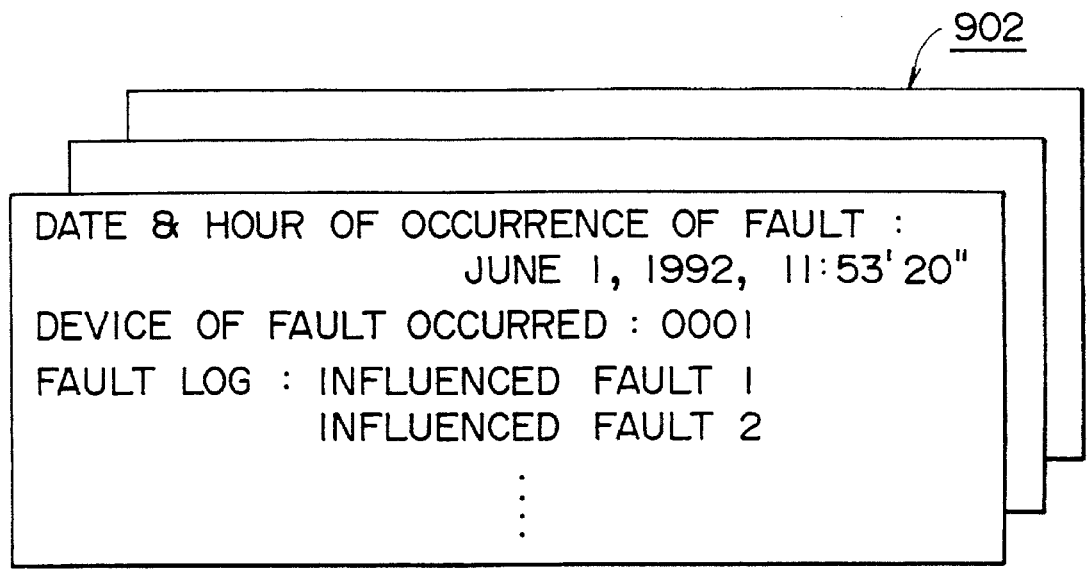
FIG. 1k is a diagram showing an example of the configuration of a database of history of the faults.

FIG. 1*k* shows an example of the configuration of the data 902 on the information of the history of each fault, which indicates the date and the time of the occurrence of the fault, the identification of the device in which the fault occurred, and the fault log indicative of the scope of extension of the fault to other devices.

Figure 1L:
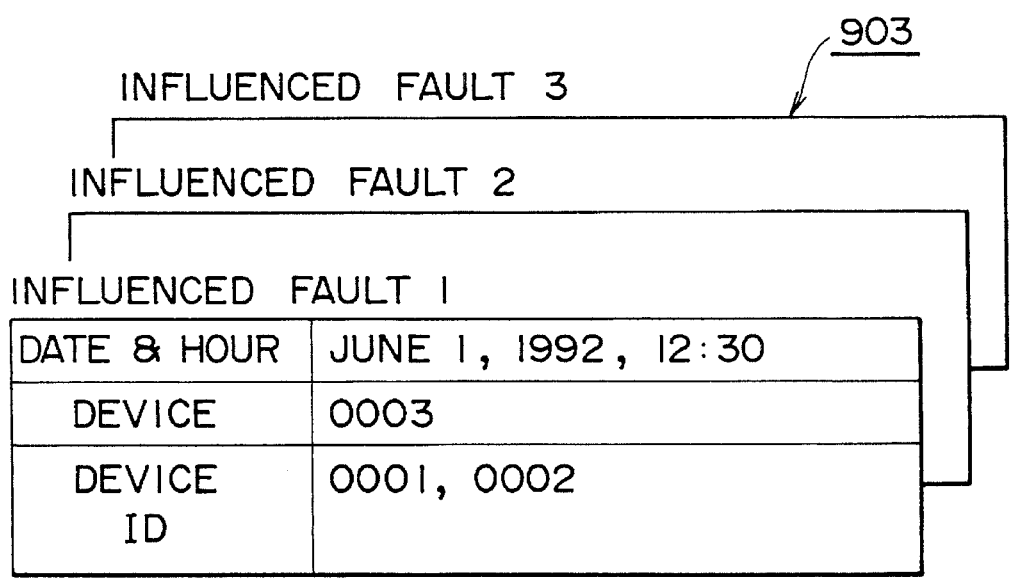
FIG. 1l is a diagram showing an example of the configuration of a fault log indicative of a fault exerting an influence upon other devices.

FIG. 1l shows an example of the configuration of the fault logs 903 contained in the data 902 indicative of the history of the fault. The fault logs 903 are indicative of the date and time of the occurrence of the fault that was caused to occur due to the extension of the previous fault, the identification number of the device that caused the fault as a result of the occurrence of the previous fault, and the identification number of the fault, indicative of the fault that was caused to occur due to the extension of the previous fault.

Now, a description will be made of the drawing of the network configuration to be employed for the embodiment of the present invention.

The drawing of network configuration is meant to indicate a generalized drawing of the physical network configuration and the logical network configuration, and it represents the disposition of the devices to be managed by the network management system on a map on a predetermined scale, a drawing of the building or a drawing of a floor, and the state of the physical connection of the network, including the state of the installation of the cables, and the disposition of power sources and telephones, together with the actual distance and area of installation and disposition.

The drawing of the network configuration is a drawing to be displayed on the display screen indicating the data 301 relating to the information on the layout of the floor, as shown in FIG. 1*d*. The drawing of the configuration of the network is displayed on the output device 105, for example, as shown in FIG. 1*f*, by making reference to the database 901 on the information of the fault contents and the database 902 on the information of the history of the fault, stored in the fault database 900. The drawing is made on the basis of the data 303 on the information of the connection of the network devices among the floors, the data 304 on the information of the locations of the installation of the devices, and the data 305 on the information of the connection thereof in the floor. To make the drawing, a search is made for the necessary information from the information stored in the database 300 within the auxiliary storage device 106 in accordance with the position to be displayed, the scope to be displayed, the device to be managed, the security level, or the object, and integrating the necessary information. The information stored in the database 300 includes, for example, the physical network configuration, the logical network configuration, the network wiring, the drawing of floors, maps, the history of the fault, the disposition of illuminating units, an amount of heat generated from the computers and the network devices, statistical information of network traffic, a path of the incoming and outgoing of dynamic information, a rate of use of a network circuit, a traffic path, and so on.

A description will now be made of the procedures for checking whether the network specification satisfies the physical requirements in the system for operating and managing the network equipment according to the present invention on the basis of the data stored in the database. The physical requirements referred to herein are intended to mean conditions including, for example, a restriction of the length of an Ethernet cable and a bend ratio thereof, a relationship between the electrical capacitance necessary for the devices to be managed and the power, an area necessary for the disposition of the devices to be managed, the cable length, the number of transceivers, sheets of available second Ethernet boards, the number of ports of the terminal servers, the multiport repeaters, and the like.

Figure 2A:
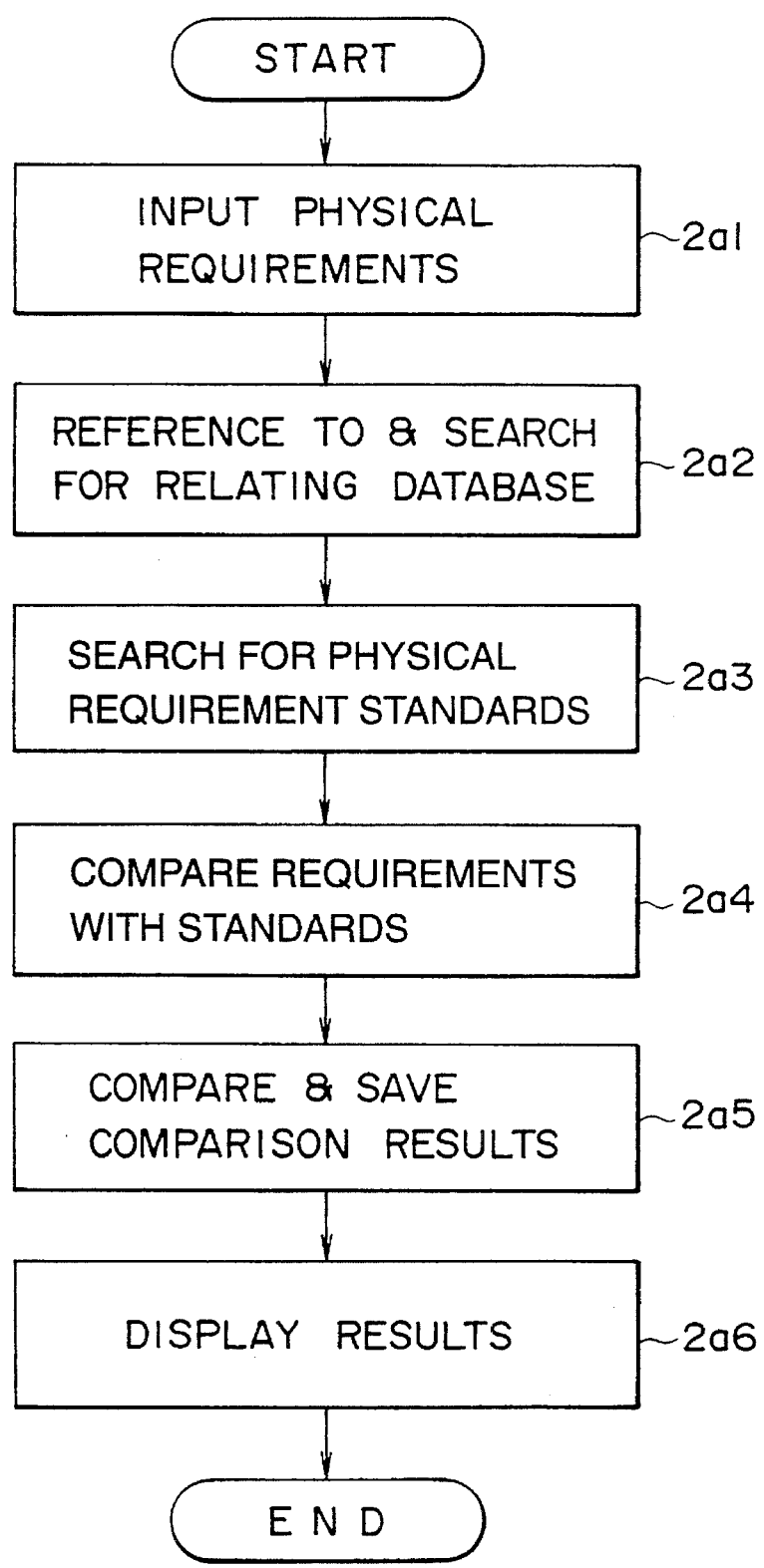
FIG. 2a is a flowchart showing checking processing means for checking physical conditions according to an embodiment of the present invention.

FIG. 2a is a flowchart showing processing procedures for checking the physical conditions in the system for operating and managing the network equipment according to the embodiment of the present invention, when the physical requirements are entered.

Next, a description will be made of a flow of the checking processing for checking the physical conditions for the system for operating and managing the network equipment with reference to FIG. 2a.

First, at step 2a1, the physical requirements are entered by using the input device, which include, for example, the cable length necessary for the network configuration, the electrical capacitance, the area of devices to be installed, the location of installation, the access terminal, the number of extended boards, the shape of a network port, and the like. Then, at step 2a2, a search is made for data relating to the physical requirements, entered at step 2a1, with reference to the database. The database is adapted to store enough data to grasp a current state of the network configuration, and the physical requirements can be searched for by referring to a key word. As the data that can grasp the state of the network configuration, there may be stored the physical data including, for example, maps, layouts, states of wiring, the number of machines installed, the wiring of power, access devices, and the like, in the system for operating and managing the network equipment.

Further, at step 2a3, a search is made for the physical requirement standards, as shown in FIG. 2b, stored in the system for operating and managing the network equipment, in accordance with the requirements entered at step 2a1. Then, at step 2a4, whether or not the standards obtained at step 2a3 are satisfied is compared with the physical requirements on the basis of a result of the search relating to the standards, obtained at step 2a3, and a result of the search relating to the current state of the network configuration, obtained at step 2a2. Further, at step 2a5, a result of the comparison obtained at step 2a4 is stored at the predetermined location of the storage device. At step 2a6, the result of the comparison stored at step 2a5 is displayed through the display unit.

A description will next be made of the procedures for checking whether the network specification satisfies the logical requirements, on the basis of the data stored in the database, in the system for operating and managing the network equipment according to the present invention. The logical requirements referred to herein are intended to mean conditions including, for example, the number of machines accessible to one segment, an upper limit of an amount of traffic, the detection of an abnormal packet, an upper limit of a load average of the central processing unit (CPU), a used amount of a disk, an amount of a used swap size, a shortage of memory, a procedure of clicking logical segments with a bridge or a router, and the like.

Figure 3A:
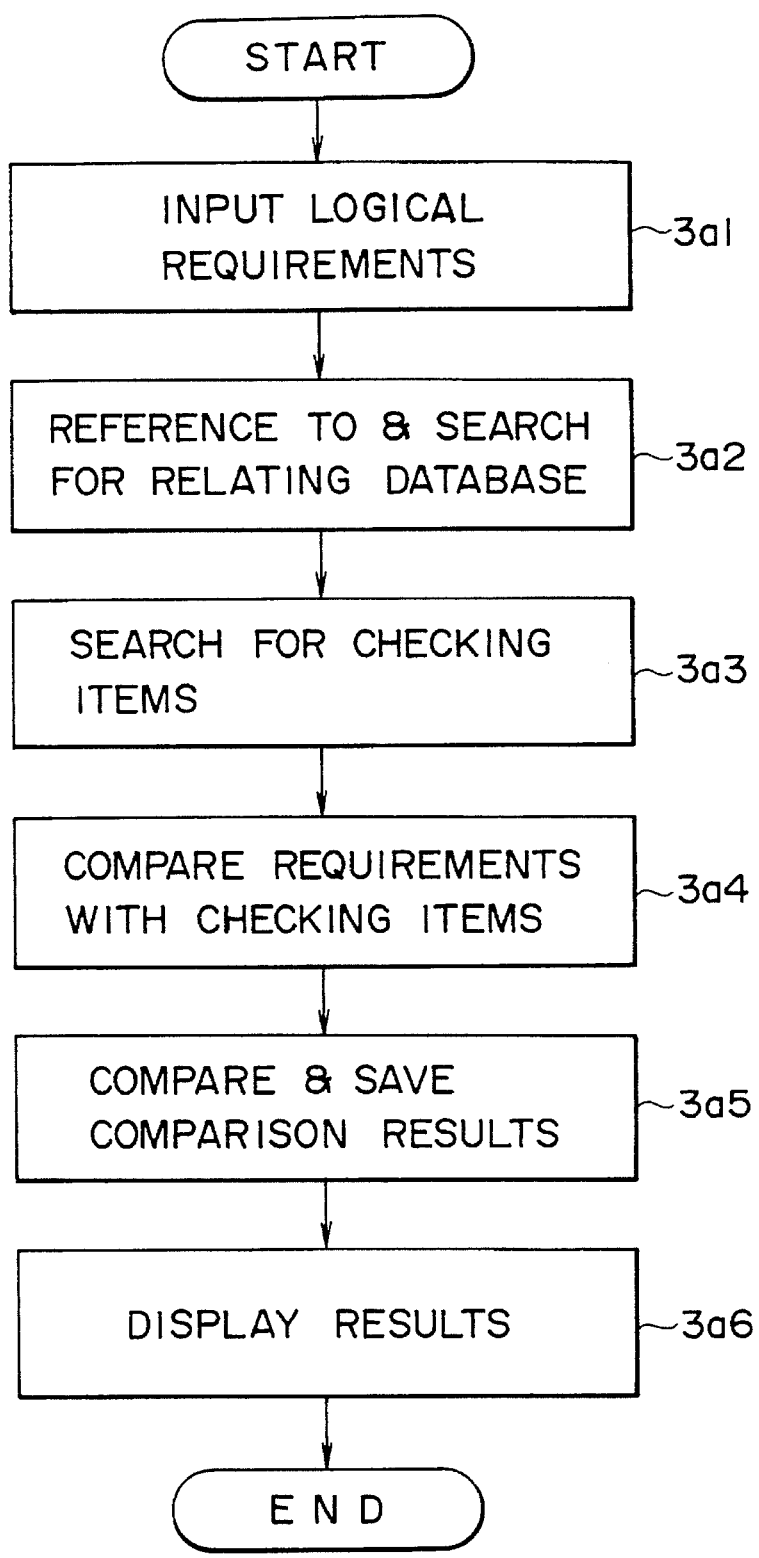
FIG. 3a is a flowchart showing checking processing means for checking logical conditions according to an embodiment of the present invention.

FIG. 3a is a flowchart showing an example of the processing procedures for checking the logical conditions in the system for operating and managing the network equipment according to an embodiment of the present invention, when the logical requirements are entered.

Figure 3B:
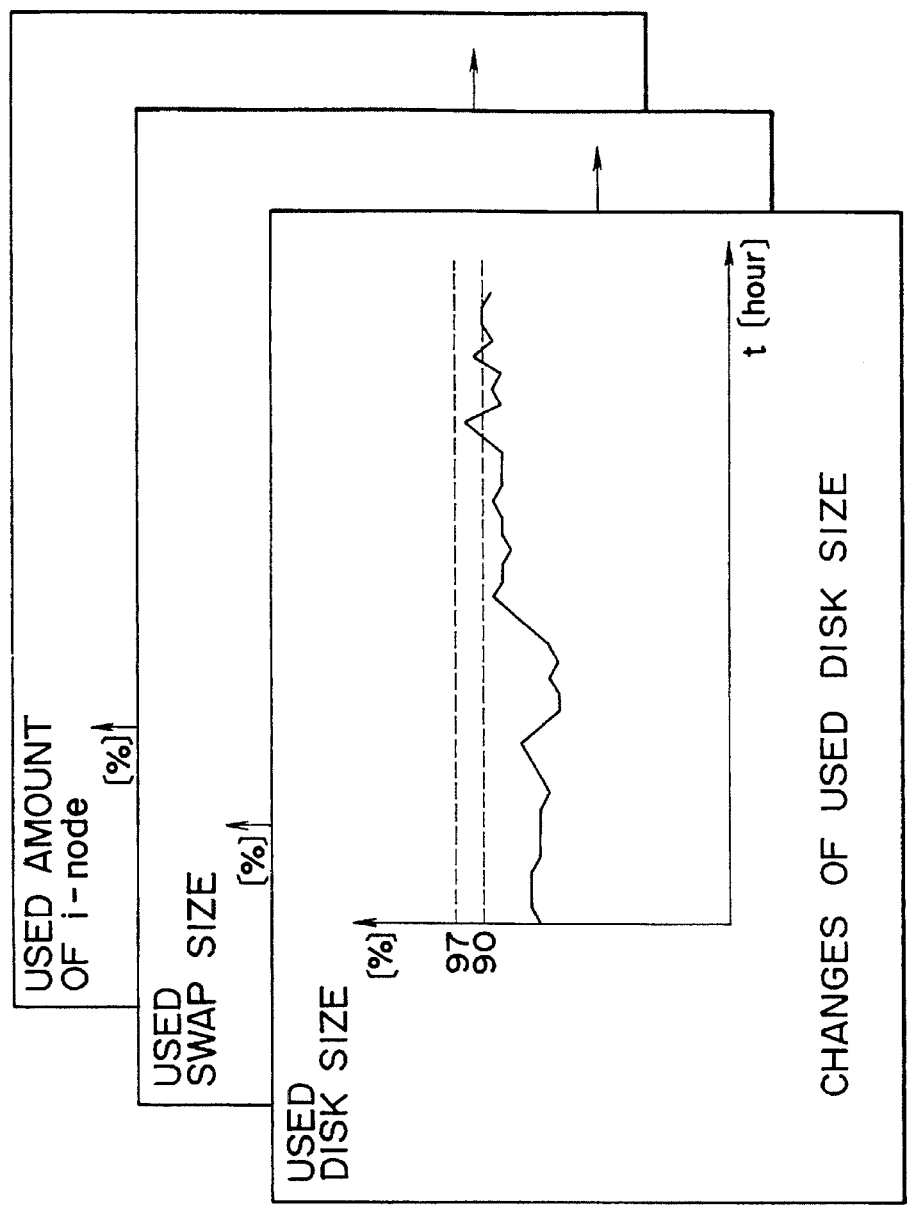
FIG. 3b is a schematic representation showing logically checking conditions according to an embodiment of the present invention.

A description will now be made of the flow of the processing procedures for checking the logical conditions in the system for operating and managing the network equipment, with reference to FIG. 3a. First, at step 3a1, the logical requirements are entered through the input device. The logical requirements which are to be entered herein may include, for example, the cable length required for the network configuration, the electrical capacitance, the area of installation of devices, the location of installation, accessible terminals, the number of extended boards, the shape of a network port, and the like. Then, at step 3a2, the data associated with the logical requirements entered at step 3a1 is searched for with reference to the database. The database is so adapted as to store enough data to grasp the current network topology, and a search can be made by using the logical requirement as a key word. As the data capable of grasping the network topology, the system for operating and managing the network topology, the system for operating and managing the network equipment is so adapted as to store the logical data, such as a log of network traffic as shown in FIG. 3b, statistics of a load average of the central processing unit (CPU), a change of used amounts of a disk, a log of an outgoing packet, and the number of virtual terminals to be employed.

Further, at step 3a3, a search is made for the logical requirement standards as shown in FIG. 3c, stored by the system for operating and managing the network equipment, on the basis of the requirements entered at step 3a1. Then, at step 3a4, a result of the search relating to the standard searched for at step 3a3 is compared with a result of the search relating to the current network topology obtained at step 3a2 in order to determine whether the standard is satisfied. The program flow then goes to step 3a5 at which the result of comparison obtained at step 3a4 is stored in the predetermined storing position, followed by proceeding to step 3a6 at which the result of comparison stored at step 3a5 is displayed with the display unit.

Next, a description will be made of the procedure for making a search for the corresponding data, the search being made for displaying the drawing of the network configuration which indicates the state of connection of the computers, the terminals, the network devices, the peripheral devices, and the cables within the scope of management in the system for operating and managing the network equipment according to the embodiment of the present invention and by identifying a certain computer, terminal, network device, peripheral device or cable from those as displayed in the drawing of the network configuration.

Figure 4A:
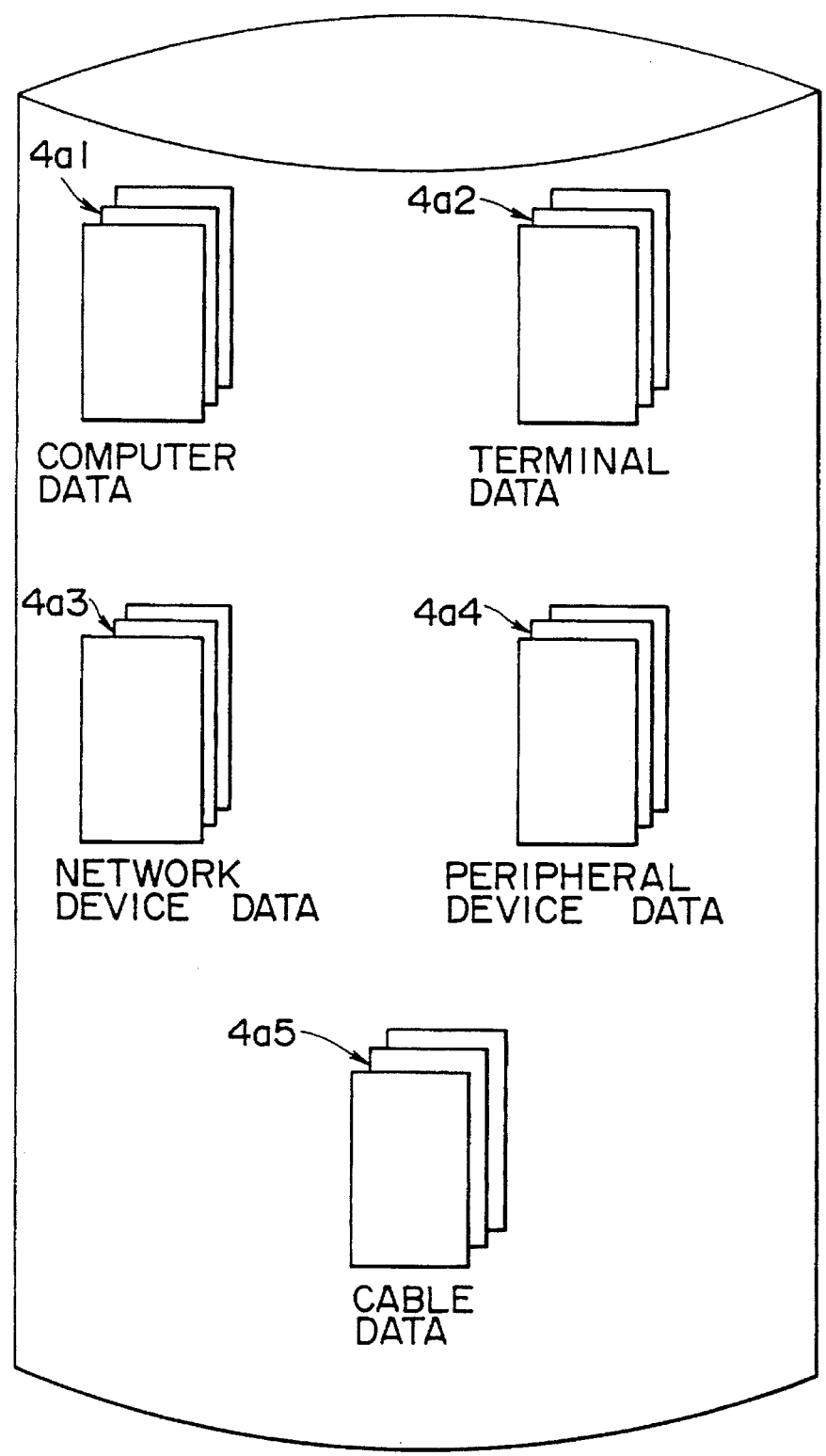
FIG. 4a is a block diagram showing the configuration of a database for operating and managing network equipment according to an embodiment of the present invention.

In order to make a search for the data relating to the computer, terminal, network device, peripheral device or cable, the system for operating and managing the network equipment is provided with the database for operating and managing the equipment as shown in FIG. 4a within an auxiliary storage device. The database may contain, for example, computer data 4a1, terminal data 4a2, network device data 4a3, peripheral device data 4a4, and cable data 4a5. The computer data 4a1 is so adapted as to register the attributes relating to each computer, and the data registered in the computer data 4a1 may include, for example, the name of the product, the name of the model, the name of the CPU, the access speed, the clock number, the running OS, extended peripheral devices, and so on. Further, the terminal data 4a2 is so adapted as to register data of each of the terminals, including, for example, the name of the product, the name of the model, the display size, resolution, and so on; the network device data 4a3 is so adapted as to register data of each of the network devices, including, for example, the name of the product, the name of the model, connected interface, the kind of communication protocol, and so on;

the peripheral device data 4a4 is so arranged as to register each of the peripheral devices, including, for example, the name of the product, the name of the model, the connected interface, the connected protocol, and so on; and the cable data 4a5 is so adapted as to register data of each of the cables, including, for example, the name of the product, the name of the model, the connected devices, the electric characteristics, and so on.

Figure 4B:
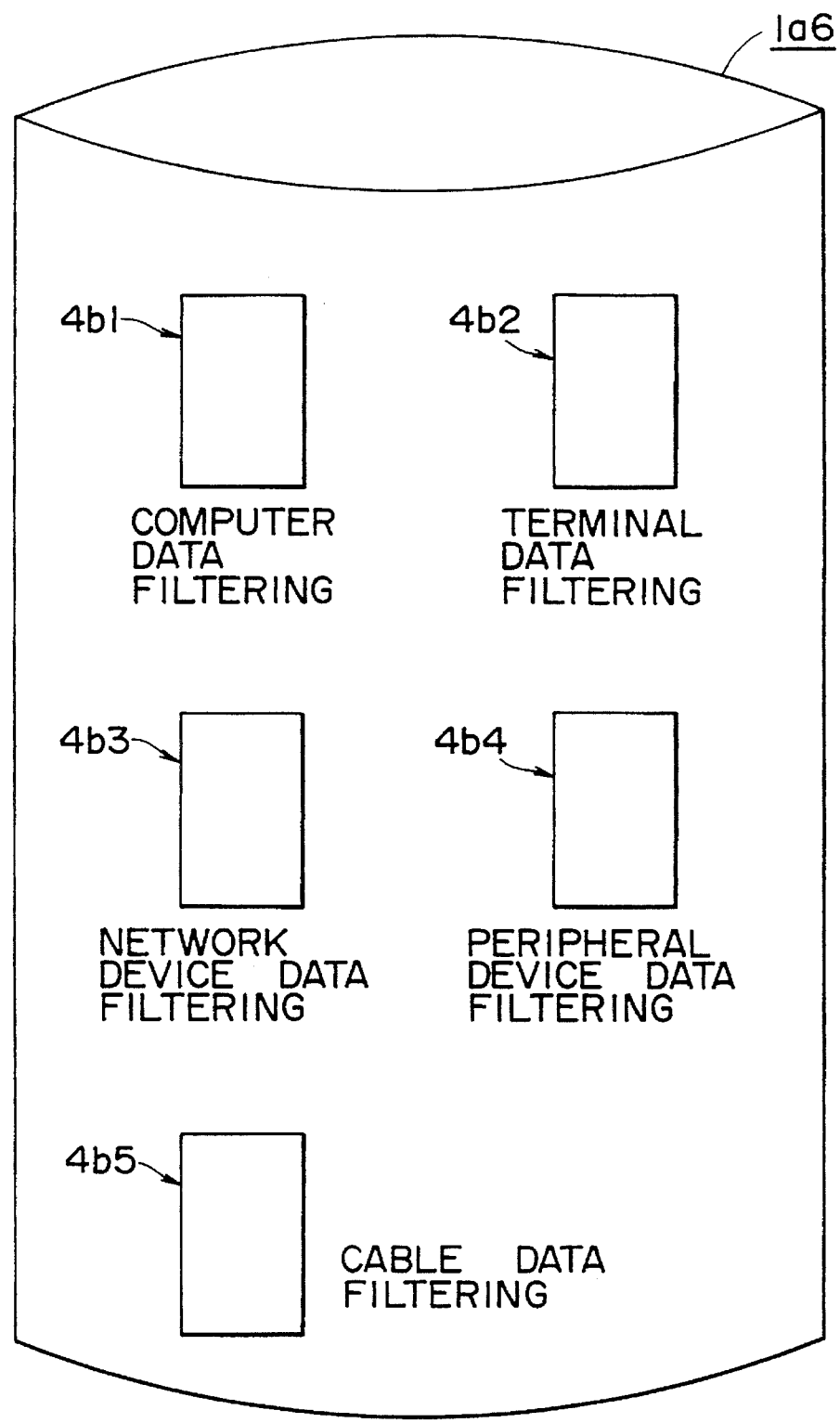
FIG. 4b is a block diagram showing the configuration of a filtering table according to an embodiment of the present invention.

In addition to the database for operating and managing the equipment of FIG. 4a as described hereinabove, the system for operating and managing the network equipment has a filtering table as shown in FIG. 4b. The filtering table may contain computer data filtering, terminal data filtering, network device data filtering, peripheral device data filtering, and cable data filtering, corresponding to the computer data 4a1, the terminal data 4a2, the network device data 4a3, the peripheral device data 4a4, and the cable data 4a5, respectively, each stored in the database for operating and managing the equipment. The data filtering is so adapted as to specify whether to display the attributes of each of the devices, which are employed when a search for data is made from the database for operating and managing the equipment as shown in FIG. 4a.

Figure 4C:
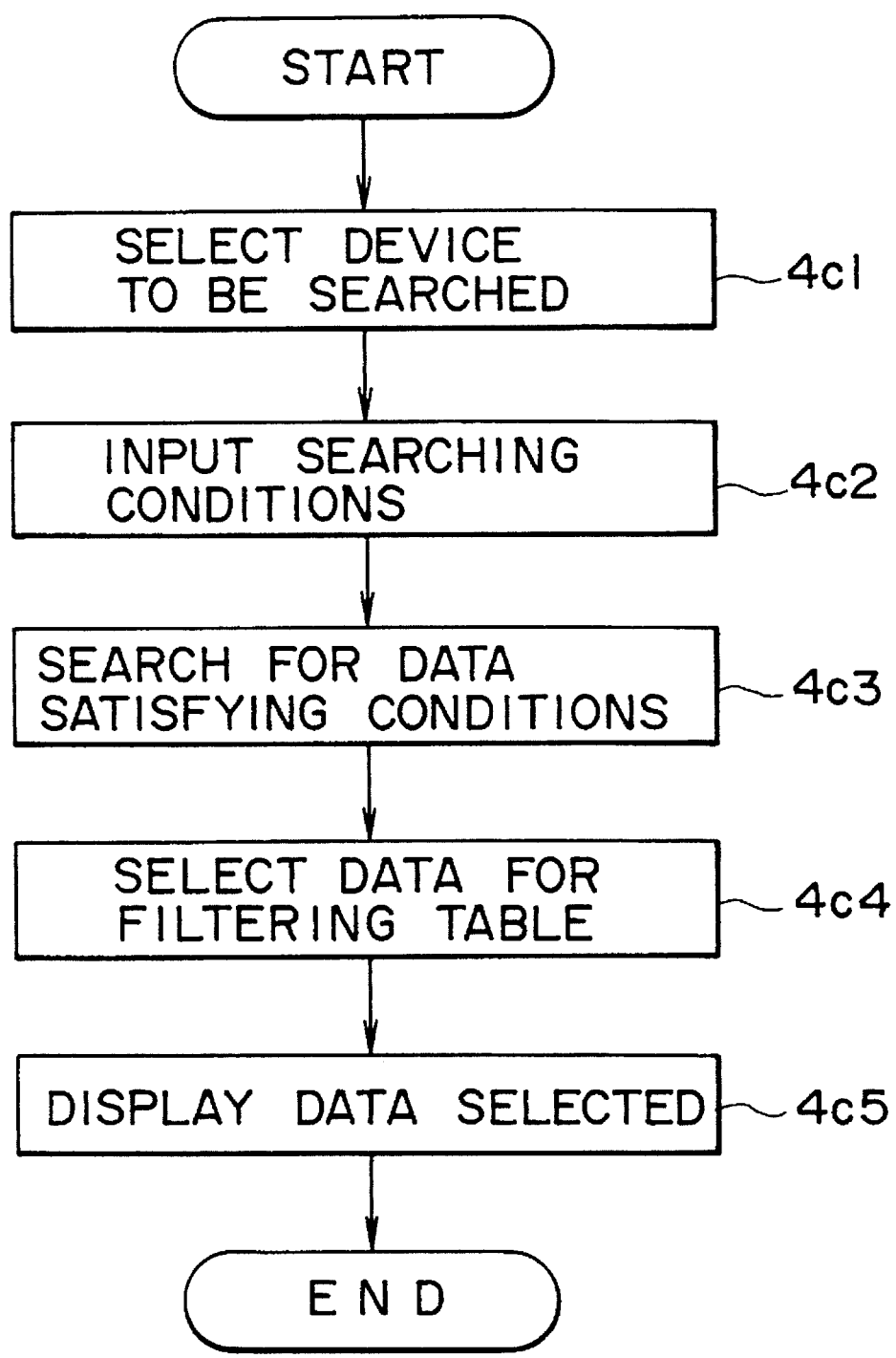
FIG. 4c is a flowchart showing processing procedures for searching for data from the database for operating and managing network equipment according to the embodiment of the present invention.

A description will now be made of the search processing for searching for the data of the computers, terminals, network devices, peripheral devices and cables stored in the database for operating and managing the equipment as shown in FIG. 4a with reference to the flowchart of FIG. 4c. First, at step 4c1, the user selects the computer, terminal, network device, peripheral device or cable, for which the user intends to make a search, from the corresponding computers, terminals, network devices, peripheral devices or cables in the drawing of the network configuration displayed on the display screen of the terminal the user is using, through indicating means, such as a keyboard, a mouse or a touch screen.

Then, at step 4c2, the searching conditions are entered for searching for the data sought by the user, relating to the computer, terminal, network device, peripheral device or cable selected at step 4c1. The attributes of each of the devices stored in the database for operating and managing the equipment as shown in FIG. 4a are specified as the searching conditions, and an instruction can be given to the system for operating and managing the network equipment so as to fetch the data of the attributes only. The searching conditions can be specified on the basis of a database query language of the database system including, for example, a query language of international standard, such as SQL. At step 4c3, the data of the attributes satisfying the searching conditions specified at step 4c2 is then fetched from the database for operating and managing the equipment as shown in FIG. 4a, followed by proceeding to step 4a4 at which only the data sought by the user is sorted out from the data of the attributes searched for at step 4c3 on the basis on the data filtering 4b1 to 4b5 of the data filtering table of FIG. 4b. At step 4c5, the data sorted out at step 4c4 is displayed in the position in the vicinity of the display of the corresponding computer, terminal, network device, peripheral device or cable of the drawing of the network configuration.

Next, a description will be made of the procedure for investigating what influence is exerted upon the user or the machine if a certain computer, terminal, network device, peripheral device or power is supposedly suspended within the scope of the object of management according to the embodiment of the present invention. In the description which follows, the computer, terminal, network device, peripheral device or power which may be supposed to be suspended, as stated immediately hereinabove, will sometimes be referred to merely as "the supposedly suspended device".

The system for operating and managing the network equipment is provided with the tables indicative of "static data" on the networks, as shown in FIG. 5a, 5b, 5c and 5d, on the auxiliary storage device.

FIG. 5a shows the table corresponding to the terminals and the computers on the network as the object of management as well as the managed devices that are necessary for operating the terminals and the computers. This table provides the data, for example, that a device A will not work if a power A or a host machine B or a transceiver C break down, or that the device A will not work unless the power A, the host machine B, and the transceiver C are being operated.

FIG. 5b shows the table corresponding to the network devices on the network as the object of management as well as the managed devices that are necessary for operating the network devices. This table provides the data, for example, that a router B will not work if the device A or the power B break down, or that the router B will not work unless the device A and the power B are being operated.

FIG. 5c shows the table corresponding to the user on the network as the object of management as well as the devices to be managed which the user is usually employing. This table provides the data, for example, that a user 1 will be affected if the device A or the terminal D or the power D break down, or that the user 1 cannot use the devices to be managed in a usual manner unless the device A, the terminal D and the power D are being operated.

FIG. 5d shows the table corresponding to the computers on the network as the object of management as well as the software inherent in the machine. This table provides the data, for example, that software 1 and software 2 will not work if the device A breaks down.

Figure 5E:
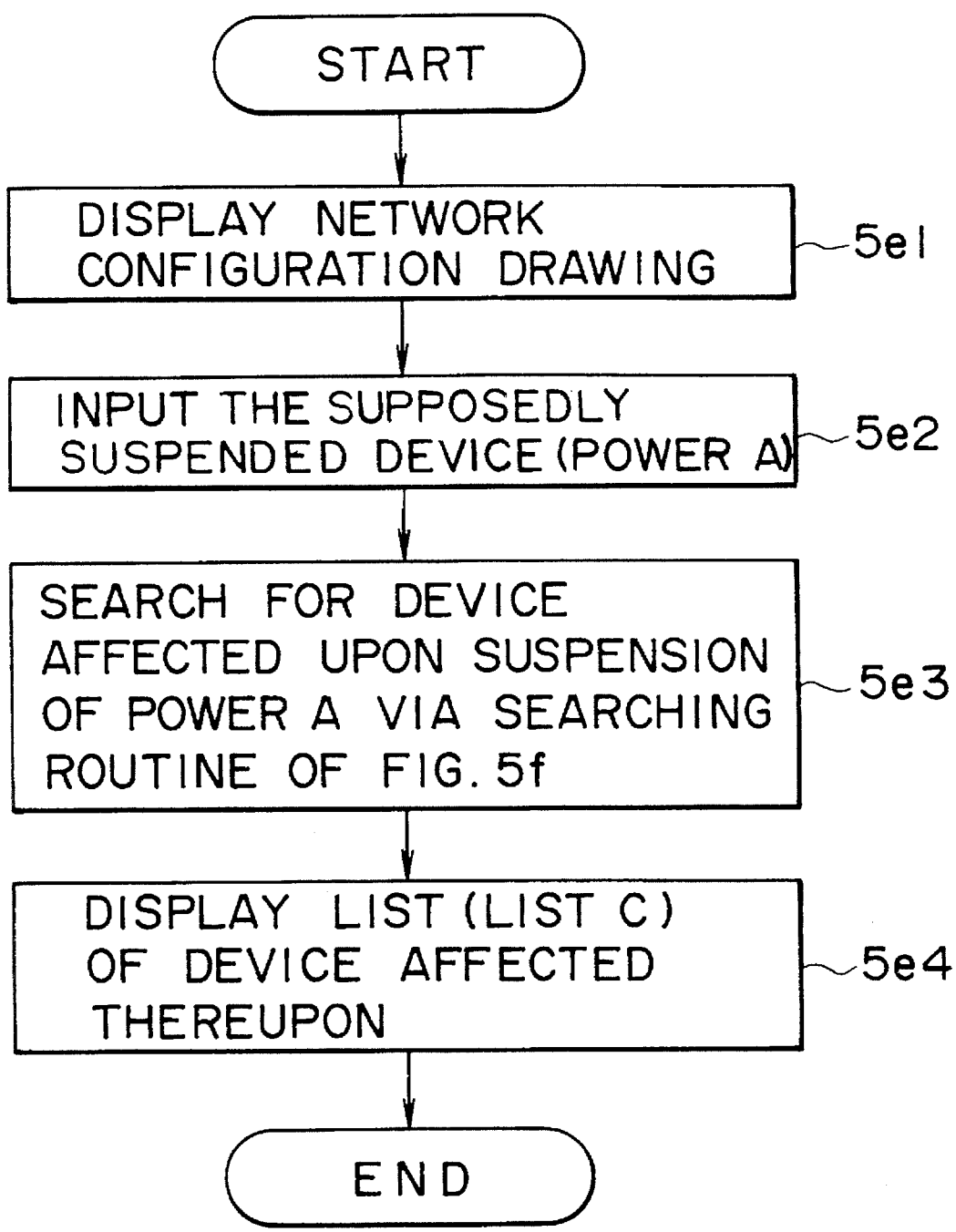
FIG. 5e is a flowchart showing processing procedures for displaying a scope of influence according to an embodiment of the present invention.

Now, a description will be made of the processing for specifying and displaying the device that may be affected in instances where any of the devices to be managed, such as the computer, terminal, network device, peripheral device or power, is suspended, with reference to the flowchart as shown in FIG. 5e.

Figure 5F:
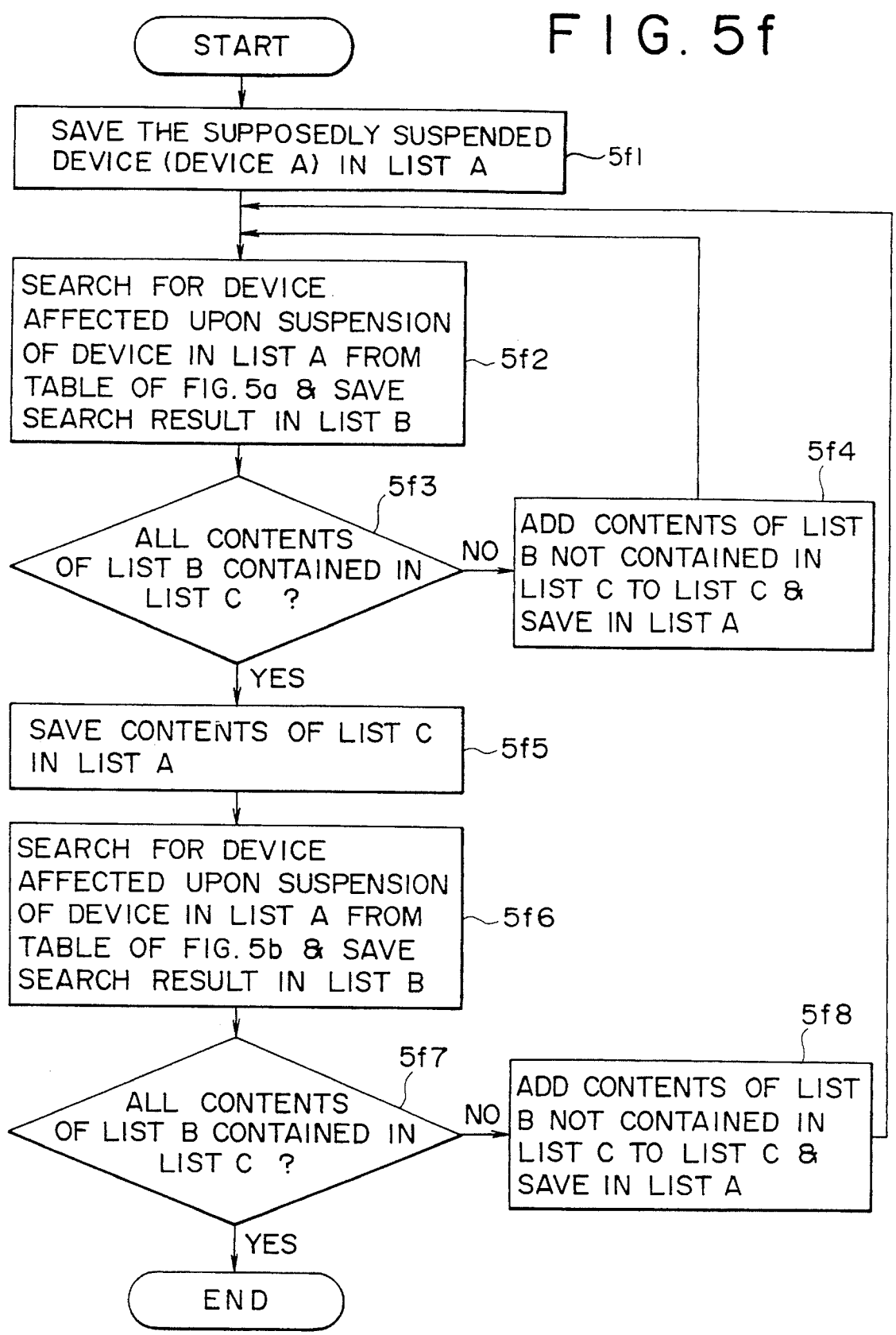
FIG. 5f is a flowchart showing processing for searching for the scope of influence according to an embodiment of the present invention.
Figure 5G:
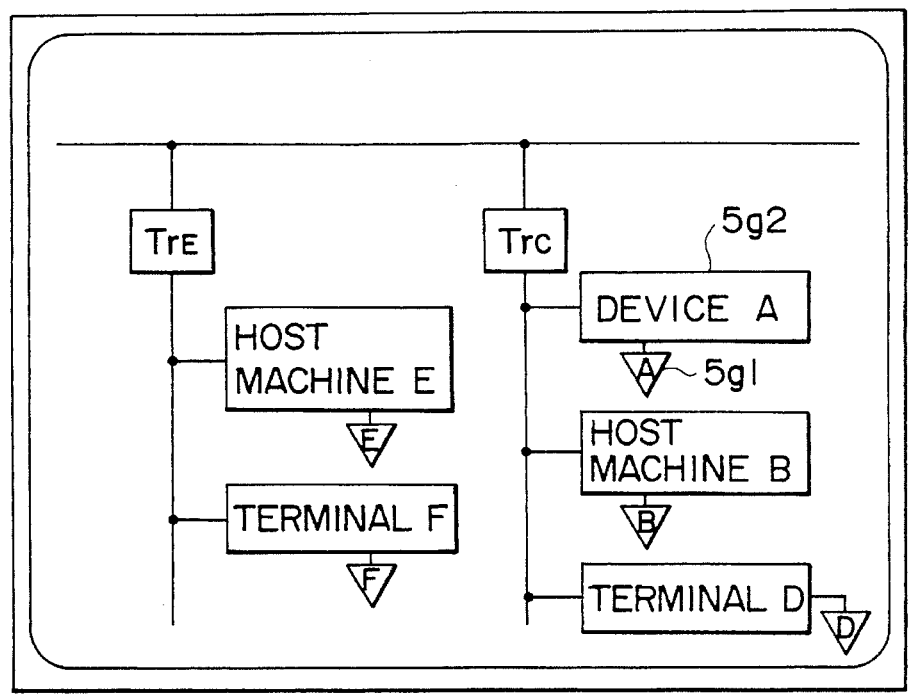
FIG. 5g is a block diagram showing the configuration of a database for operating and managing equipment in the drawing of the network configuration on a display screen according to an embodiment of the present invention.
Figure 5H:
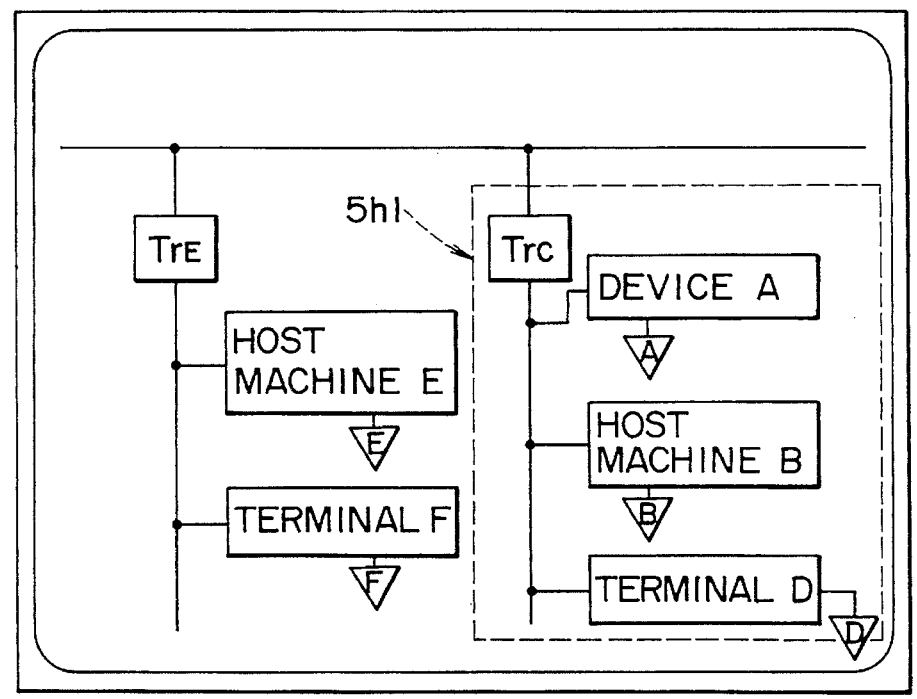
FIG. 5h is a block diagram showing the state of display of the scope of influence according to an embodiment of the present invention.

First, at step 5e1, the system for operating and managing the network equipment displays the drawing of the network configuration within the scope of management on the display unit. Then, at step 5e2, the supposedly suspended device on the drawing of the network configuration within the scope of management as shown in FIG. 5g is specified through an input device such as the mouse or key board. For instance, when a power source A 5g1 for a device A 592 as shown in FIG. 5g is specified, then a search is made at step 5e3 for a device, which may undergo influence when the power A 5g1 is suspended, from the tables, as shown in FIGS. 5a and 5b, in accordance with the search routine as shown in FIG. 5f. Then, at step 5e4, the system for operating and managing the network equipment displays the device to be managed which undergoes influence when the power A is suspended, by painting or enclosing the drawing of the network configuration as shown in FIG. 5h (as indicated, for example, by the region 5h1 enclosed by broken line).

Next, a description will be made of the search routine for searching for the device undergoing influence upon suspension of the power A with reference to the flowchart as shown in FIG. 5f.

The search routine is arranged to use a list A for storing an object of search, a list B for implementing a search operation, and a list C for storing a result of the search. In the search routine, the supposedly suspended device specified is stored at step 5f1 in the list A for storing the object of search, followed by proceeding to step 5f2 at which a search is made for the device undergoing influence upon suspension of the device indicated on the list A from the table, as shown in FIG. 5a. Then, the results of the search are stored in the list B for the search operation.

Then, it is decided at step 5f3 to determine if all the results of the search made at step 5f2, indicated on the list B, are contained in the list C for storing the results of search. If the decision at step 5f3 indicates that not all the results are contained in the list C, on the one hand, then the program flow goes to step 5f4 at which the device that undergoes influence yet that is not contained in the list C is then added to the list C and further stored in the list A for storing the objects of search. When it is decided at step 5f3 that all the results are contained in the list C, on the other hand, then the program flow goes to step 5f5 at which the contents of the list C are stored in the list A.

Then, at step 5f6, a search for the device undergoing influence upon suspension of the device indicated on the list A is made from the table, as shown in FIG. 5b, and the result of the search is stored in the list B. Further, at step 5f7, it is checked to determine if all the results of the search made at step 5f6 and stored in the list B are contained in the list C. When the result of decision at step 5f7 indicates that not all the results of the search are contained in the list C, on the one hand, then the program flow goes to step 5f8 at which the device, indicated on the list B, that undergoes influence yet that is not contained in the list C is added to the list C and further stored in the list A. When it is checked at step 5f7 that all the results of the search are contained in the list C, then the search routine is ended.

Figure 5I:
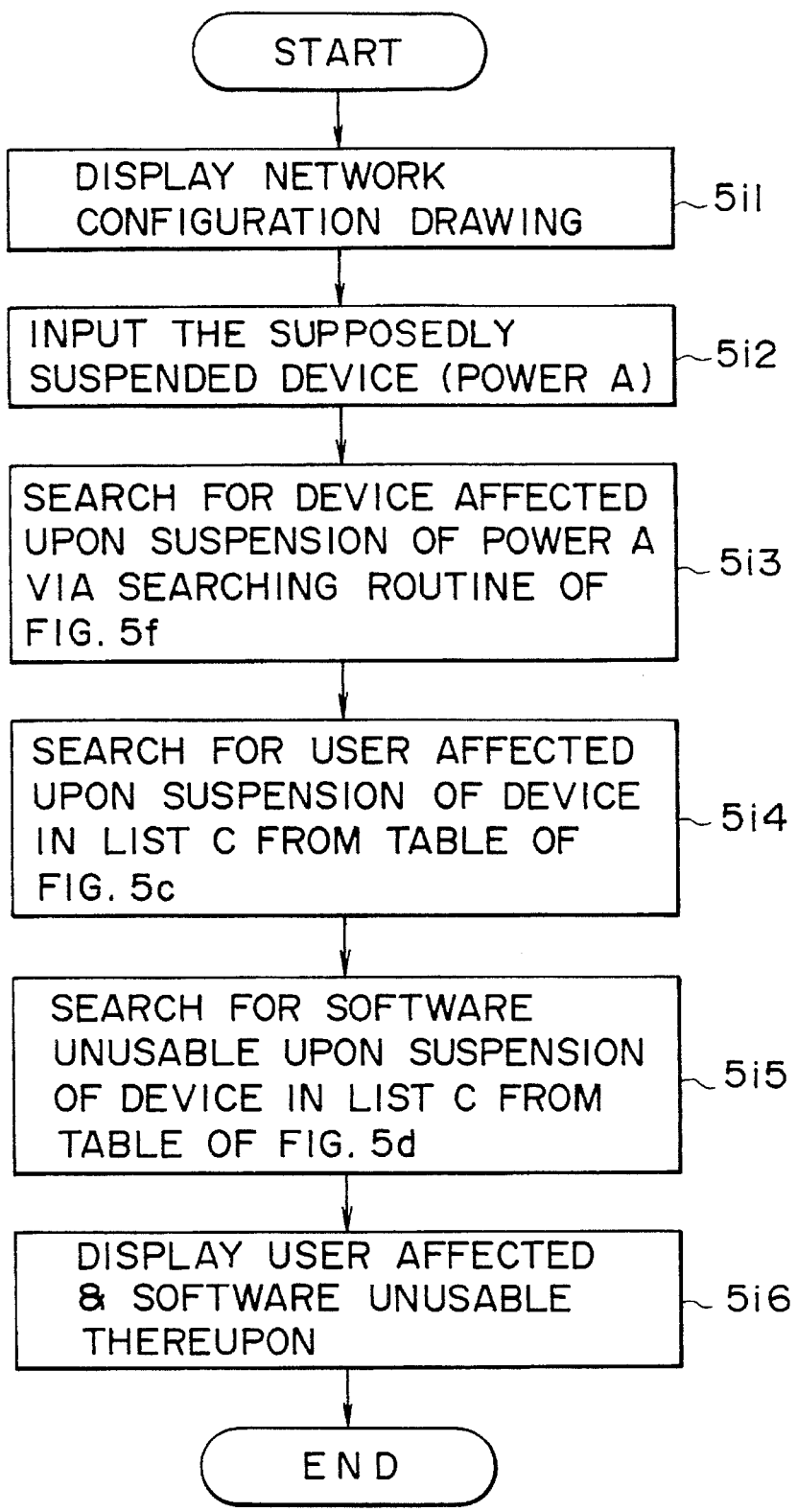
FIG. 5i is a flowchart showing the processing for displaying an affected user and unavailable software according to an embodiment of the present invention.

Furthermore, a description will be made of the processing for specifying and displaying the user, which undergoes influence, as well as the software, which becomes unavailable, upon suspension of either one of the devices to be managed, such as computers, terminals, network devices, peripheral devices or powers, with reference to the flowchart as shown in FIG. 5i.

First, at step 5i1, the system for operating and managing the network equipment displays the drawing of the network configuration within the scope of management on the display screen, followed by proceeding to step 5i2 at which the supposedly suspended device on the drawing of the network configuration within the scope of management as shown in FIG. 5g is specified through the input device such as the mouse or the key board. For instance, when the power A of a device A 5g2 as shown in FIG. 5g is specified, a device undergoing influence upon suspension of the power A is searched for at step 5i3 from the tables, as shown in FIGS. 5a and 5b, in accordance with the search routine as shown in FIG. 5f, and the result of the search is generated in the list C. Then, at step 5i4, a search is made from the table, as shown in FIG. 5c, for the user undergoing influence upon suspension of the device indicated on the list C, followed by proceeding to step 5i5 at which a search is then made from the table of FIG. 5d for the software that becomes unavailable upon the suspension of the software indicated on the list C. Then, at step 5i6, the system for operating and managing the network equipment displays each of the lists searched for at steps 5i4 and 5i5 on the display unit as shown in FIG. 5j.

Figure 5K:
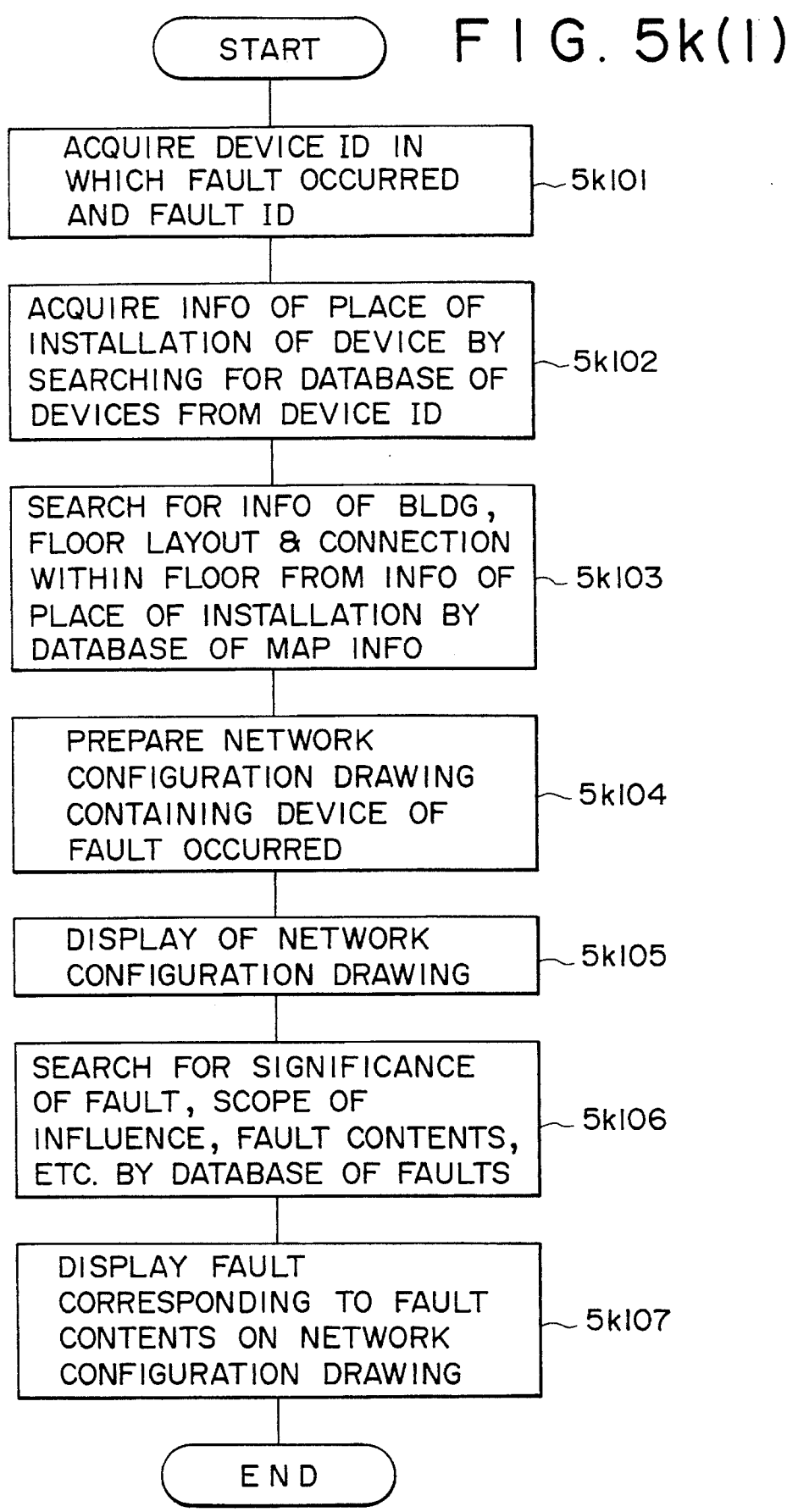
FIG. 5k(1) is a flowchart showing procedures for displaying the location of the occurrence of a fault at the time of the occurrence of the fault.

Next, a description will be made of the processing for diagrammatically representing the locations of the faults at the time of occurrence of the faults, in accordance with the number of occurrences of the faults and the scope of the influence of each of the faults, with reference to the flowchart as shown in FIG. 5k(1).

In this processing, when the fault is caused to occur, a search is made for information to be represented diagrammatically, containing the location of the fault, from the information stored in the database 300 in the auxiliary storage device 106, such as the physical network configuration, the logical network configuration, the network wiring, the drawing of the floors, the maps, and so on. The drawing of the network configuration to be displayed is prepared on the basis of the searched information and then displayed on the output device 105. Further, the location of the fault is displayed on the displayed drawing of the network configuration in so that the location can be distinguished from normal locations, for example, by changing the color of display, flashing on and off, displaying in an enlarged form, changing display symbols, or the like.

More specifically, if a fault occurs, the identification number of the device in which the fault occurred and the identification number of the fault are acquired at step 5k101, followed by proceeding to step 5k102 at which a search is made for the data 304 relating to the information on the locations of the installation of the devices within the database 300 on the basis of the identification number of the device, thereby acquiring information relating to the location of the installation of the device in which the fault occurred.

Then, at step 5k103, a search is made for the information of the building, the layout of the floor, and the connection of the network devices in the floor from the information of the locations of the installation of the devices on the basis of the database 300.

At step 5k104, the drawing of the network configuration containing the device which caused the fault is prepared on the basis of the information searched for at step 5k103, followed by proceeding to step 5k105 at which the resulting drawing of the network configuration is displayed on the output device 105.

Further, at step 5k106, a search is made for the fault database 900 on the basis of the identification number of the fault received at step 5k101, thereby acquiring information of the magnitude of significance of the fault, the scope of influence, the fault contents, and so on.

Then, at step 5k107, the location of the fault is displayed on the drawing of the network configuration displayed on the output device 105 on the basis of the searched data on the information on the faults so that the fault location can be distinguished from the locations where the devices are running in a normal way, for example, by changing the color of display, flashing on and off, displaying in an enlarged manner, changing display symbols, or the like. Further, the fault that occurred is registered in the faults database 900 on the fault log 903 indicative of the data of the history of the fault, as to the fault contents and the fault that was caused to occur as a result of extension of the previous fault, in order to be capable of redisplaying the course of the occurrence of the fault.

FIG. 5k(2) shows an example of the display of the location of the occurrence of the fault on the drawing of the network configuration as shown in FIG. 1f. In FIG. 5k(2), the case in which the fault occurred at a portion of a group consisting of the terminals 203a, 203b, and 203c and the computer 201a is indicated in the display type as described hereinabove.

FIG. 5k(3) shows an example of the display of the scope of influence of the occurrence of the fault on the drawing of the network configuration. FIG. 5*k*(3) indicates the case in which the devices contained in the scope as indicated by reference numeral 150 are to be affected, when a fault occurs at a portion of the group consisting of the terminals 203*a*, 203*b*, and 203*c*, and the computer 201*a*, as shown in FIG. 5*k*2.

In other words, FIG. 5*k*(3) indicates the case in which the terminals 203*d* to 203*j*, the computer 201*b*, and the network device 202*b* are caused to be affected.

FIG. 5*k*(4) shows an example of the display of the magnitude of significance of the occurred fault on the drawing of the network configuration. In FIG. 5*k*(4), the magnitude of significance of the fault is indicated by reference symbol "A", when the fault has occurred at a portion of the group consisting of the terminals 203*a*, 203*b*, and 203*c*, and the computer 201*a*, and at a portion of the communication network for connecting them to each other.

As has been described hereinabove, the information indicative of the locations of the installation and the relationship of the connection of the computers and the various network devices, connected to the network, is prepared as the database 300 of the maps. If the fault would occur, the physical drawing of the configuration of the network containing the device that caused the fault is displayed with reference to information stored in the database 300 of the map to thereby display the device where the fault occurred, the location of the installation of the device concerned, and the scope of influence of the fault, whereby the management of the fault can be made so as to cover all the devices connected to the network.

In particular, as the physical installation of the devices is displayed, the device causing the fault can be identified with ease and measures can be taken to recover the fault and to prevent the fault from expanding, thereby making a full support for the recovery of the fault.

Now, a description will be made of the procedures for redisplaying the course of the occurrence of the fault on the drawing of the network configuration as shown in FIG. 1*f*, with reference to FIG. 51(1).

First, at step 51101, the fault for which the course of the occurrence is to be redisplayed is specified by the identification number of the fault. Then, at step 51102, a search is made for the database 900 on the faults on the basis of the specified identification number of the fault, thereby providing the information of the fault log indicative of the fault contents, the magnitude of significance of the fault, the date and the time of the occurrence of the fault, the device having caused the fault, the scope of the influence of the fault, and the absence or presence of the fault that occurred as a result of the expansion of the previous fault, from the data 901 on the information of the fault contents, the data 902 on the information of the history of the faults, and the fault logs 903, stored in the database 900 on the faults.

Then, at step 51103, a search is made for the data 304 indicative of the information on the locations of the installation of the devices within the database 300 on the maps in order to display the location of the occurrence of the fault on the basis of the information obtained by the search result and the identification number of the device, thereby providing information relating to the location of the installation of the device having caused the fault.

Further, at step 51104, a search is made for the database 300 on the maps from the information of the location of the installation of the device having caused the fault to thereby provide the information on the building, the layout of the floor, the connection of the devices within the floor, and so on, followed by proceeding to step 51105 at which the drawing of the network configuration is prepared and then proceeding to step 51106 at which the resulting drawing of the network configuration is displayed on the output device 105.

Thereafter, at step 51107, the location of the occurrence of the fault is displayed on the drawing of the network configuration on the basis of the information of the fault obtained at step 51102.

The display of the location of the fault may be made by changing the color of display, flashing on and off, displaying in an enlarged manner, changing the display symbols, or the like.

Then, at step 51108, the fault that occurred as a result of extension of the previous fault is displayed immediately after the occurrence of the previous fault in accordance with the course of occurrence of the fault on the drawing of the network configuration in such a style as conducted at step 51107, on the basis of the fault log 903 stored in the data 902 relating to the information of the history of the fault searched for at step 51102, in order to redisplay the course of the occurrence of the fault.

By redisplaying the course of the occurrence of the fault, it is possible to take measures against the fault that may be caused to occur after the previous fault by analyzing the previous fault, so that this action is extremely useful for the management of the network.

FIG. 51(2) shows an example of the drawing of the network configuration to be managed by the system according to the present invention. In FIG. 51(2), reference numerals 180, 181, and 182 denote each a local area network (LAN) within the building, and reference numeral 183 denotes a network circuit. In this example, the network environment is configured so as to extend to the buildings a, b, and c, which are remote from each other.

In accordance with the present invention, the system of this embodiment is supposed to be installed in the building a and the person managing the network is located in the building If a fault would occur in the building in which the network configuration is installed among the buildings, the person managing the network is required to go immediately to the location of the occurrence of the fault and to have the fault corrected and the location of the fault recovered.

As has been described hereinabove, the maps of the areas in the vicinity of each of the buildings are registered in the data 302 relating to the information of the buildings within the database 300 relating to the information of the maps, as shown in FIG. 1*c*, and the traffic means and the traffic expenses needed to go to the predetermined buildings are registered in the data 306 relating to the information on the traffic means.

On the other hand, for example, when a fault would occur in the building h in which no person managing the network is located, a description will be made of the processing for displaying the path to the building h with reference to the flowchart as shown in FIG. 5*m*(1).

First, at step **5*m*101, the person managing the network inputs the building h to which to learn of the path, followed by proceeding to step 5*m*102 at which the map of the area in the vicinity of the building b is searched for from the data 302 relating to the information of the buildings. Then, at step 5*m*103**, the traffic means to go to the building b from the building a and the traffic expenses required to go to the building b from the building a are searched for from the data 306 relating to the information on the traffic means. Finally, at step 5m104, the search contents derived at step 5m104 are displayed in the style as indicated in FIG. 5m(2).

By displaying the traffic path to the building where the fault occurred in the manner as described hereinabove, the person managing the network can go to the location of the occurrence of the fault without delay, even if the fault would occur in a remote location, and the fault can be corrected and the location of the occurrence of the fault can be recovered as soon as possible.

Next, a description will be made of the procedures for displaying the network zone in accordance with the logical relationship of the connection of the network.

FIG. 5m(3) shows an example of dividing the logical connection of the network into segments as shown in FIG. 1b. For example, as shown in FIG. 5m(3), the network is divided into segments SG1 to SG5, inclusive. Generally, data can be set so as not to flow from one segment to another segment in accordance with the function of the network device.

Each of the individual networks which are physically connected to one network yet which can logically be divided can be referred to as a network zone in this specification.

The network zone can serve as improvements in security by dividing the organizational offices and sections for each network zone or by logically dividing the network so as to install the computers having different business contents in the different segments.

The network zone is to be represented logically as shown in FIG. 5m(3) and it is shown that it is simply divided; however, there are many occasions where the logical disposition of the devices should actually be represented in an intertwined manner if the physical disposition of the devices is intended to be represented, too.

FIG. 5m(4) shows an example in which the segments in the physical connection of the network, containing the physical disposition of the network, are represented. In FIG. 5m(4), the segments SG2 to SG5, inclusive, as shown in FIG. 5m(3), are represented in such an intertwined manner. For example, when a new network device is to be connected, it could not physically be determined what cable is to be connected to the new network device without reference to both of the wiring drawing and the logical drawing, even if it should logically be determined what network zone is to be connected to the new network device.

Hence, a support can be made for connecting a new network device to the network by making a display on the physical drawing of the network configuration in such a manner as capable of determining the logical network zone.

Now, a description will be made of the processing for displaying the network zone on the drawing of the physical network configuration in accordance with the relationship of the logical connection of the network devices, with reference to the flowchart as shown in FIG. 5n(1).

First, at step 5n101, the drawing of the logical network configuration and the segments are displayed in the manner as shown in FIG. 5m(3).

Then, at step 5n102, the user gives an instruction of the physical location of the network zone which the user intends to look at from the network zones in the displayed drawing of the network configuration.

For example, the segment SG5 is specified as shown in FIG. 5n(2).

Then, at step 5n103, the system displays the drawing 250 of the physical network configuration as shown in FIG. 5n(3), followed by proceeding to step 5n104 at which a search is made for the network zone specified by the user from the database 300 relating to the information of the maps, and the searched network zone is displayed on the drawing 250 of the network configuration displayed at step 5n103.

FIG. 5n(4) shows an example of the display of the network zone on the drawing of the network configuration. In FIG. 5n(4), the portion enclosed by broken line 260 represents the network zone searched for at step 5n104.

By displaying the logical network zone on the drawing of the physical network configuration so as for the logical network zone to be distinguishable from the other network zones, it can readily be determined to what cable the new network device should be connected when the new network device is to be connected. This is extremely useful for connecting the new network device or removing the network device.

Next, a description will be made of the procedures for managing the environment by managing the illumination of a floor or the intensity of radio waves by the network management system according to the present invention.

A database 272 relating to information of management consisting of data 270 on the information of the maps and data 271 on equipment is configured in such a manner as shown in FIG. 5o(1), within the auxiliary storage device 106 as shown in FIG. 1a.

In the database 272 relating to the management information as shown in FIG. 5o(1), the shape of the floors, the positions of illumination and wireless, and so on, are registered in the data 270 relating to the information of the maps, and the magnitude of illumination (the brightness of a light source), the output of the wireless (the intensity of the radio wave), the amount of the head generated therefrom, and so on, are registered in the data 271 of the equipment. A program for computing the magnitude of illumination (the magnitude of brightness at the illuminated location) and the intensity of the radio waves is incorporated in the central processing unit 103 as shown in FIG. 1a.

Now, the processing for investigating the maximal length of the range of the illumination to the floor will be described with reference to the flowchart as shown in FIG. 5o(2).

First, at step 5o201, the minimal limit of the magnitude of illumination is entered.

Then, at step 5o202, data on the magnitude of brightness of the illumination and information of the floor map are fetched from the database 272 as shown in FIG. 5o(1), the magnitude of illumination on the floor is computed on the basis of a program for computing the magnitude of illumination, and the location having the magnitude of illumination not satisfied to the minimal limit within the floor is computed. Thereafter, at step 5o203, there is displayed the scope of the magnitude of illumination below the minimal limit of illumination within the floor.

FIG. 5o(3) shows an example of the display of the scope of illumination, in which reference numeral 290 denotes a light source, reference numeral 291 denotes a column, and reference numeral 292 denotes a portion where the magnitude of illumination is below the minimal limit.

Next, a description will be made of the processing for investigating the scope of the reach of the radio waves within the floor, with reference to the flow chart as shown in FIG. 5p(1).

First, at step 5p101, the minimal limit of the radio waves to be received is entered.

Then, at step 5p102, data of the output of the radio waves and information of the floor map, including information on the electric sources, are fetched from the database 272 as shown in FIG. 5o(1), the intensity of the radio waves to be received is computed on the basis of a program for computing the intensity of the radio waves, and the position in which the radio waves are to be received only at the intensity less then the minimal limit within the floor is computed. Thereafter, at step 5p103, the area within the floor, where the radio waves can be received at the intensity only less than the minimal limit, is displayed.

FIG. 5p(2) shows an example of display of the area where the radio waves do not reach at the intensity above the minimal limit. In FIG. 5p(2), reference numeral 310 denotes a cable for the electric source, reference numeral 311 denotes a source of transmitting the radio waves, and reference numeral 312 denotes the area where only the radio waves having the intensity of less than the minimal limit can reach.

By implementing the management of the environment in which the network devices are to be installed in the manner as described hereinabove, a support can be made for the disposition of the optimal position of a new network device when it is to be connected.

In particular, the wireless LAN is recently increasing, so that the situation where the network device is to be installed in the position in which the intensity of the radio waves do not satisfy the minimal limit can be prevented in advance, thereby reducing the causes of the faults.

Next, a description will be made of the displaying procedures in accordance with the management level of the drawing of the network configuration indicative of the logical connection of the devices to be managed and the network.

FIG. 5q(1) shows an example of the display in accordance with the management level of the drawing of the logical network configuration. In FIG. 5q(1), reference numeral 320 denotes a computer, reference numeral 321 denotes a terminal, reference numeral 322 denotes a peripheral device, reference numerals 323, 324, and 326 denote network devices, and reference numeral 325 denotes a cable network.

The network may be configured in a hierarchical structure, that is, in such a drawing of the hierarchical structure of the network as shown in FIG. 5q(2).

In FIG. 5q(2), reference numeral 330 denotes an entire image of the network to be managed, and four subnetworks are in such a structure as being connected with the network device 331.

The term "subnetwork" referred to herein is meant to classify the network, in which some computers, terminals, network devices, and peripheral devices are connected to each other through the cable network 332, in a logical sense, that is, by sections or area.

Reference numeral 333 denotes one of subnetworks constituting the network 330, and reference numeral 334 represents the configuration of the subnetwork 333.

The subnetwork 334 is configured in such a way that three subnetworks are connected to each other through a network device 336, and a cable network 335 is the same as the cable network 332 constituting the network 330.

Likewise, reference numeral 339 represents the configuration of a subnetwork 338, and a cable network 340 is the same as the cable network 335 for the network 334. Reference numeral 339 denotes the configuration of only the devices to be managed.

FIG. 5q(2) shows an example of the configuration of a network in a three-hierarchical structure. The network may be referred to as a first hierarchical stage, a second hierarchical stage, and a third hierarchical stage in the consecutive order from the network representing the entire configuration. The hierarchical stage having a smaller number is referred to as an upper hierarchical stage and the hierarchical stage having a larger number is referred to as a lower hierarchical stage. In FIG. 5q(2), reference numerals 330, 334, and 339 denotes the first, second, and third hierarchical stages, respectively.

In each of the hierarchical stages, the subnetworks and the devices to be managed are provided with reference numerals that can identify them in a uniform manner. Each of the numbers which are arranged in a serial order from the uppermost hierarchical stage to the lowest hierarchical stage for each hierarchy and network number 342 is referred to as a network number. For example, network number 342 for the network having the three hierarchical stages as shown in FIG. 5q(2) may have a configuration as shown in FIG. 5q(3).

The use of the network numbers, for example, the network number 342, can uniformly identify the subnetworks and the devices to be managed from the entire network. When the subnetworks and the devices to be managed of each hierarchical stage, as shown in FIG. 5q(2), is provided with the 2-digit number as shown in FIG. 5q(4), the network number for each of the subnetworks and the devices to be managed can be represented in such a manner as is shown in FIG. 5q(5). The subnetwork can be represented by indicating the number portion of the lower hierarchical stage by the number of zeros (0s) corresponding to the number of the digits of the subnetwork; hence, the network 330 containing all the objects of management as shown in FIG. 5q(5) can be represented by the network number "000000".

Now, a description will be made of a variety of databases needed for displaying the drawing of the network configuration indicative of the logical connection of the networks, in accordance with the management level.

As one of the various databases, there may be mentioned, for example, a database 370 in which are stored the relationships of correspondence of the devices to be managed and the subnetworks with the network numbers, as shown in FIG. 5q(6). In addition, there may be mentioned, for example, a database 380 relating to information of the connection of the devices to be managed and the subnetworks indicated by the corresponding network numbers as shown in FIG. 5q(7), a database 390 relating to information of the display as shown in FIG. 5q(8), a database 400 relating to the trunk topologies as shown in FIG. 5q(9), and so on.

The information on the connection as referred to hereinabove is meant to indicate the relationship of the connection between the devices to be managed and the subnetworks. This connection information is adapted to store the corresponding network numbers on the basis of information as to what subnetworks and computers are connected to what cable networks, or to what cable of a lower hierarchical stage the cable network connected to the network of an upper hierarchical stage is connected.

The information on the display as referred to hereinabove is meant to indicate a state to be displayed on the display device. The shape of the display, characters thereof, colors thereof, and patterns thereof can be specified for each of the devices to be managed and the subnetworks.

For example, when the computer 320 as shown in FIG. 5q(1) is provided with the network number "010101", it is shown by the database 390 relating to the information of the display, as shown in FIG. 5q(8), in such a manner that the computer 320 is indicated by a square box-like shape, by the characters "WS" indicated within the box-like shape, by white color, by an actual size, and so on.

The trunk topology as referred to hereinabove is meant to indicate a state of the network. The trunk topology in which a cable network is connected as a trunk with the devices to be managed and the networks as shown in FIG. 5r(1a) is referred to as a bus type; the trunk topology in which a cable network is connected as a trunk with the devices to be managed and the networks in a ring shape as shown in FIG. 5r(1b) is referred to as a ring type; a trunk topology in which a central computer (WS) is connected as a trunk with the devices to be managed and the networks in a star shape as shown in FIG. 5r(1c) is referred to as a star type; and trunk topology in which the devices to be managed and the networks are connected with each other in a random manner as shown in FIG. 5r(1d) is referred to as a free type.

The network may be represented by any one type of the trunk topologies as referred to hereinabove.

Next, a description will be made of the processing for displaying the drawing of the network configuration for the object of management in accordance with the management level by the network management system with reference to the flowchart as shown in FIG. 5r(2), the drawing of the network configuration being indicative of the logical connection between the devices to be managed and the networks.

First, at step 5r201, a search is made for the management level from the management level database 430, as shown in FIG. 5r(3), on the basis of the log-in name of the user using the network management system. The management level can be specified by one network number or plural network numbers.

Then, at step 5r202, the network or the subnetwork, sought to be display by the drawing of the network configuration, is specified by a network number, followed by proceeding to step 5r203 at which a search is further made for the network number of the device to be managed or the subnetwork, constituting the lower hierarchical stage of the network number specified at step 5r202 from the database 370 of the relationship of the networks as shown in FIG. 5q(6).

Further, at step 5r204, there is determined the device to be managed or the subnetwork existing in the hierarchical stage lower than the management level searched for at step 5r201 from the devices to be managed or the subnetworks searched for at step 5r203. Then, at step 5r205, information of the connection and the display of the device to be managed or the subnetwork determined at step 5r204 is searched for from the network number corresponding to the device to be managed or the subnetwork on the basis of the database 380 relating to the information of the connection of the network, as shown in FIG. 5q(7), and the database 390 relating to the information of the display of the network, as shown in FIG. 5q(8), respectively. The program flow further goes to step 5r206 at which the trunk topology of the network or the subnetwork, determined at step 5r205, is searched for from the database 400 relating to the trunk topology as shown in FIG. 5q(9).

Furthermore, at step 5r207, the trunk topology searched for at step 5r206 is displayed on the display screen in such a display type as shown in FIGS. 5r(4a)–5r(4d). In other words, the display types as shown in the figures may comprise the bus type (FIG. 5r(4a)), the ring type (FIG. 5r(4b)), and the star type or the free type (FIG. 5r(4c)), as described hereinabove.

Then, at step 5r208, the device to be managed or the subnetwork determined at step 5r204 is displayed by adding it on the screen on which the trunk topology has been displayed at step 5r207, on the basis of the information of the connection of the network and the information of the display thereof, searched for at step 5r205.

Further, at step 5r209, a search is made for the cable network connecting the network to be displayed with the network of the hierarchical stage lower than the network to be displayed or the cable network connecting the network of the management level with the network other than the network of the management level, on the basis of the connection information searched for at step 5r205. Then, the searched cable network is displayed by dot line on the display screen displayed at step 5r208.

FIG. 5r(5) shows a tree of the management levels. As shown in FIG. 5r(5), the portions enclosed by lines as indicated by reference numerals 451, 452, 453, and 454 are regions of the management levels. In this case, any devices to be managed, which do not exist in the specified management level, are not displayed on the display screen.

Now, a description will be made of the processing procedures for displaying the two-dimensional configuration drawing for the object of management by the network management system in accordance with the management level, with reference to the flowchart as shown in FIG. 5s(1). The term "two-dimensional configuration drawing" is meant to indicate a physical plane drawing illustrating the devices to be managed and the subnetwork thereof. FIG. 5s(2) shows an example of the two-dimensional configuration drawing displayed in accordance with the management level. In FIG. 5s(2), reference numeral 471 denotes a computer; reference numeral 472 denotes a terminal; reference numeral 473 denotes a peripheral device; reference numerals 474, 475, and 476 denote network devices; reference numeral 477 denotes a cable network; reference numeral 478 denotes a table; and reference numeral 479 denotes a column.

In order to allow the two-dimensional configuration drawing 470 to be displayed, the network management system according to the present invention is provided with a database 480 relating to correspondence of the network numbers to the plane map, as shown in FIG. 5s(3); a database 490 relating to the display positions indicated by the coordinates of the devices to be managed and the subnetwork thereof on the plane map, as shown in FIG. 5s(4); and the database 390 relating to the information on the display of the devices to be managed and the subnetworks thereof, as shown in FIG. 5q(8). It should be noted herein that the term "plane map" is meant to refer to a general term for a layout and a map on which elements, such as the tables and the columns, are indicated as shown in FIG. 5s(2).

Turning now to FIG. 5s(1), a search is made for the management level from the log-in name of the user utilizing the network management system on the basis of the management level database 430 as shown in FIG. 5r(3) at step 5s101. The management level may be specified by one or plural network numbers.

Then, at step 5s102, the network or the subnetwork, sought to be displayed by the two-dimensional configuration drawing 470, is specified by the network number through the input device 104, such as a keyboard or a mouse, as shown in FIG. 1a.

Next, at step 5s103, a search is further made for the plane map corresponding to the network number specified at step 5s102 from the database 480 as shown in FIG. 5s(3), followed by proceeding to step 5s104 at which the plane map searched for at step 5s103 is displayed on the display device.

Then, at step 5s105, a search is made for the network number of the devices to be managed and the subnetworks, constituting the lower hierarchical stage of the network number specified at step 5s102, from the database 370, as shown in FIG. 5q(6).

Further, at step 5s106, there is determined the devices to be managed and the subnetworks located on the hierarchical stage lower than the management level searched for at step 5s101, out of the devices to be managed and the subnetworks searched for at step 5s105. The program flow then goes to step 5s107 at which a search is made for the positions of displaying the devices to be managed and the subnetworks, determined at step 5s106, and the information on the display thereof from the database 490 as shown in FIG. 5s(4) and the database 390 as shown in FIG. 5q(8), respectively.

Then, at step 5s108, the devices to be managed and the subnetworks determined at step 5s106 are displayed as a two-dimensional configuration drawing on the plane map displayed at step 5s104 on the basis of the display information and the display positions searched for at step 5s107.

The program flow then goes to step 5s109 at which a search is made for the cable networks connecting the hierarchical stage of the network to be displayed to the upper hierarchical stage thereof or the cable networks connecting the network of the management level to the network outside the management level on the basis of the connection information searched for at step 5s107, and the cable networks searched for at step 5s109 are displayed on the display screen displayed at step 5s108.

Next, a description will be made of the processing procedures for displaying the devices to be managed, which are located at a point of connection of the network management system to the outside networks, with reference to the flowchart as shown in FIG. 5t(1).

First, at step 5t101, an instruction is given by the user to display the point of connection of the device to be managed to the outside network, then followed by proceeding to step 5t102 at which a search is made for the network number of the device to be managed, connected to the outside network, out of the devices to be managed which are currently displayed on the display screen, and for information of a type of connection from the database 510 relating to the types of connection, as shown in FIG. 5t(2).

Then, at step 5t103, the procedure for the display is searched for from the searched connection information and the database 520 as shown in FIG. 5t(3).

Further, at step 5t104, the managed device identified by the network number searched for at step 5t102 is displayed by means of the displaying procedure searched for at step 5t103.

FIG. 5t(4) shows an example of the display of the displaying procedure displayed at step 5t104. In FIG. 5t(4), reference numeral 531 indicates a router as the device to be managed, which is connected to an external circuit; and reference numeral 532 indicates a workstation as the device to be managed, which is connected through the network and Ethernet.

Now, a description will be made of the processing procedures for displaying an entrance, through which an intruder can break into an office or the like or a careless person enters, on the two-dimensional configuration drawing, with reference to the flowchart as shown in FIG. 5u(1).

First, at step 5u101, an instruction is given by the user to display the entrance, then followed by proceeding to step 5u102 at which a search is made for the number of the plane map currently on display.

Then, at step 5u103, a search is made for the position of the coordinates of the entrance on the plane map and for the level of intrusion on the basis of the number of the plane map searched for at step 5u102 and the database 550 as shown in FIG. 5u(2).

The term "level of intrusion" and the related terms are intended to mean the degree of difficulty in intrusion or entry and a larger value indicates the higher degree of difficulty in intrusion or entry.

Further, at step 5u104, a search is made for the procedure for displaying the entrance from the level of intrusion or entry and the database 560 as shown in FIG. 5u(3). Then, at step 5u105, the entrance is displayed in the display position on the plane map searched for at 5u103 by means of the displaying procedure searched for at step 5u104. FIG. 5u(4) shows an example of the display of the entrance, and reference numeral 571 indicates an entrance of intrusion level 3.

By displaying the entrance from the outside in the manner as described hereinabove, a support can be given for a design for security measures against the breakage of an intruder or the careless entry of a person, thereby contributing to improvements in security.

Now, a description will be made of the processing procedures for changing the screen display by the network management system in accordance with the traffic amount with reference to the flow chart as shown in FIG. 5v(1) and the drawing of the network configuration as shown in FIG. 5v(2).

In FIG. 5v(2), reference numeral 596 denotes a device A to be managed, reference numeral 597 denotes a device B to be managed, reference numeral 598 denotes a device C to be managed, reference numeral 599 denotes a device D to be managed, and reference numeral 600 denotes a device E to be managed, each of which is provided with the network number within the network. Further, reference numeral 59 denotes a cable network.

Next, a description will be made of the processing procedure for displaying the traffic amount on the display screen in the instance wherein the communication between the device A to be managed, as indicated by reference numeral 596, and the device E to be managed, as indicated by reference numeral 600, is made through the device B to be managed, as indicated by reference numeral 597, and the device C to be managed, as indicated by reference numeral 598. In this case, it is supposed that the network management is displayed on the device A to be managed, as indicated by reference numeral 596.

First, at step 5v101, there is specified one of the devices to be managed, having an address within the network displayed on the drawing of the network configuration. For example, there is specified the device A to be managed, as indicated by reference numeral 596. Then, at step 5v102, the device E to be managed, as indicated by reference numeral 600, is specified.

Next, at step 5v103, the device E to be managed 596 specified at step 5v101 forms a packet 604 for selecting a path, which stores information consisting of a transmitter address 601, a receiver address 602, and a hop number 603, as shown in FIG. 5v(3).

It can be noted herein that the addresses 601 and 602 are determined from the database 610 as shown in FIG. 5v(4)

and that the hop number 603 is set as a numeral value which is decremented by one whenever the packet passes through the device to be managed having the address within the network. The packet for selecting the path can pass through the devices to be managed until the hop number becomes zero. When the path selecting packet having the hop number "1" is received, the device to be managed, which has received the packet, throws away the received packet in order to make the hop number "0", while it transmits to the device to be managed as a transmitter a packet for returning path information which stores the address within the network for the device to be managed which has thrown away the received packet. The packet for returning the path information is set as a hop number "1".

Then, at step 5v104, the device A to be managed 596 transmits a packet 604 for searching for the path, formed at step 5v103, to the device E to be managed 600.

Further, at step 5v105, the device A to be managed 596 receives the packet for returning the path information transmitted by the device B to be managed 597, then followed by proceeding to step 5v106 at which a search is made for the address within the network for the packet for returning the path information, received at step 5v105, and for the network number of the device B to be managed 597 from the database 610 as shown in FIG. 5v(4).

Then, at step 5v107, a search is further made from the database 610 as shown in FIG. 5v(4) for the network number of the cable network 59, connecting the device A to be managed 596 with the device B to be managed 597 searched for at step 5v106.

Next, at step 5v108, the type of displaying is changed in such a manner as, for example, changing from blue to red the color of displaying the device to be managed having the network number searched for at step 5v107.

Further, at step 5v109, the network number searched for at step 5v106 is saved.

Then, at step 5v110, the network number of the device B to be managed 597 searched for at step 5v107 is compared with the network number of the device E to be managed 600 specified at step 5v102. When both network numbers are the same, it can be determined that the packet for searching for the path has reached the receiver. In this example, the network numbers are different from each other, so the program flow goes to step 5v111.

At step 5v111, the packet for searching for the path is formed by increasing the hop number by one from the packet previously transmitted, followed by proceeding to step 5v104 and reiterating the processing from step 5v104 to step 5v111 until the packet for searching for the path is to be received by or to reach the device E to be managed 600.

When the packet for returning the path information transmitted by the device E to be managed 600 is received by the device A to be managed 596, the decision at step 5v110 gives the affirmative result, thereby proceeding to step 5v112.

At step 5v112, the device A to be managed 596 gives to the devices to be managed, A, B, C, and E, having the network numbers saved at step 5v106, an instruction to measure the number of bytes of information being communicated through the cable network in such a flow as shown in FIG. 5v(7).

Then, at step 5v113, the devices to be managed, A, B, C, and E, which have received the instruction at step 5v112, transmit the number of the communication bytes in every predetermined period of time to the device A to be managed 596 in such a flow as shown in FIG. 5v(8).

Next, at step 5v114, the device A to be managed 596 is adapted to compute a rate of the number of the communication bytes with respect to a communication velocity from the number of communication bytes of each cable network collected at step 5vb113 and the database 620 storing the communication velocity of each of the cable networks as shown in FIG. 5v(5), respectively.

Further, at step 5v115, a line width for displaying the cable network is determined in accordance with the rate of the number of the communication bytes computed at step 5v114 on the basis of the database 630 as shown in FIG. 5v(6), thereby enabling the line width to be changed for displaying the cable network.

As a result of changing the displaying line width of the cable network, the line width may be displayed in such a style as shown in FIG. 5v(9) in accordance with the number of the communication bytes.

The display of the line widths of the cable networks allows an apparent visual determination of the larger and smaller network traffic through each of the paths to thereby determine what path has the larger network traffic.

The following is a description of the method in which the system for operating and managing the network equipment displays the drawing of the network configuration indicating the devices to be managed and the logical connection of the network.

Figure 6A:
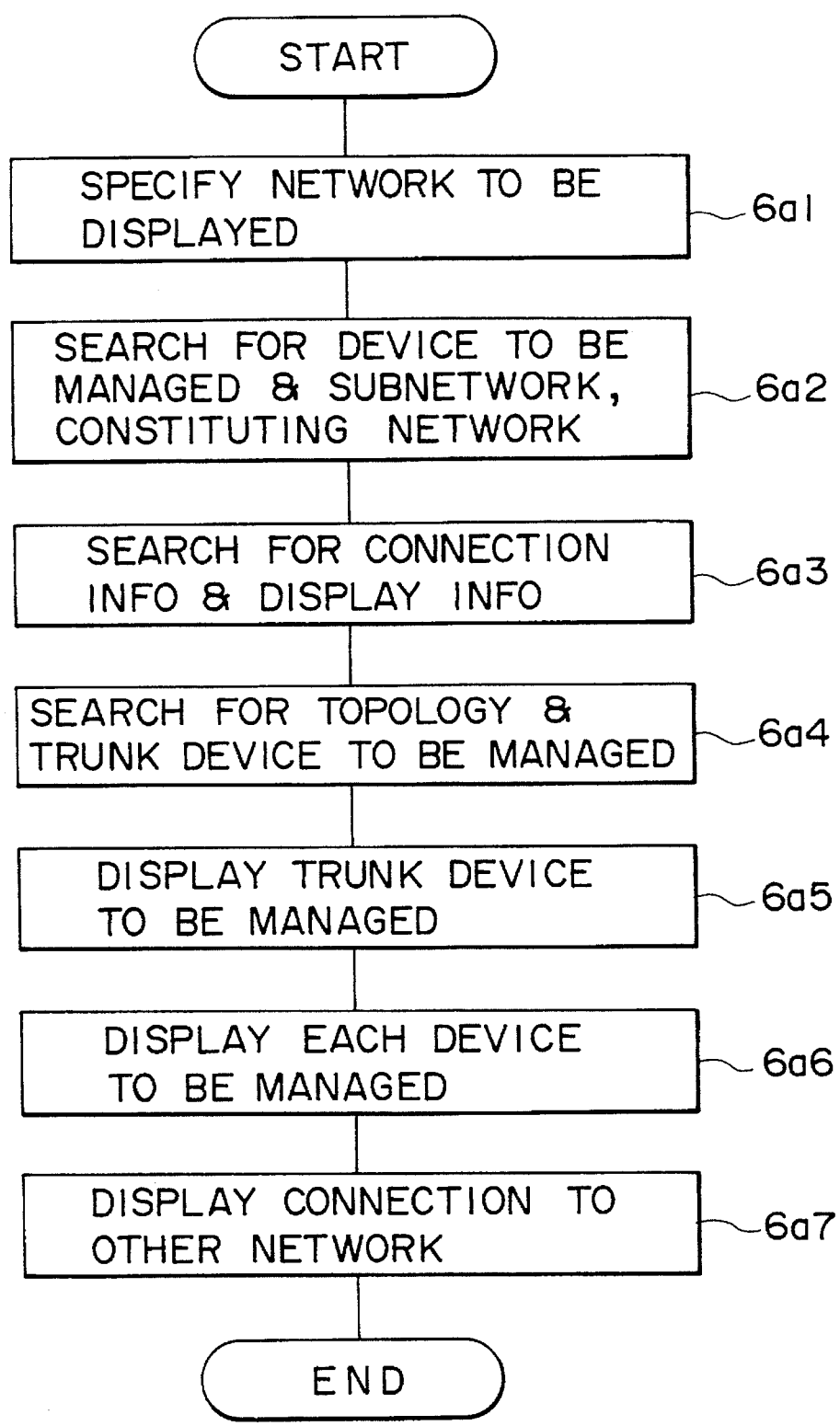
FIG. 6a is a flowchart showing processing procedures for displaying a drawing of a network configuration according to an embodiment of the present invention.
Figure 6B:
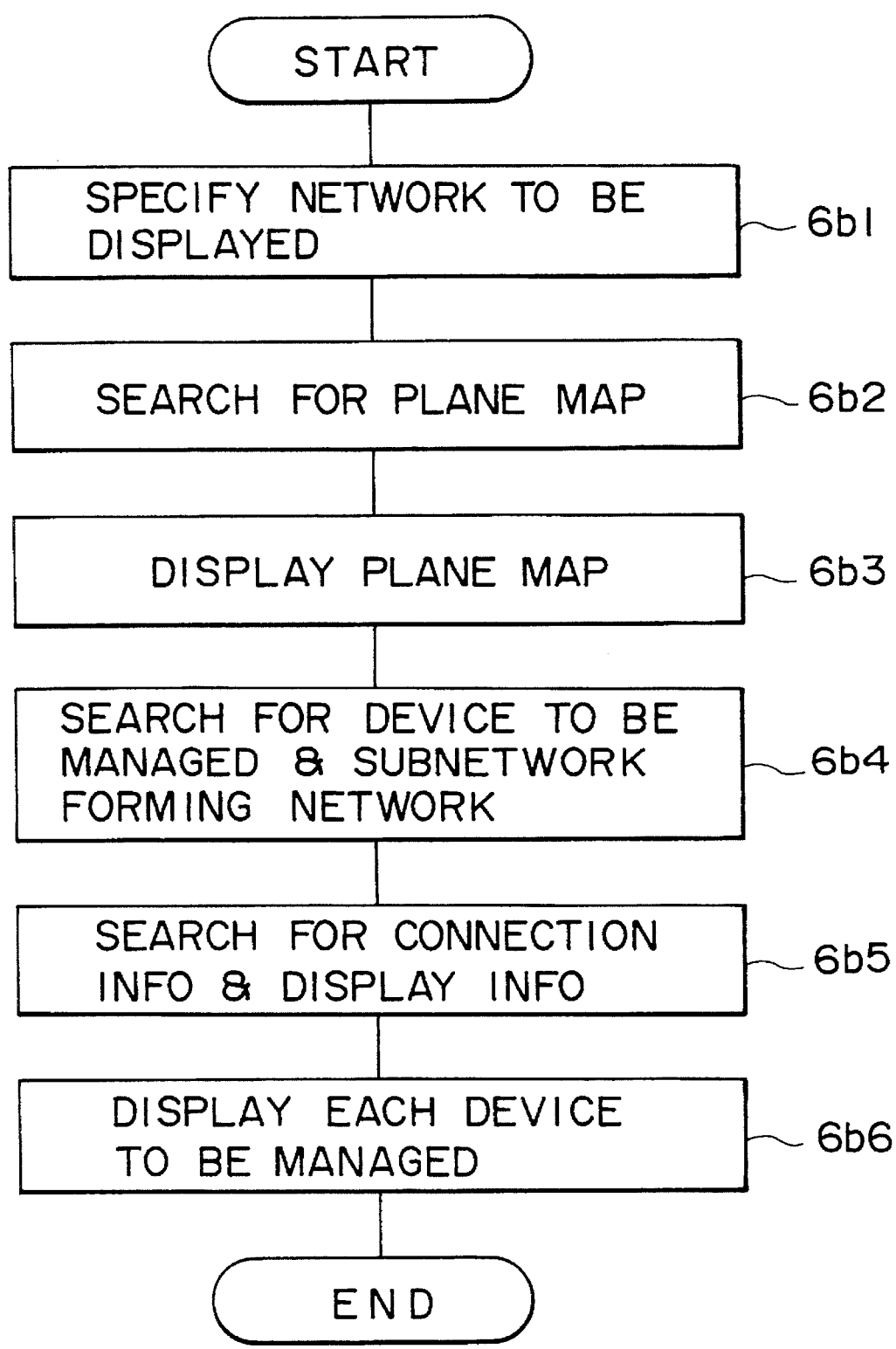
FIG. 6b is a flowchart showing processing procedures for displaying a drawing of a two-dimensional network configuration according to an embodiment of the present invention.
Figure 6C:
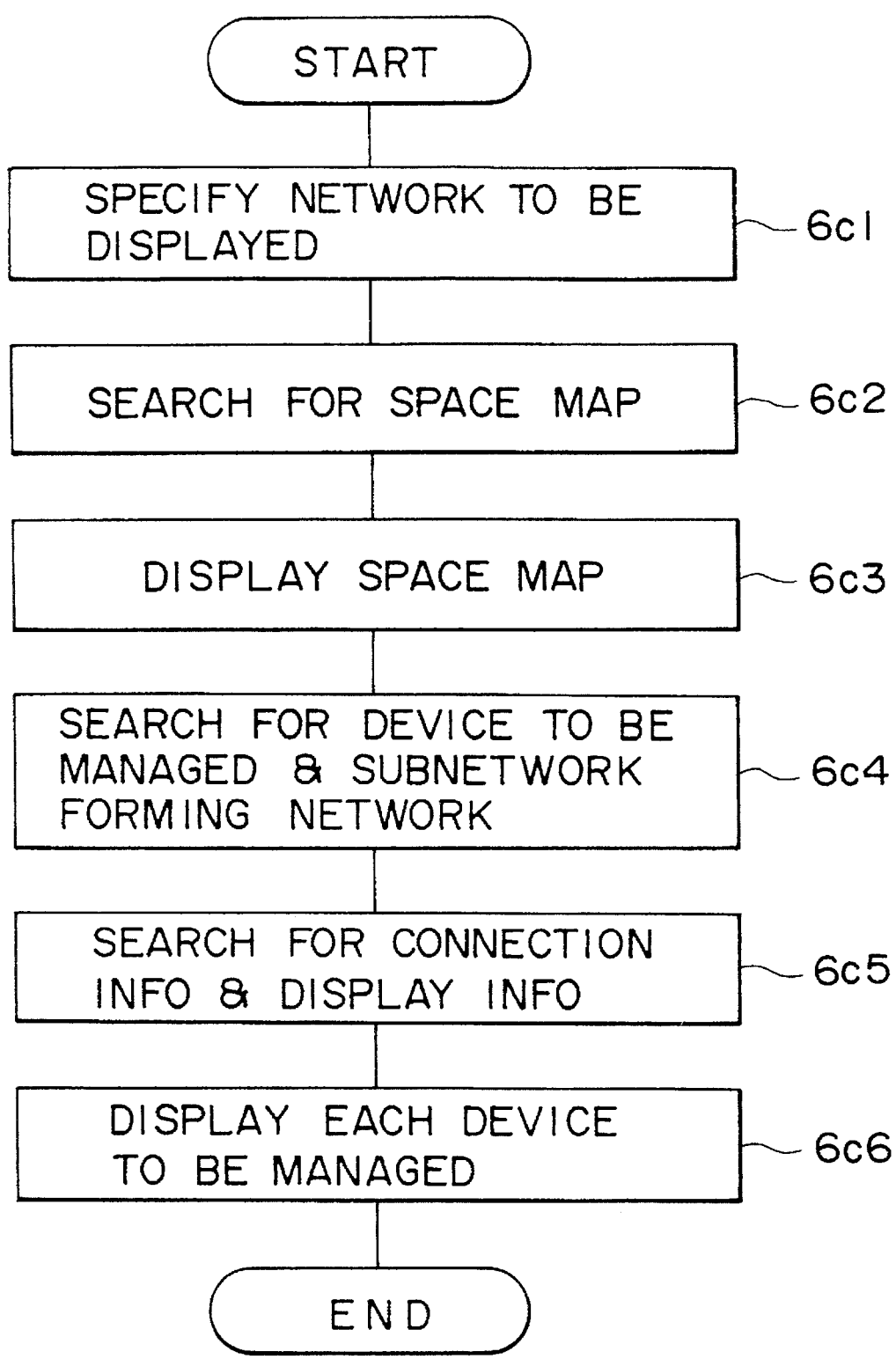
FIG. 6c is a flowchart showing processing procedures for displaying a drawing of a three-dimensional network configuration according to an embodiment of the present invention.
Figure 6D:
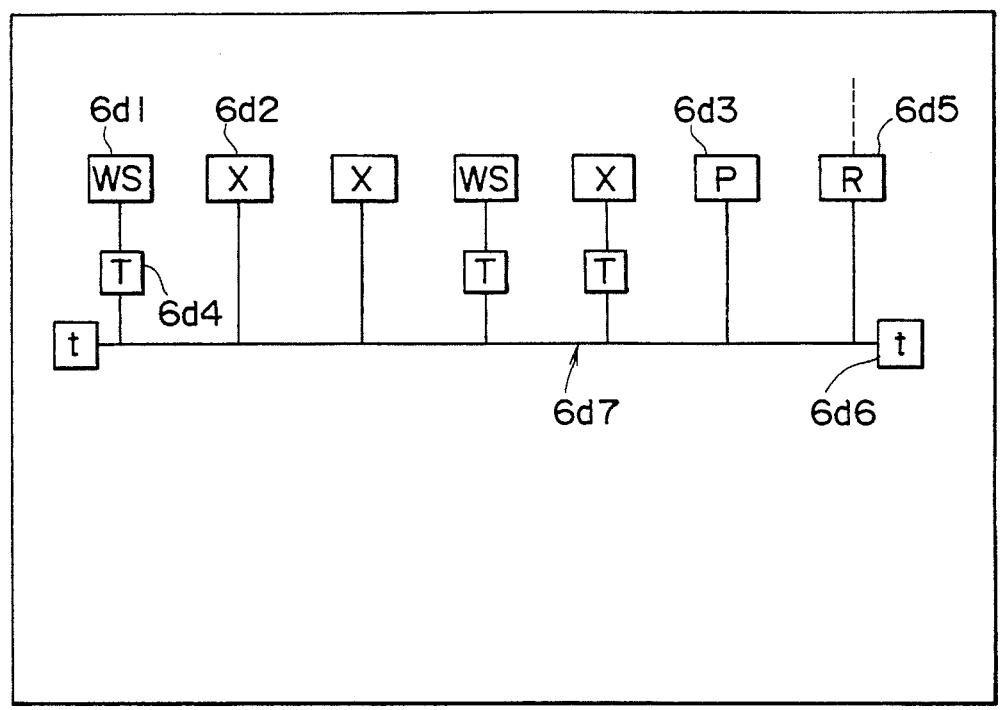
FIG. 6d is a schematic representation showing a display screen displaying a drawing of a network configuration according to an embodiment of the present invention.

FIG. 6d shows the display screen displaying the drawing of the network configuration according to an embodiment of the present invention, in which reference numeral 6d1 stands for a computer, reference numeral 6d2 for a terminal, reference numeral 6d3 for a peripheral device, reference numerals 6d4, 6d5 and 6d6 for network devices, and reference numeral 6d7 for a cable network.

Figure 6E:
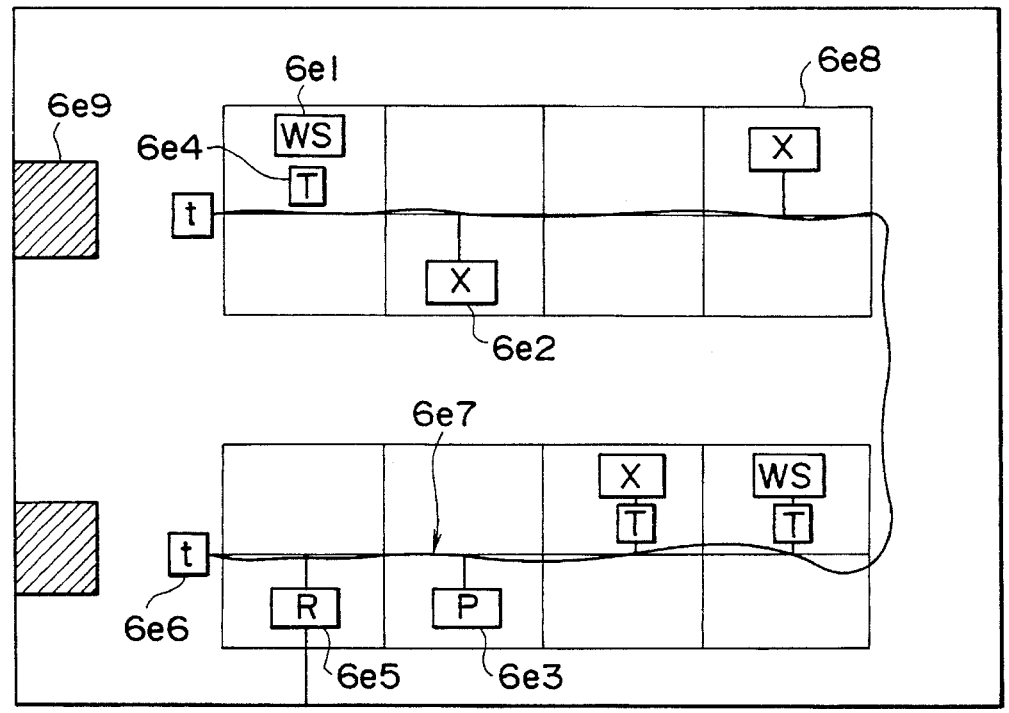
FIG. 6e is a schematic representation showing a display screen displaying a drawing of a two-dimensional configuration according to an embodiment of the present invention.
Figure 61:
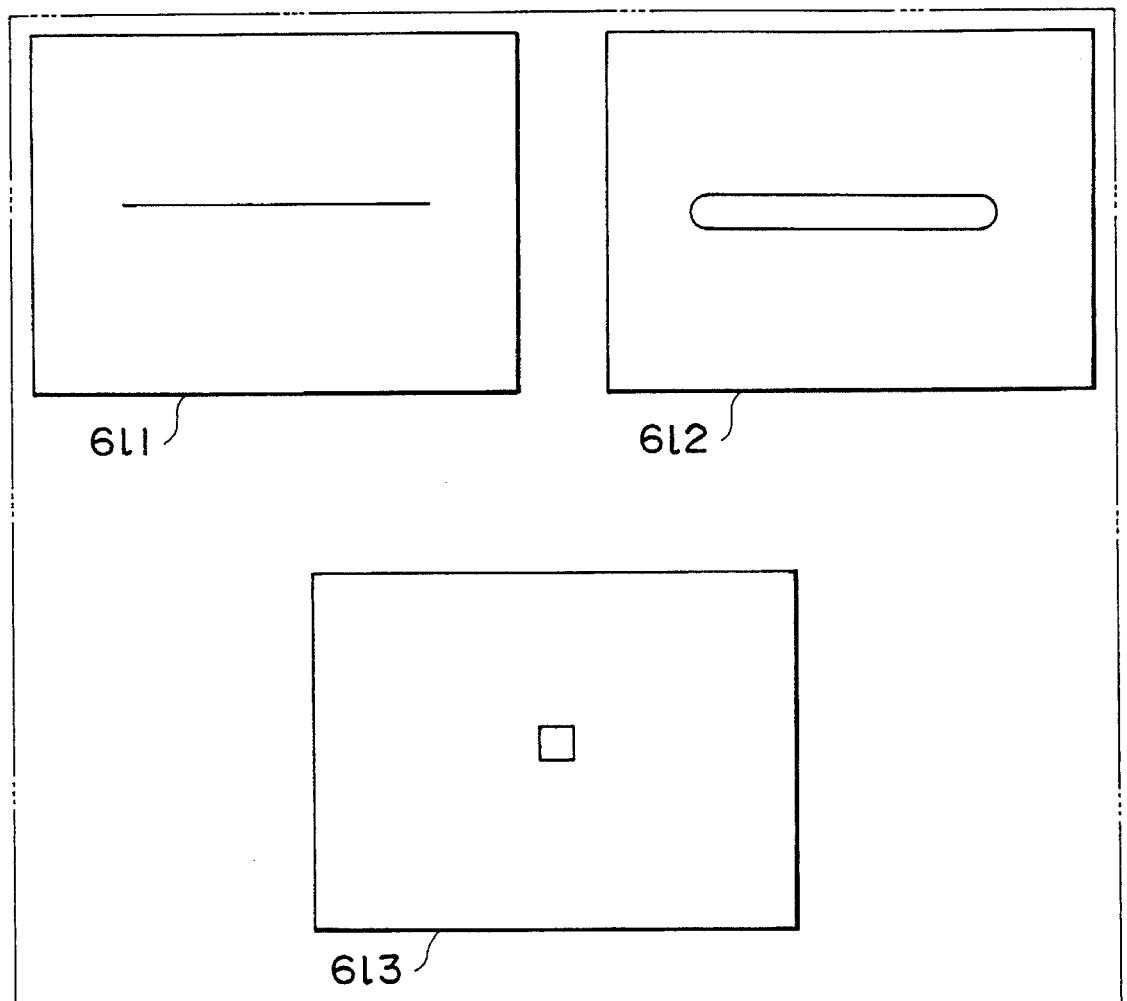
Figure 60:
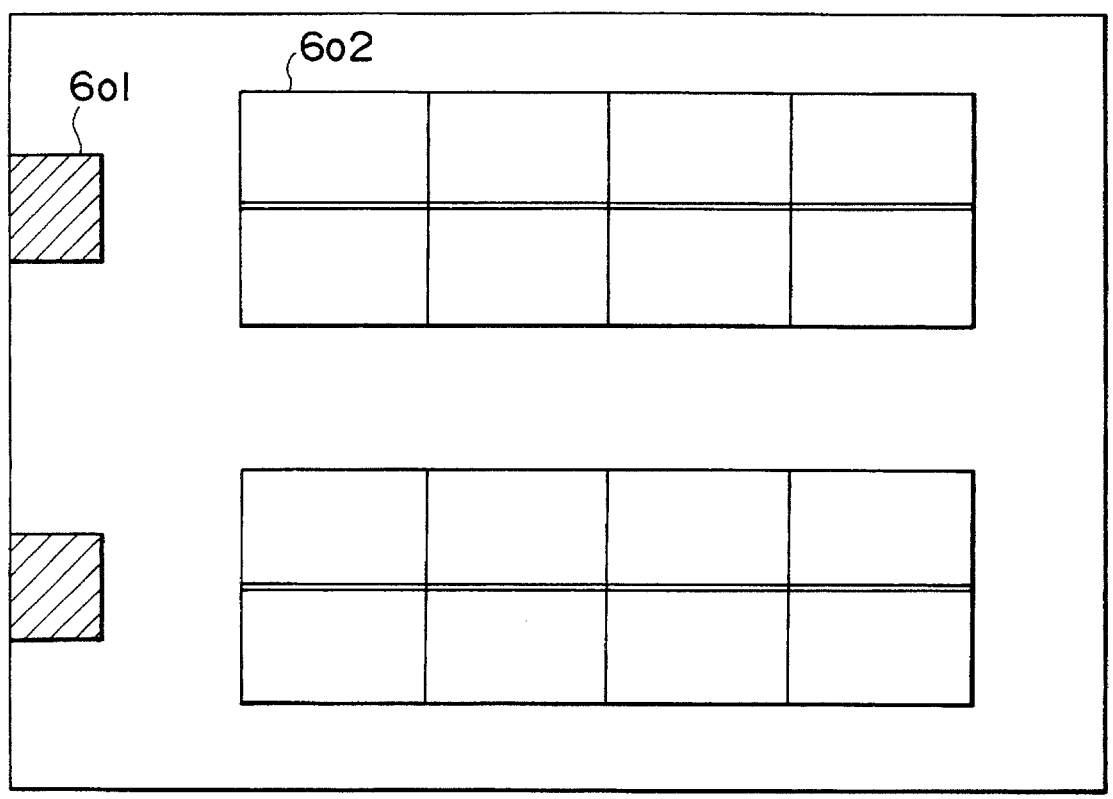

FIG. 6e shows the display screen displaying a schematic representation of the two-dimensional configuration according to this embodiment of the present invention, in which reference numeral 6e1 stands for a computer, reference numeral 6e2 for a terminal, reference numeral 6e3 for a peripheral device, reference numerals 6e4, 6e5 and 6e6 for network devices, reference numeral 6e7 for a network cable, reference numeral 6e8 for a table, and reference numeral 6e9 for a column.

Next, a description will be made of the hierarchical structure of the network according to the embodiment of the present invention with reference to FIGS. 6f(1) to 6f(3), inclusive.

FIGS. 6f(1) to 6f(3) are each a schematic representation for describing a network having the three hierarchies. In the description, the hierarchies are referred to as a first hierarchy, a second hierarchy, and the like, consecutively from the network representing the whole configuration, and the hierarchy having a smaller number is referred to as an upper hierarchy and the hierarchy having a larger number is referred to as a lower hierarchy. As shown in FIG. 6f(1), reference numerals 6f1, 6f2 and 6f3 denote the first, second and third hierarchies, respectively.

Each subnetwork and device to be managed, disposed in each of the hierarchies, is uniformly provided with a serial number. The numbers of each hierarchy arranged in a row from the uppermost hierarchy to the lowermost hierarchy are referred to as network numbers. The network numbers for the network having the three hierarchies of FIG. 6f(1) are as shown in FIG. 6g. The network numbers serve as identifying the subnetwork or the device to be managed uniformly from the whole network. For instance, when the subnetworks and the devices to be managed in each of the three hierarchies as shown in FIG. 6f(1) are provided with two-digit numbers as shown in FIG. 6f(2), the network number for each of the subnetworks and the devices to be managed may be represented in such a manner as shown in FIG. 6f(3). The subnetwork is represented by referring to a numerical portion of the lower hierarchy as a digit number '0'. In other words, a network 6f1 containing all objects of management as shown in FIG. 6f(1) may be represented by network number '000000'.

As shown in FIG. 6f(1), reference numeral 6f1 represents a whole image of the managing network which has four subnetworks 6f4 connected with a network device 6f2. The subnetwork is so arranged as to classify the network by a logical meaning such as a post or an area, a network having plural computers, terminals, network devices and peripheral devices connected to each other through a cable network.

The subnetwork 6f4 is one of the subnetworks constituting the whole image of the network 6f1, and the whole configuration of the subnetwork 6f4 is represented by a subnetwork 6f5 which in turn consists of three subnetworks 6f9 with a network device 6f7 connected thereto through a cable network 6f6. The cable network 6f6 is substantially the same as the cable network 6f3 constituting the whole image of the network 6f1. Likewise, the whole configuration of the subnetwork 6f9 is represented by a subnetwork 6f10 that consists of only devices to be managed which are connected with each other through a cable network 6f11 which in turn is substantially the same as the cable network 6f6 for the subnetwork 6f5.

Now, a description will be made of a variety of databases necessary for the system for operating and managing the network equipment to display the drawing of the network configuration indicating the logical connection of the network.

The databases may include databases such as the database indicative of the devices to be managed and the subnetwork and the corresponding network numbers as shown in FIG. 6h; the database indicative of the connection data as shown in FIG. 6i; the database indicative of the display data as shown in FIG. 6j; and the database indicative of a tree topology as shown in FIG. 6k(2).

The connection data indicates the relationship of connection among the devices to be managed and the subnetworks. As shown in FIG. 6i, the connection data contains data, stored with the network numbers, as to, for example, the cable network to which the subnetwork or the computer is connected, which cable network connected to the network of a higher hierarchy is a cable of a lower hierarchy, and so on.

The display data represents the state of display on the display unit. The shapes, characters, colors and patterns of each of the devices to be managed and the subnetworks can be specified. For instance, FIG. 6d shows an example of the drawing of the network configuration displayed by the system for operating and managing the network equipment. In the drawing, when the computer 6d1 is identified by the network number 010101, the database concerned gives the data, for example, on the shape being of a square box, the characters "WS" being provided within the square box, the color being white, a size of the box, and so on, as shown in FIG. 6j.

The tree topology represents a configuration of the network. As shown in FIG. 6k(1), the tree topology may include, for example, a bus network (as indicated by reference numeral 6k1) in which all the devices to be managed and the networks as nodes are connected to one cable network as a main communications line (bus); a ring network (as indicated by reference numeral 6k2) in which the devices to be managed and the networks are connected to the cable network in a closed loop, or ring; a star network (as indicated by reference numeral 6k3) in which each of the devices to be managed and the networks as a node is connected to a central computer in a star-shaped configuration; and a free network (as indicated by reference numeral 6k4) in which each of the devices to be managed and the networks as a node are connected in a free configuration. The network can be represented by any one of the tree topologies as described hereinabove, as shown in FIG. 6k(1).

A description will then be made of the processing for displaying the drawing of the network configuration indicating the logical connection of the system for operating and managing the network equipment to the devices to be managed and the networks, with reference to the flowchart as shown in FIG. 6a.

First, at step 6a1, the network or the subnetwork for which a drawing of the network configuration is sought to be displayed is specified by its network number, followed by proceeding to step 6a2 at which a search is made for the network number of the device to be managed or the subnetwork, constituting the lower hierarchy of the network number specified at step 6a1 from the database shown in FIG. 6h. Then, at step 6a3, a search is made for the connection data or the display data for each device or subnetwork from the database as shown in FIGS. 6i and 6j on the basis of the network number of the device to be managed or the subnetwork searched for at step 6a2.

Further, at step 6a4, a search is made for the tree topology of the network or the subnetwork, specified at step 6a1, from the database as shown in FIG. 6kb, and the program flow goes to step 6a5 at which the tree topology searched for at step 6a4 is displayed on the display screen in such a display configuration as indicated in FIG. 6l. In this drawing, the display configuration of the tree topology is illustrated as the bus network (611), the ring network (612), and the star or free network (613).

Then, at step 6a6, the device to be managed or the subnetwork searched for at step 6a2 is additionally displayed on the basis of the display data and the connection data searched for at step 6a3 on the screen displaying the tree topology displayed at step 6a4. Further, at step 6a7, a search is made for the cable network, through which the network to be displayed is connected to a network of a higher hierarchy, on the basis of the connection data searched for at step 6a3, and the searched cable network is displayed with a dot line on the display screen displayed at step 6a6. FIG. 6d shows the screen displaying the drawing of the network configuration according to the illustrated embodiment of the present invention.

Further, a description will be made of the processing for displaying the two-dimensional configuration drawing by the system for operating and managing the network equipment with reference to the flowchart as shown in FIG. 6b. The term "two-dimensional configuration drawing" is intended to mean a drawing indicating the physical positions of the devices to be managed and the subnetworks on a plane.

In order to allow the two-dimensional configuration drawing to be displayed, the system for operating and managing the network equipment is provided with a database of correspondence of the network numbers to the plane map, as shown in FIG. 6m; a database of the display positions indicative of the coordinates of the devices to be managed and the subnetworks on the plane map, as shown in FIG. 6n; and a database of the data of display of the devices to be managed and the subnetworks, as shown in FIG. 6j. The term "plane map" referred to herein is intended to mean a general term including a layout and a map, which indicates tables 6o1, columns 6o2, and the like, as shown in FIG. 6o.

First, at step 6b1, there is specified the network number of the network or the subnetwork, a two-dimensional configuration drawing of which is sought to be displayed, through the input device such as the mouse or the key board. Then, at step 6b2, a search for the plane map corresponding to the network number specified at step 6a1 is made from the database of FIG. 6m, followed by proceeding to step 663 at which the plane map searched at step 6b2 is displayed on the display unit, and then to step 6b4 at which a search is made for the network number of the device to be managed or the subnetwork, each constituting a lower hierarchy of the network number specified at step 6b1, from the database as shown in FIG. 6h. Further, at step 6b5, a search is made for the positions of display and the data of display of the device to be managed or the subnetwork searched for at step 6b4 from the databases as shown in FIGS. 6n and 6j, respectively. The program flows further to step 6b6 at which the device to be managed or the subnetwork searched for at step 6b4 is displayed as the two-dimensional configuration drawing on the basis of the data of display and the positions of display searched for at step 6b5 on the plane map displayed at step 6b3.

Figure 6P:
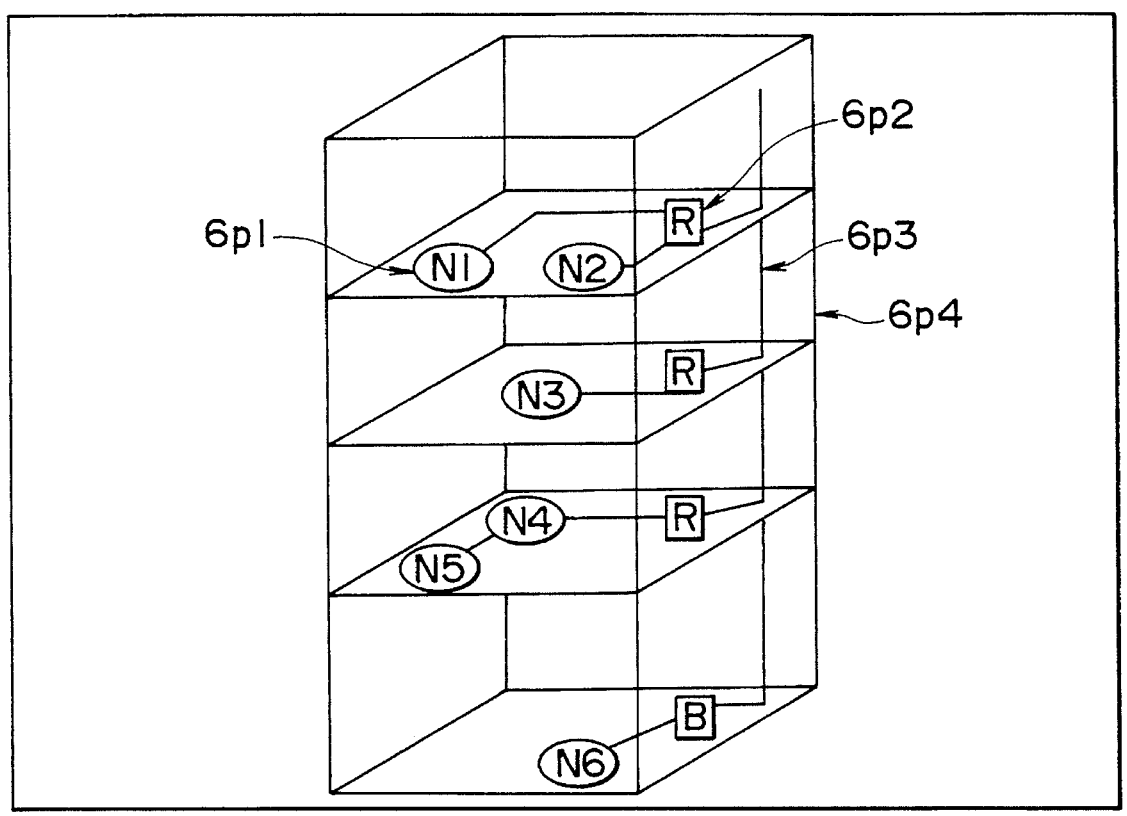
FIG. 6*p* is a schematic representation showing a display screen displaying the three-dimensional configuration drawing according to an embodiment of the present invention.

In addition, the processing for displaying the three-dimensional configuration drawing by the system for operating and managing the network equipment will be described with reference to the flowchart as shown in FIG. 6c. The term "three-dimensional configuration drawing" referred to herein is intended to mean a drawing indicating the physical positions of the devices to be managed and the subnetworks in a space. FIG. 6p shows a space map indicative of the three-dimensional configuration drawing of a layout of a building according to the embodiment of the present invention, in which reference numeral 6p1 stands for a subnetwork, reference numeral 6p2 for a device to be managed, reference numeral 6p3 for a cable network, and reference numeral 6p4 for a network. The space map refers to such a layout in which the building as shown in FIG. 6q is displayed by its framework 6q1 only.

In order to allow a display of the three-dimensional configuration drawing, the system for operating and managing the network equipment may be provided with a database corresponding to the network numbers and the space map as shown in FIG. 6r; a database of the positions of display indicative of the coordinates of the device to be managed or the subnetwork on the space map as shown in FIG. 6s; and a database of the data of display of the device to be managed or the subnetwork as shown in FIG. 6j.

First, at step 6c1, there is specified the network number of the network or the subnetwork, a three-dimensional configuration drawing of which is sought to be displayed, through the input device such as the mouse or the key board. Then, at step 6c2, a search for the space map corresponding to the network number specified at step 6c1 is made from the database of FIG. 6r, followed by proceeding to step 6c3 at which the space map searched for at step 6c2 is displayed on the display unit. Then, proceeding to step 6c4, a search is made for the network number of the device to be managed or the subnetwork, each constituting a lower hierarchy of the network number specified at step 6c1, from the database as shown in FIG. 6h. Further, at step 6c5, a search is made for the positions of display and the data of display of the device to be managed or the subnetwork searched at step 6c4 from the databases as shown in FIGS. 6s and 6j, respectively. The program flows further to step 6c6 at which the device to be managed or the subnetwork searched for at step 6c4 is displayed as the three-dimensional configuration drawing on the basis of the data of display and the positions of display searched for at step 6c5 on the space map displayed at step 6c3.

Furthermore, a description will be made of a flow of the processing for analyzing the current network traffic by the system for operating and managing the network equipment according to an embodiment of the present invention and for proposing a new and efficient network configuration, with reference to the flowchart as shown in FIG. 7a. The term "network traffic" referred to herein is intended to mean an amount of communication between the device to be managed and the subnetwork. In the description which follows, a description of the network traffic will be made by taking a quantity of packets as an example of the quantity of communication between the device to be managed and the subnetwork. The term "packet" referred to herein is in turn intended to mean a unit of information communicated between the device to be managed and the subnetwork.

The system for operating and managing the network equipment according to this embodiment of the present invention has a database of the historical data in order to analyze the current network traffic. The historical data referred to herein is intended to mean a record of the quantity of communication between the device to be managed and the subnetwork for every predetermined period of time.

FIG. 7b shows the historical data in which the network number of the receiver and the number of the packets transmitted are recorded. In FIG. 7b, reference numeral 7b1 stands for the network number of a device to be managed or a subnetwork from which a packet is transmitted; reference numeral 7b2 for the network number of a device to be managed or a subnetwork which receives the packet transmitted from the device or the subnetwork 7b1; reference numeral 7b3 for the total number of packets transmitted from a week ago; and reference numeral 7b4 for the total number of packets transmitted from two weeks ago. The history as described hereinabove is stored in the database of the historical data for each of the computers and the subnetworks.

First, at step 7a1, the network number of a network or a subnetwork to be investigated is specified, followed by proceeding to step 7a2 at which a search is made from the database as shown in FIG. 6h for the network number of the device to be managed or the subnetwork constituting a lower hierarchy of the network number specified at step 7a1. Then, at step 7a3, a search is made for the history of the device to be managed or the subnetwork, searched for at step 7a2, from the database of the historical data. Further, the program flow goes to step 7a4 at which the topology of the hierarchy of the network specified at step 7a1 is searched for from the database as shown in FIG. 6k(2), followed by proceeding to step 7a5. Then, at step 7a5, inference is made of a network having less traffic on the basis of the historical data searched for at step 7a3 and the topology searched for at step 7a4.

Now, a description will be made of the way of the inference to be performed by the system for operating and managing the network equipment according to a preferred embodiment of the present invention.

For instance, it is presumed that three subnetworks having the network numbers 010100, 010200 and 010300, each having the historical data as shown in FIG. 7b, are arranged in such a manner that the subnetwork 010100 is connected to the subnetwork 010200 through a cable network 010101, and the subnetwork 010200 is in turn connected to the subnetwork 010300 through a cable network 010102 in the manner as shown in FIG. 7c(1). FIG. 7c(2) is a diagrammatical representation of the sum of the number of the packets mutually transmitted between the subnetworks as shown in FIG. 7c(1). In FIG. 7c(2), the numeral as indicated by reference numeral 7c1 means the sum of the number of packets transmitted mutually between the subnetworks 010100 and 010300; the numeral as indicated by reference numeral 7c2 means the sum of the number of packets transmitted mutually between the subnetwork 010100 and the subnetwork 010200; and the numeral as indicated by reference numeral 7c3 means the sum of the number of packets transmitted mutually between the subnetwork 010200 and the subnetwork 010300.

The system for operating and managing the network equipment judges that the traffic of the cable networks 010101 and 010102 increases on the basis of the sum of the packets of communication between the subnetworks 010100 and 010300 as indicated by reference numeral 7c1, and that, as a result, both of the communication between the subnetworks 010100 and 010200 and the communication between the subnetworks 010200 and 010300 become worse in efficiency on the basis of the respective sums of the packets as indicated by reference numerals 7c2 and 7c3, respectively. Further, the system for operating and managing the network equipment makes an inference on the basis of the judgment, as made hereinabove, that the subnetwork 010100 be connected directly to the subnetwork 010300, and further judges as a result of comparison of the sum as indicated by 7c2 with the sum as indicated by 7c3 that the communication between the subnetwork 010200 be connected to the subnetwork 010100 by placing a higher priority on the sum 7c2 than on the sum 7c3.

Figure 7D:
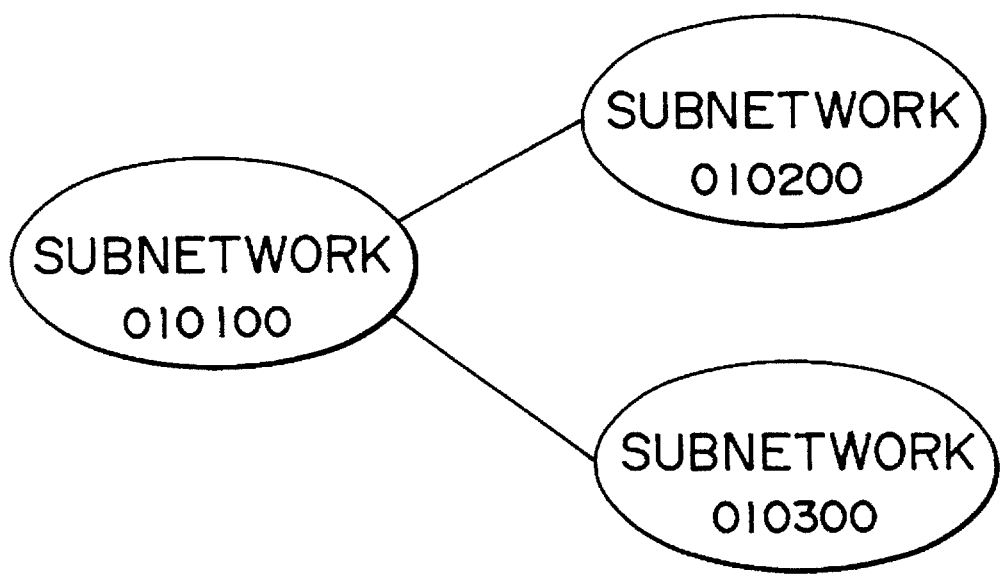
FIG. 7*d* is a schematic representation showing the configuration of the network subsequent to inference, according to an embodiment of the present invention.

The new and more efficient network configuration is inferred in the way as described hereinabove and, at step 7a6, the network configuration inferred at step 7a5 is displayed on the display unit in the manner as shown in FIG. 7d.

Next, the processing is described with reference to the flowchart as shown in FIG. 8a, the processing being implemented for identifying the device and the user, which will be affected when any one of the devices to be managed, such as the computer, terminal, network device, peripheral device or power, within the scope of management in the system for operating and managing the network equipment, is suspended, and the processing being performed for notifying the user to that effect in advance.

First, at step 8a1, the system for operating and managing the network equipment displays the drawing of the network configuration within the scope of management on the display screen, followed by proceeding to step 8a2 at which the supposedly suspended device within the scope of management on the drawing of the network configuration as shown in FIG. 5g is specified through the input device such as the mouse or the key board. For instance, a power A (5g1) as shown in FIG. 5g is specified. Then, at step 8a3, a search is made for the device to be affected upon suspension of the power A on the basis of the tables 5a and 5b in accordance with the search routine as shown in FIG. 5f, and the result of the search is generated into the list C. Further, at step 8a4, the user who will be affected upon suspension of the device contained in the list C is searched for on the basis of the table as shown in FIG. 5c, followed by proceeding to step 8a5 at which a search is made from the table, as shown in FIG. 5d, for the software that becomes unavailable when the device contained in the list C is suspended. Then, at step 8a6, the system for operating and managing the network equipment notifies the data (the devices which may be affected and the software which becomes unavailable) searched at steps 8a3 and 8a5 of the user searched for at step 8a4 through electronic mail, as shown in FIG. 8b. The data may be displayed on the terminal the user is employing, not through electronic mail.

Furthermore, a description will be made of the method for notifying abnormal use of the person managing the system for operating and managing the network equipment when a certain computer, terminal, network device or peripheral device within the scope of management is used abnormally through the network.

In order to employ the computer, terminal, network device or peripheral device through the network from a terminal disposed in a position remote therefrom, it is necessary to transmit data of an instruction in the form of a packet from the computer, terminal, network device or peripheral device which the user is employing through the network to the computer, terminal, network device or peripheral device which the user intends to employ.

FIG. 9a shows the data configuration of the packet according to the embodiment of the present invention, in which reference numeral 9a1 stands for an address located within the network of the computer, terminal, network device or peripheral device, which the user is employing; reference numeral 9a2 stands for an address located within the network of the computer, terminal, network device or peripheral device, which the user intends to use; and reference numerals 9a3 and 9a4 stand for relay machines that enable the packet to be transmitted to the objective receiving machine by interchanging the packet when the transmitting machine cannot transmit the packet directly to the receiving machine. There are instances where a plurality of machines are interchanging the packet on a route through which the packet is allowed to pass from the transmitting machine to the receiving machine. If one relay machine transmits the packet to another relay machine, the relay machine 9a3 serves as a transmitting machine for interchanging the packet and the relay machine 9a4 serves as a receiving machine for interchanging the packet. The computer, terminal, network device or power the user is employing serves itself as the transmitting machine and is provided with no transmitting relay machine so that a transmitting relay machine address 9a3 is itself equipped with a transmitting machine address which indicates that there is no transmitting relay machine. On the other hand, when the packet is to be transmitted to the receiving machine without the aid of the receiving relay machine, a receiving relay machine address 9a4 is itself equipped with a receiving machine address which indicates that there is no receiving relay machine. In addition, in FIG. 9a, reference numeral 9a5 stands for a network number assigned uniformly to each network service, and reference numeral 9a6 stands for transmission data which the network service employs.

The system for operating and managing the network equipment is arranged to store a transmission authorization table, as shown in FIG. 9b, in a disk managed by the system for operating and managing the network equipment, in order to authorize the transmission of data among the computers, terminals, network devices and peripheral devices through the network. Further, the system for operating and managing the network equipment authorizes a machine having a receiving machine address 9b2 to utilize the network service identified by service number 9b3 specified in an identical column, as shown in FIG. 9b, the machine with the receiving machine address 9b2 being specified in the identical column by a machine with a transmitting machine address 9b1.

Figure 9D:
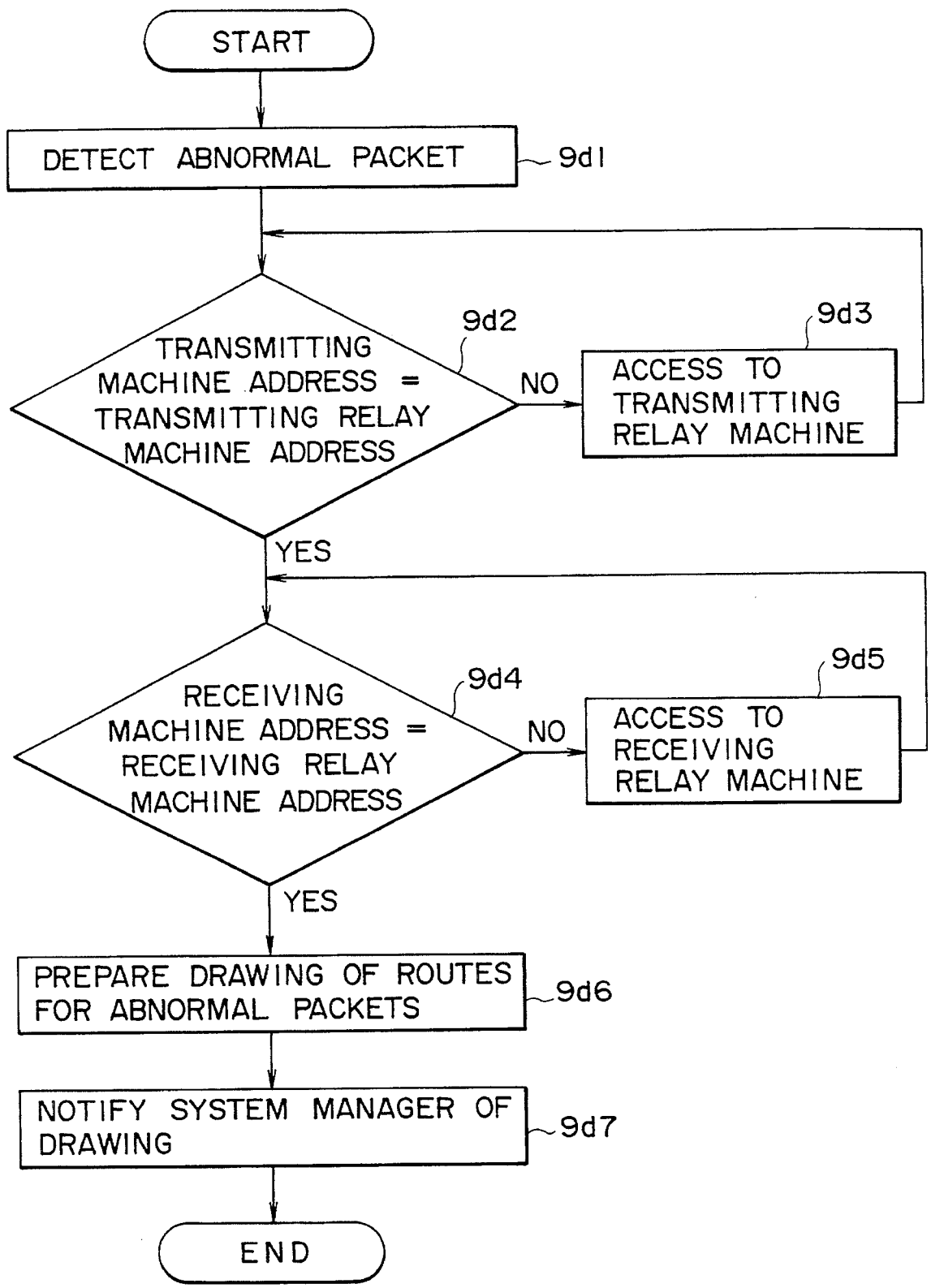
FIG. 9*d* is a flowchart showing processing procedures for detecting an abnormal access according to an embodiment of the present invention.

When the computer, terminal, network device or peripheral device is utilized abnormally through the network, a transmitting route is to be detected through which the packet is being transmitted or has been transmitted for abnormal usage. Further, the transmitting route is to be reported to the manager managing the system. A description will be made of the processing for notifying the manager of the transmitting route with reference to the flowchart as shown in FIG. 9d.

First, at step 9d1, the system for operating and managing the network equipment monitors the packets passing on the network with the aid of a communication controller, and fetches the transmitting machine address 9a1, the receiving machine address 9a2, the transmitting relay machine address 9a3, the receiving relay address 9a4, and the service number 9a5, as shown in FIG. 9a, from each packet. Then the investigation is performed as to whether the transmitting machine address 9a1, the receiving machine address 9a2, and the service number 9a5 are registered in the transmission authorization table as shown in FIG. 9b. When it is found that they are registered in the transmission authorization table, the system for operating and managing the network equipment does not perform any processing because the packet is not employed abnormally, so that the program flow goes back to step 9d1 for monitoring another packet. On the other hand, when they are not registered in the transmission authorization table, the packet involved is being transmitted or has been transmitted for abnormal usage so that the processing at steps 9d2 et seq is to be implemented.

Then, at step 9d2, a decision is made to determine if the transmitting machine address 9a1 of the abnormal packet detected at step 9d1 agrees with the transmitting relay machine address 9a 3. If the transmitting machine address 9a1 does not agree with the transmitting relay machine address 9a3, the transmitting relay machine address 9a3 is registered at step 9d3 in the transmitting machine address 9c1 as shown in FIG. 9c and the receiving relay machine address 9a4 is registered in the receiving machine address 9c2 as shown in FIG. 9c.

Then, access is made to the transmitting relay machine and the investigation is made as to which machine is transmitting or has transmitted the abnormal packet. Thereafter, the transmitting or transmitted machine is checked, the transmitting relay machine addresses are kept registered in the transmitting machine address 9c1 of the route table as shown in FIG. 9c, and the receiving relay machine addresses are kept registered in the receiving machine address 9c2 thereof until the transmitting machine address 9a 2 is brought into agreement with the transmitting relay machine address 9a4.

Then, at step 9d4, it is investigated to determine if the receiving machine address 9a2 of the abnormal packet detected at step 9d1 agrees with the receiving relay machine address 9a4.

Further, when it is decided that the receiving machine address 9a2 does not agree with the receiving relay machine address 9a4, then the program flow goes to step 9d5 at which the transmitting relay machine address 9a3 is registered in the transmitting machine address 9c1 as shown in FIG. 9c and the receiving relay machine address 9a4 is registered in the receiving machine address 9c2 as shown in FIG. 9a4.

Then, access is made to the receiving relay machine and the investigation is made as to which machine is receiving or has received the abnormal packet. Thereafter, the receiving or received machine is checked, as well as the transmitting relay machine addresses are kept registered in the transmitting machine address 9c1 of the route table as shown in FIG. 9c and the receiving relay machine addresses are kept registered in the receiving machine address 9c2 thereof until the transmitting machine address 9a1 is brought into agreement with the transmitting relay machine address 9a3.

Further, at step 9d6, a route from the receiving machine address fetched at step 9d1 to the transmitting machine address is determined on the basis of the route table of FIG. 9c prepared at steps 9d3 and 9d5. Then, the data relating to the connection status of the computers, terminals, network devices and peripheral devices, is stored in the system for operating and managing the network equipment, and there is prepared a drawing of routes of abnormal packets, indicative of all computers, terminals, network devices and peripheral devices which are indicated on the route table.

Then, at step 9d7, the drawing of the routes of the abnormal packets prepared at step 9d6 is transmitted as electronic mail to the system manager automatically. When the system manager is employing the terminal connected to the network, the drawing of the routes of abnormal use is displayed on the terminal the manager is employing.

As is apparent from the foregoing description, the network management system according to the present invention offers the following advantages:

1. The network management system according to the present invention can reduce and simplify the managing business of the network manager because data of multiple kinds can be managed uniformly, the managing operations for managing data can be reduced to a great extent, and the operations themselves can be simplified.

2. The asset management data and so on are currently managed through a large-scale host machine. Even the manager managing the assets cannot make ready access to the data through its own terminal unless the terminal is connected to the host machine. On the other hand, the system for operating and managing the network equipment according to the present invention allows the data to pass through the network so that the operations for operating the asset management can be reduced, thereby reducing the management business by the asset manager. Likewise, the management operations for operating and managing the materials and products can be reduced so that the management business by the manager managing the materials and products can be reduced and simplified.

3. As the network management system according to the present invention allows the connected machines on the network to be detected automatically, it is easy to detect and identify the position of breakage or abnormal connection of a cable although it is difficult to do so in the usual cases. Hence, the network management system according to the present invention allows prompt measures to be taken even in case of a fault or a failure of the network to be caused due to such abnormality of the cable.

4. Each of the machines connected to the network can theoretically share resources such as hard disks and printers; however, it is laborious to check how effectively they are utilized actually, although they may be merely available. The network management system according to the present invention can check what disk is available at what megabits (MB), what load average the central processing unit (CPU) has, what rate the swap area is employed, how many megabits (MB) the disk size is which is capable of being distributed to each user, and the like. Hence, the network management system allows the resources to be shared in an appropriate fashion, so that it can save the resources by sharing the computer resources and the data.

5. The network management system according to the present invention can always hold correct data and monitor the network traffic and rates at which the machines are employed, so that a careless decrease in efficiency of the network can be avoided and reliability of the network as a whole can be improved.

6. The physical state of the disposition of all the network devices is displayed, so that the physical disposition and the state of connection can be grasped with ease, as well as the state of the logical connection on the network, whereby the position in which the cable (for example) is broken can be determined, although it is otherwise difficult to investigate a cause of the breakage of the cable, and quick measures can be taken even if a network would be down due to the incomplete connection of the cables. This arrangement can perform the management of faults so as to cover all the network devices.

7. Further, the network management system according to the present invention can display the location of a fault and the traffic means up to the location of the fault at the time of the occurrence of the fault so that the fault can be recovered quickly.

8. In addition, the position in which radio wave hindrance and so on are likely to occur can be displayed, so that the management of the physical environment can be made to a sufficient extent in order to configure the network.

9. Furthermore, the amounts of communication through the communication paths are displayed by changing the corresponding line widths or by any other appropriate way, thereby capable of grasping the performance of the network with ease and avoiding the network being down in a careless way. Hence, this mode of the network management system according to the present invention can improve the reliability of the network as a whole.

10. Finally, the network management system according to the present invention can display the entrances into which the intruder can break into the office or the like or a careless person enters, and the exits from which the intruder can run away or the careless person goes out, so that the necessary measures for security can be taken to thereby ensure security to a sufficient extent.

What is claimed is:

1. A system for operating and managing a network having a plurality of computers and network devices, comprising:

a first database for storing physical disposition and connection data for a network configuration, wherein the physical disposition and connection data stored in said first database include at least one of the length of a cable, electrical capacitance, an area of installation, a location of power, and a shape of a network port;

a second database for storing logical data for analyzing a network topology;

physical configuration figure creating means for creating a physical configuration figure of the network based on the data stored in the first database;

logical configuration figure creating means for creating a logical configuration figure of the network based on the data stored in the second database;

physical configuration figure checking means for determining whether the physical configuration figure satisfies a physical-numeric-condition of a network device represented by the data stored in the first database and a physical-numeric-condition of a network device indicated by a user;

logical configuration figure checking means for determining whether the logical configuration figure satisfies a logical-numeric-condition of a network device represented by the data stored in the second database and a logical-numeric-condition of a network device indicated by a user;

means for searching one of said first and second databases for information of computers or network devices included on one of said physical configuration figure and said logical configuration figure; and means for displaying said one of said determined physical configuration figure and said logical configuration figure.

2. A system for operating and managing a network as claimed in claim 1, further comprising:

means for detecting a fault of the network and specifying the location of the fault;

means for displaying said location of the fault on at least one of said configuration figures; and means for changing the display in accordance with the content of the fault and a degree or magnitude of significance of the fault.

3. A system for operating and managing a network as claimed in claim 1, comprising:

means for detecting a fault of the network and specifying the location of the fault;

analyzing means for analyzing the content at the location of the fault and indicating a scope of influence of the fault on the network;

means for displaying results obtained by said analyzing means on at least one of said configuration figures; and means for changing the display in accordance with the content of the fault and the degree or magnitude of significance of the fault.

4. A system for operating and managing a network as claimed in claim 3, comprising:

means for detecting a computer or network device under the influence of the fault; and means for giving a notice to a user using the detected computer or network device as to the detection of the fault.

5. A system for operating and managing a network as claimed in claim 2, comprising:

means for collecting and storing information concerning a course of occurrence of the fault; and means for displaying the result of said course on at least one of said configuration figures based on an instruction from the user.

6. A system for operating and managing a network having a plurality of computers and network devices, comprising:

a first database for storing physical disposition and connection data for a network configuration, wherein the physical disposition and connection data stored in said first database include at least one of the length of a cable, electrical capacitance, an area of installation, a location of power, and a shape of a network port;

a second database storing information relating to a peripheral map of locations in which the network devices are disposed and to traffic paths to reach the network devices;

physical configuration figure creating means for creating a physical configuration figure of the network based on the data stored in the first database;

means for detecting a fault of the network and specifying the location of the fault; and means for indicating the fault location at the time of occurrence of the fault of the network, and displaying the traffic path to reach the location of the network device in which the fault occurred and the peripheral map indicating the location of the network device, based on the information stored in the second database.

7. A system for operating and managing a network having a plurality of computers and network devices, comprising:

a first database for storing physical disposition and connection data for a network configuration, wherein the physical disposition and connection data stored in said first database include at least one of the length of a cable, electrical capacitance, an area of installation, a location of power, and a shape of a network port;

a second database for storing information relating to a numerical condition of a physical environment of the network device; and means for creating a physical configuration figure in an inferior limit of a decided numerical condition of the physical environment based on the data stored in said first database and the information stored in said second database, and for displaying said physical configuration figure.

8. A system for operating and managing a network having a plurality of computers and network devices, comprising:

a first database for storing physical disposition and connection data for a network configuration, wherein the physical disposition and connection data stored in said first database include at least one of the length of a cable, electrical capacitance, an area of installation, a location of power, and a shape of a network port;

a second database for storing information of a level of intrusion or entry, the information relating to an entrance through which an intruder can enter a place where a network device is exposed, and an exit through which the intruder can exit the place where the network device is disposed;

physical configuration figure creating means for creating a physical configuration figure of the network based on the data stored in the first database; and means for displaying the physical configuration figure of the network based on the data stored in said first database, and for displaying said entrance and said exit by making a search of said second database.

9. A system for operating and managing a network having a plurality of computers and network devices, comprising:

a first database for storing logical data for analyzing a network topology, wherein the logical data stored in said first database include at least one of the number of a connectable machine, an upper limit of network traffic, a used disk size, and a used swap size;

a second database for storing information relating to a velocity of communication through a communication path connecting the network devices together;

logical configuration figure creating means for creating a logical configuration figure of the network based on the information stored in the second database;

means for displaying the logical configuration figure of the network based on the information stored in said second database, and for displaying on the logical configuration figure the communication path connecting a pair of network devices to each other corresponding to a rate of an amount of communication with respect to the velocity of the communication, by selecting the communication pair by transmitting or receiving a packet for measuring the amount of communication between the pair of network devices, and determining the rate of communication with respect to the velocity of the communication through the communication path, stored in said second database.

10. A system for operating and managing a network as claimed in claim 1, comprising:

displaying means for displaying at least one of the physical configuration figure and the logical configuration figure of the network in a multi-dimensional manner.

11. A system for operating and managing a network as claimed in claim 6, further comprising:

displaying means for displaying the physical configuration figure of the network in a multi-dimensional manner.

12. A system for operating and managing a network as claimed in claim 7, further comprising:

displaying means for displaying the physical configuration figure of the network in a multi-dimensional manner.

13. A system for operating and managing a network as claimed in claim 8, further comprising:

displaying means for displaying the physical configuration figure of the network in a multi-dimensional manner.

14. A system for operating and managing a network as claimed in claim 9, further comprising:

displaying means for displaying the logical configuration figure of the network in a multi-dimensional manner.

15. A system for operating and managing a network as claimed in claim 1, wherein the logical data stored in said second database include at least one of the number of a connectable machine, an upper limit of network traffic, a used disk size, and a used swap size.

16. A system for operating and managing a network as claimed in claim 7, wherein the information stored in said second database includes at least one of the illumination at a location of the network device and the output of a radio wave of a wireless local area network.

17. A system for operating and managing a network as claimed in claim 9, wherein the pair of network devices connected by said communication path are optical communication devices.

* * * * *